(12) United States Patent
Russell

(10) Patent No.: US 11,913,519 B2
(45) Date of Patent: Feb. 27, 2024

(54) SHOCK ABSORBER ASSEMBLY

(71) Applicant: N10Z Performance Shocks LLC, Johnson City, TN (US)

(72) Inventor: Peter Russell, Johnson City, TN (US)

(73) Assignee: N10Z Performance Shocks LLC, Johnson City, TN (US)

( * ) Notice: Subject to any disclaimer, the term of this patent is extended or adjusted under 35 U.S.C. 154(b) by 0 days.

(21) Appl. No.: 17/893,606

(22) Filed: Aug. 23, 2022

(65) Prior Publication Data

US 2023/0003274 A1 Jan. 5, 2023

Related U.S. Application Data

(63) Continuation of application No. 16/447,772, filed on Jun. 20, 2019, now Pat. No. 11,448,282.

(51) Int. Cl.
| | |
|---|---|
| *F16K 31/122* | (2006.01) |
| *F16F 9/06* | (2006.01) |
| *F16F 9/348* | (2006.01) |
| *F16F 9/32* | (2006.01) |
| *B60G 13/08* | (2006.01) |
| *F16F 9/36* | (2006.01) |
| *F16K 17/04* | (2006.01) |

(52) U.S. Cl.
CPC ............. *F16F 9/061* (2013.01); *B60G 13/08* (2013.01); *F16F 9/065* (2013.01); *F16F 9/3214* (2013.01); *F16F 9/348* (2013.01); *F16F 9/368* (2013.01); *F16K 17/048* (2013.01); *F16K 17/0466* (2013.01); *B60G 2202/24* (2013.01); *B60G 2206/41* (2013.01); *B60G 2800/162* (2013.01); *F16F 2222/12* (2013.01)

(58) Field of Classification Search
CPC .. F16F 9/061; F16F 9/065; F16F 9/348; F16F 9/368; F16F 2222/12; F16F 9/46; B60G 13/08; B60G 2202/24; B60G 2206/41; B60G 2800/162; F16K 17/0466; F16K 17/048
USPC ............ 188/282.1, 282.5, 282.7, 282.8, 283, 188/316–318, 319.1, 322.13
See application file for complete search history.

(56) References Cited

U.S. PATENT DOCUMENTS

| | | | | |
|---|---|---|---|---|
| 2,018,312 | A | * | 10/1935 | Moulton ............... F16F 9/0218 188/320 |
| 2,551,347 | A | * | 5/1951 | Stephenson ........ B60G 17/0152 267/64.14 |

(Continued)

FOREIGN PATENT DOCUMENTS

| | | | |
|---|---|---|---|
| DE | 102013002425 | B3 | 4/2014 |
| EP | 816712 | A3 | 1/1998 |

(Continued)

*Primary Examiner* — Christopher P Schwartz
(74) *Attorney, Agent, or Firm* — Keith D. Grzelak; Wells St. John P.S.

(57) ABSTRACT

A shock absorber is provided having a cylinder, a piston rod, a piston body, and a valve. The cylinder is configured to receive fluid. The piston body is connected to the piston rod and is configured to reciprocate within the cylinder between a compression chamber and a rebound chamber. The valve is provided by the piston body having a fluid flow port, a valve seat, a circumferential valving element, and a spring configured to urge the valve body into the valve seat. A primary damping valve and an auxiliary damping valve are also provided.

21 Claims, 67 Drawing Sheets

(56) References Cited

U.S. PATENT DOCUMENTS

| | | | |
|---|---|---|---|
| 2,740,500 A | 4/1956 | Brundrett et al. | |
| 4,113,072 A | 9/1978 | Palmer | |
| 4,465,299 A * | 8/1984 | Stone | F16F 9/46 |
| | | | 267/64.15 |
| 4,732,244 A | 3/1988 | Verkuylen | |
| 4,795,009 A | 1/1989 | Tanahashi et al. | |
| 5,123,671 A | 6/1992 | Driessen et al. | |
| 5,386,892 A | 2/1995 | Ashiba | |
| 5,487,455 A | 1/1996 | Feigel | |
| 5,611,413 A | 3/1997 | Feigel | |
| 5,738,190 A | 4/1998 | Deferme | |
| 5,810,128 A | 9/1998 | Eriksson | |
| 6,446,771 B1 | 9/2002 | Sintorn | |
| 7,441,640 B2 | 10/2008 | Russell | |
| 7,810,826 B2 | 10/2010 | McAndrews | |
| 8,069,964 B2 | 12/2011 | Deferme | |
| 8,967,344 B2 | 3/2015 | Park | |
| 9,080,634 B2 | 7/2015 | Nowaczyk | |
| 9,091,319 B2 | 7/2015 | Ishii | |
| 9,182,006 B2 | 11/2015 | Oshie | |
| 9,574,582 B2 | 2/2017 | Edmonson | |
| 9,797,466 B2 | 10/2017 | Kim | |
| 9,810,281 B2 | 11/2017 | Mori | |
| 9,816,578 B2 | 11/2017 | Galasso | |
| 10,180,171 B2 | 1/2019 | Laird | |
| 10,737,546 B2 | 8/2020 | Tong | |
| 2009/0145708 A1 | 6/2009 | Kim | |
| 2014/0048366 A1 | 2/2014 | Lee et al. | |
| 2016/0069471 A1 * | 3/2016 | Ewers | F16F 9/46 |
| | | | 137/489 |

FOREIGN PATENT DOCUMENTS

| | | |
|---|---|---|
| SE | 515321 C2 | 7/2001 |
| WO | WO2009078791 A1 | 6/2009 |
| WO | WO 2014/122318 A1 | 4/2014 |
| WO | WO 2014/122318 A1 | 8/2014 |

* cited by examiner

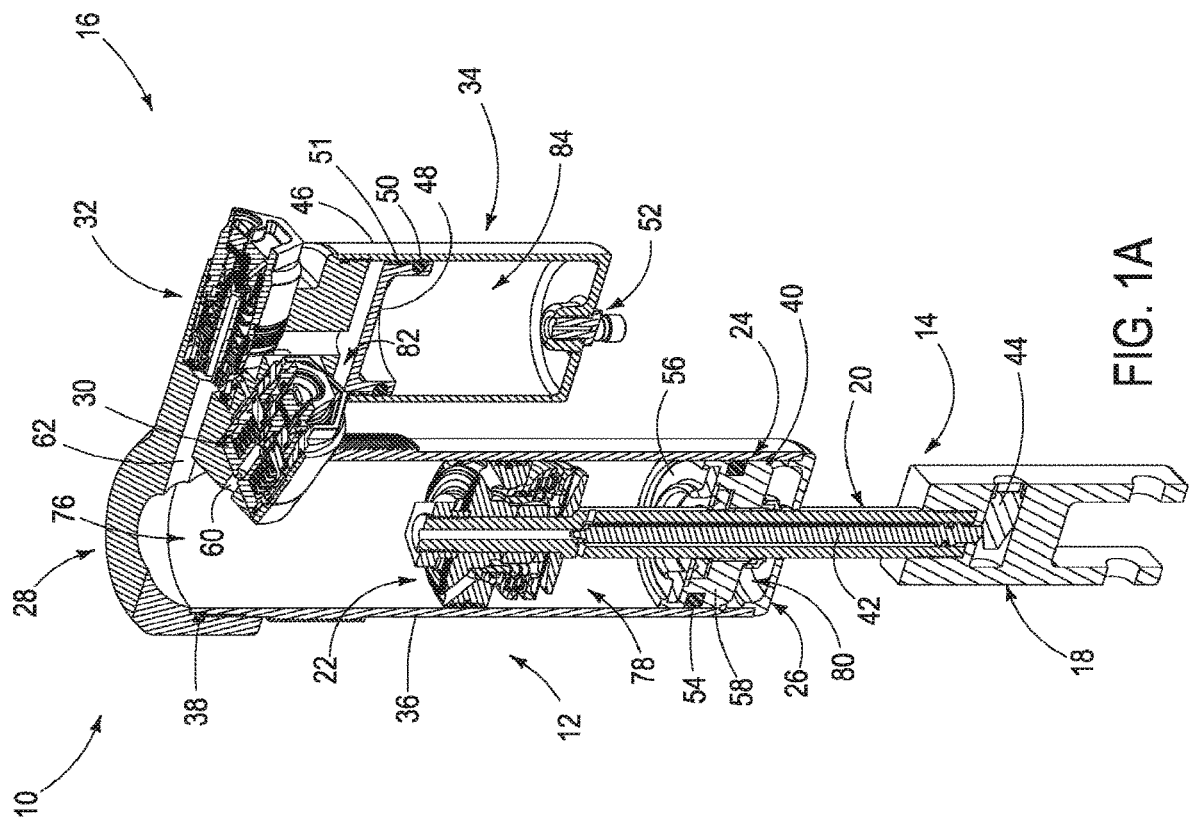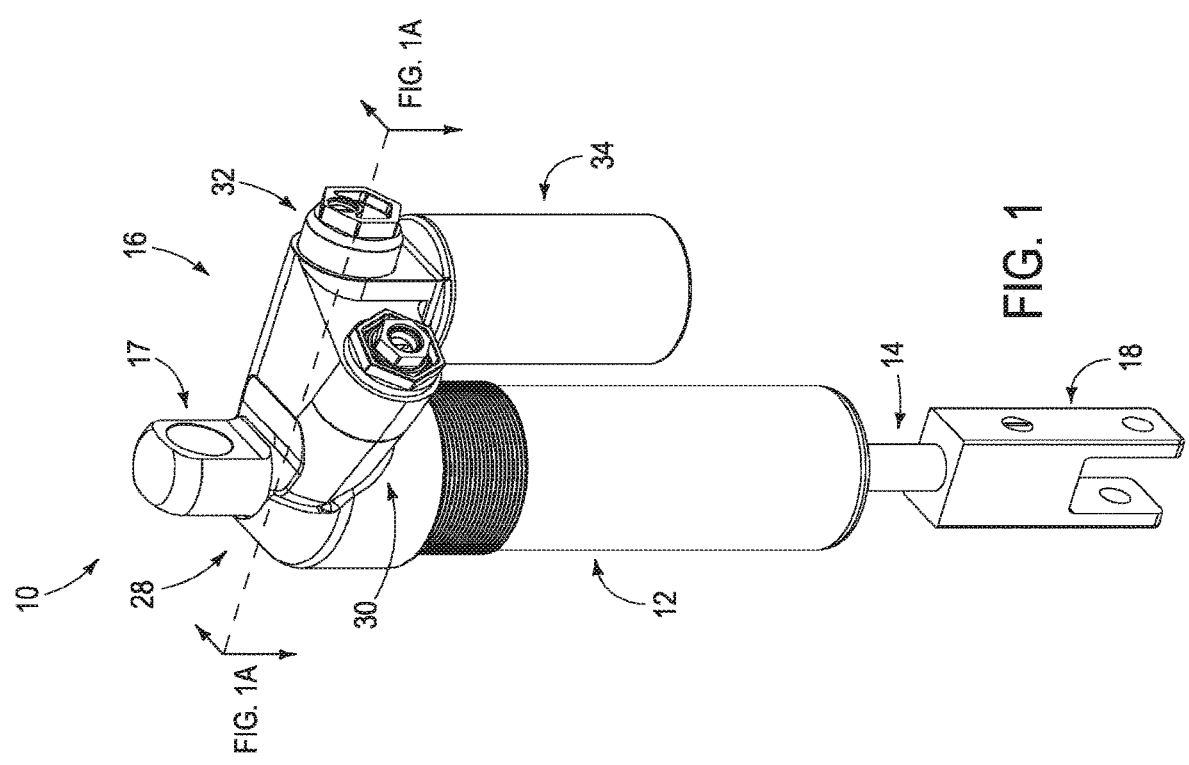

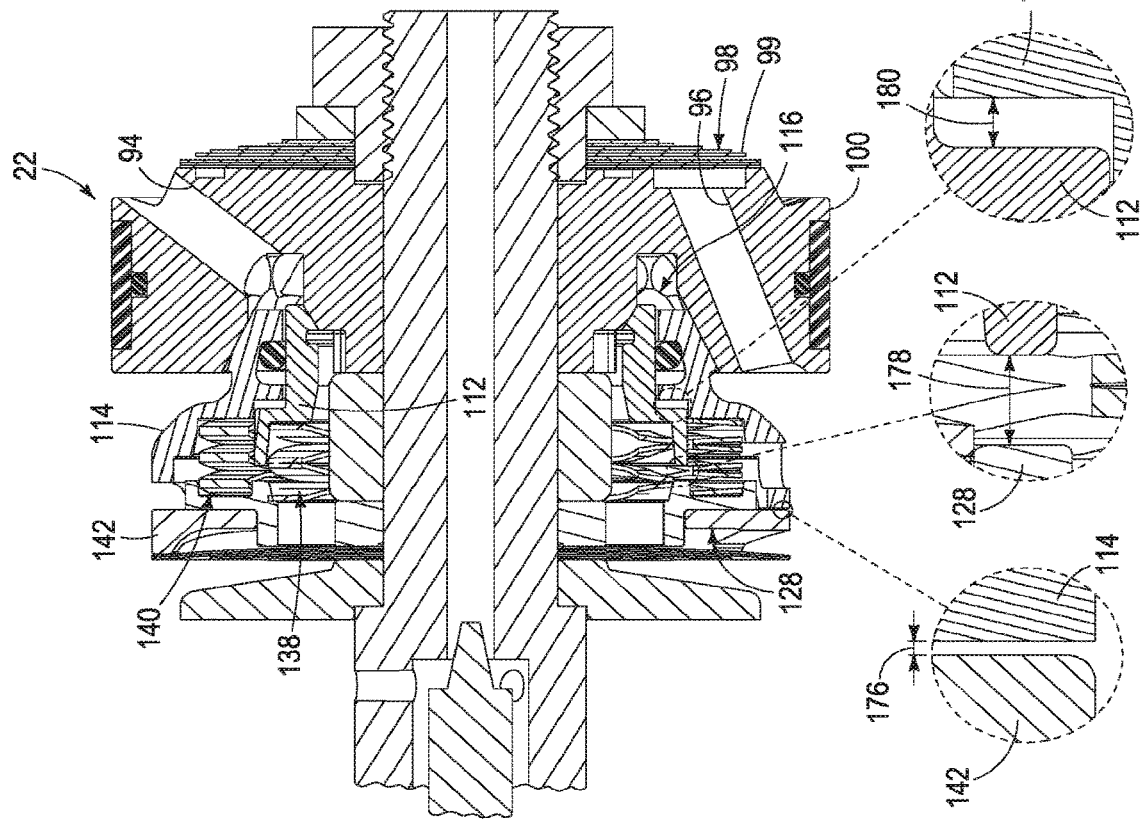
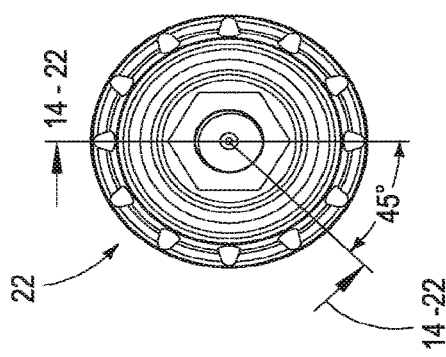

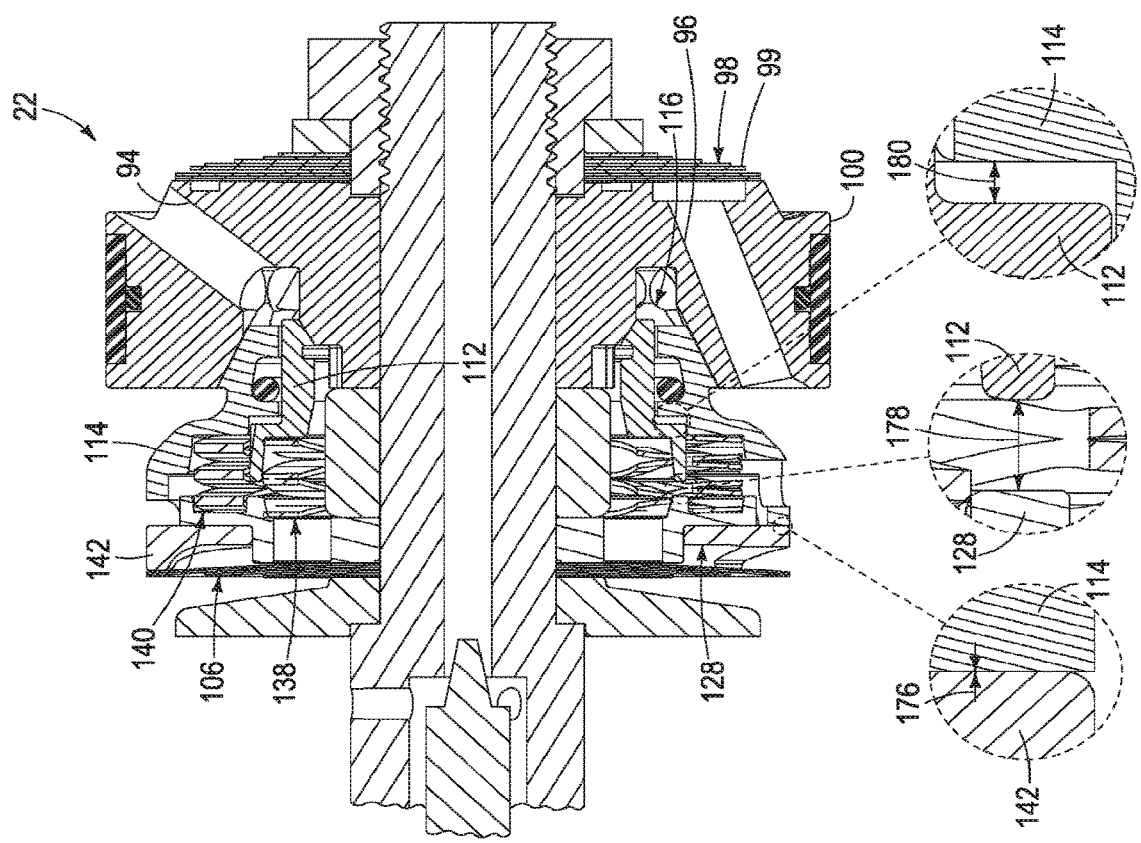

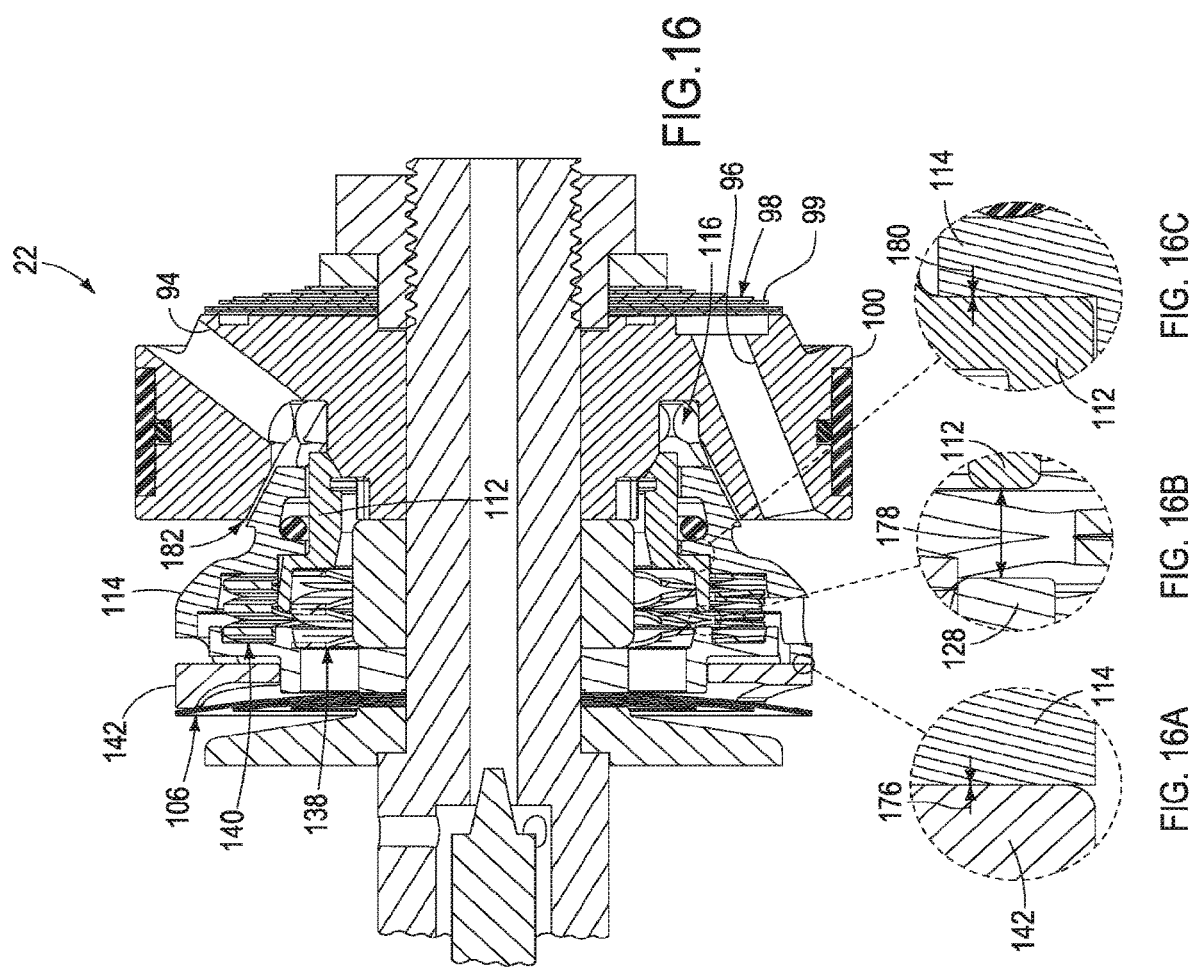

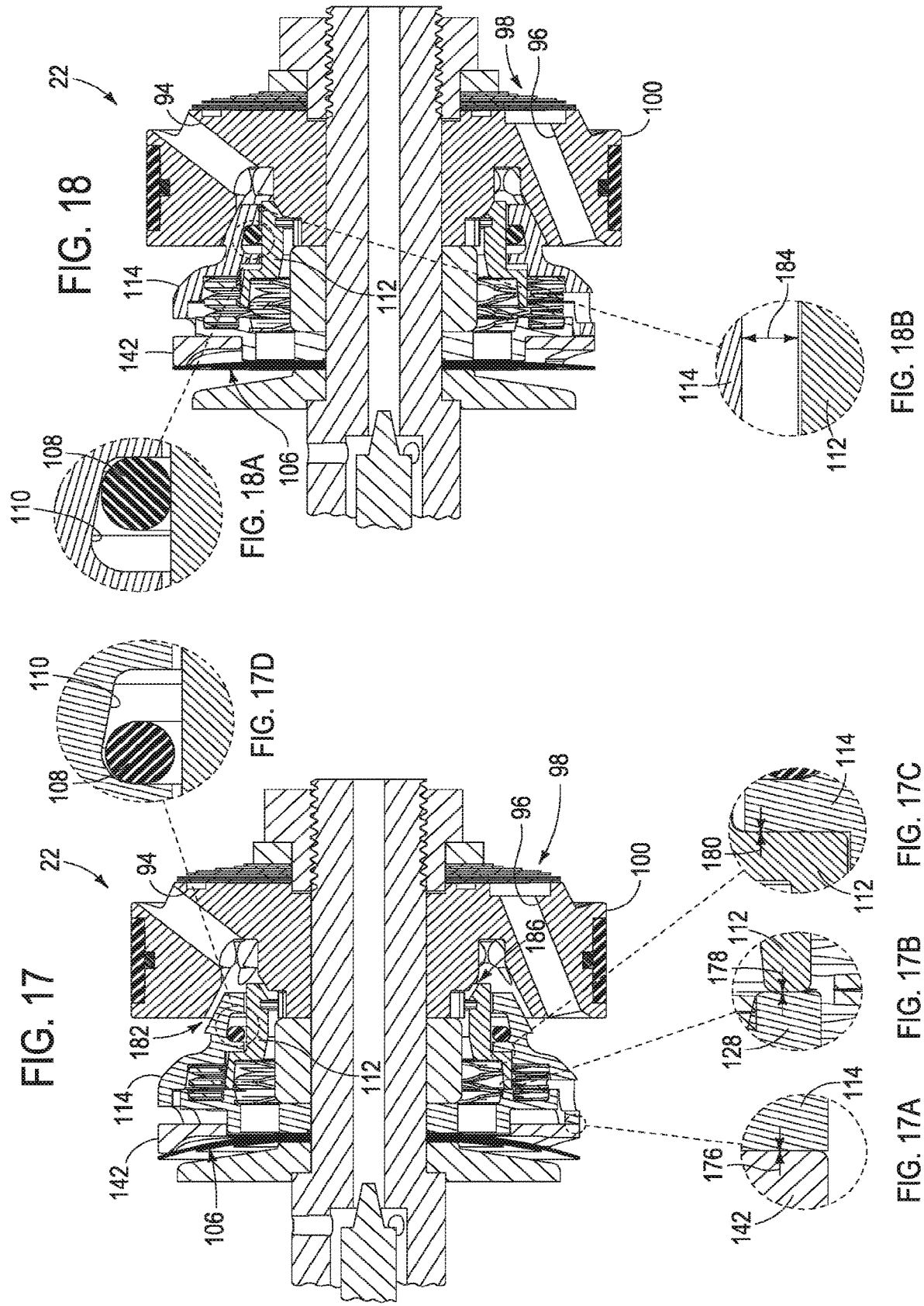

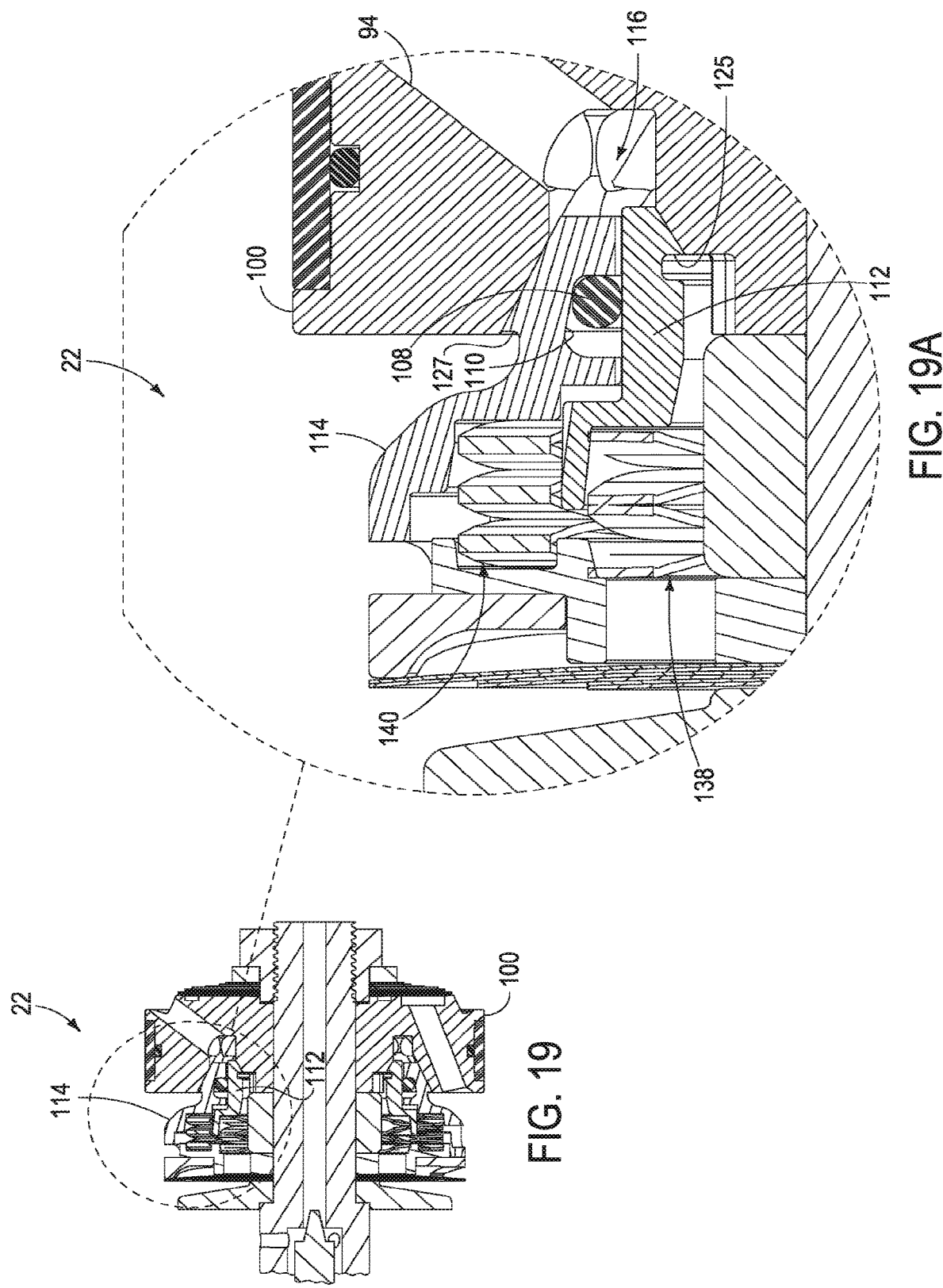

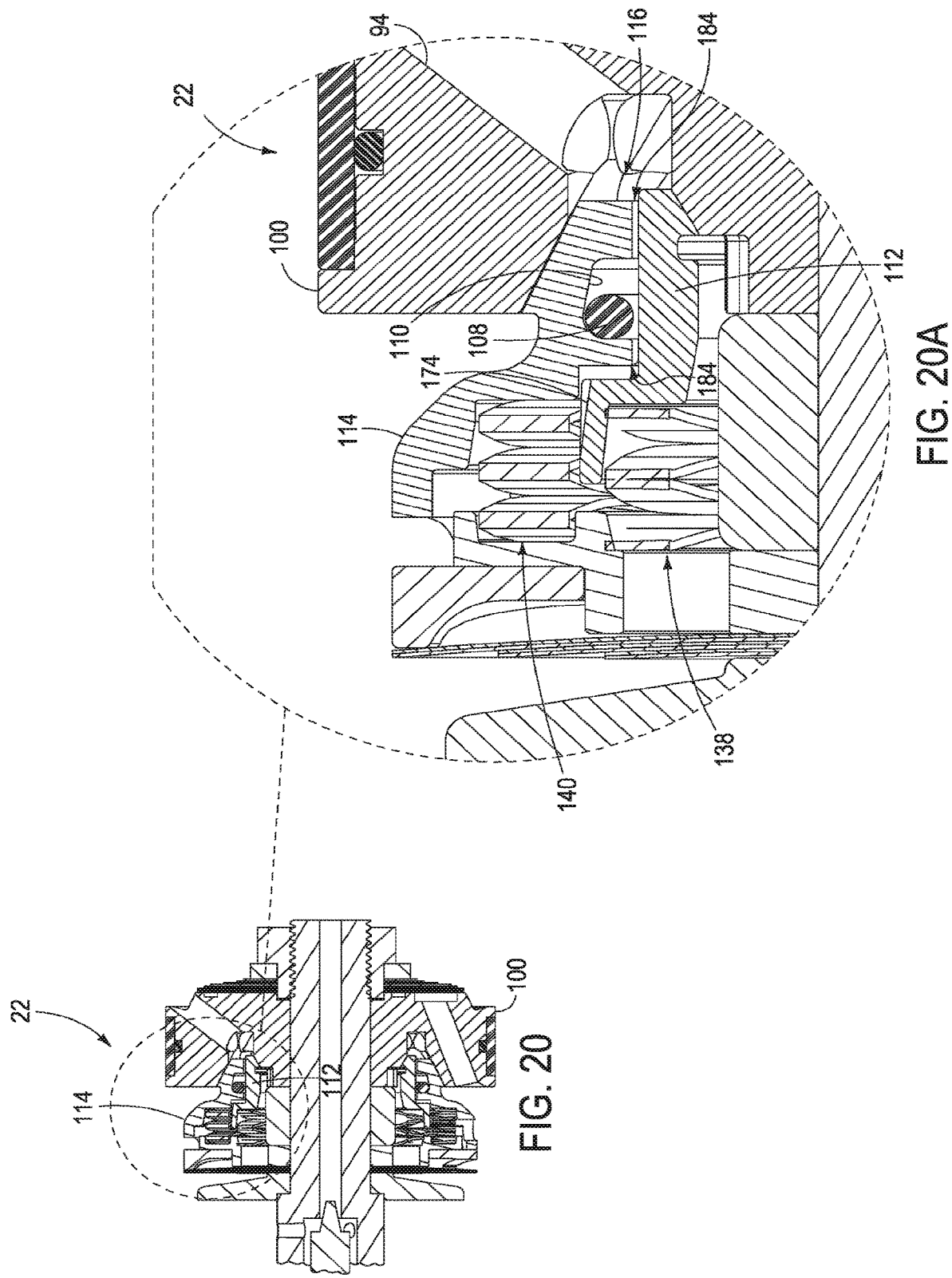

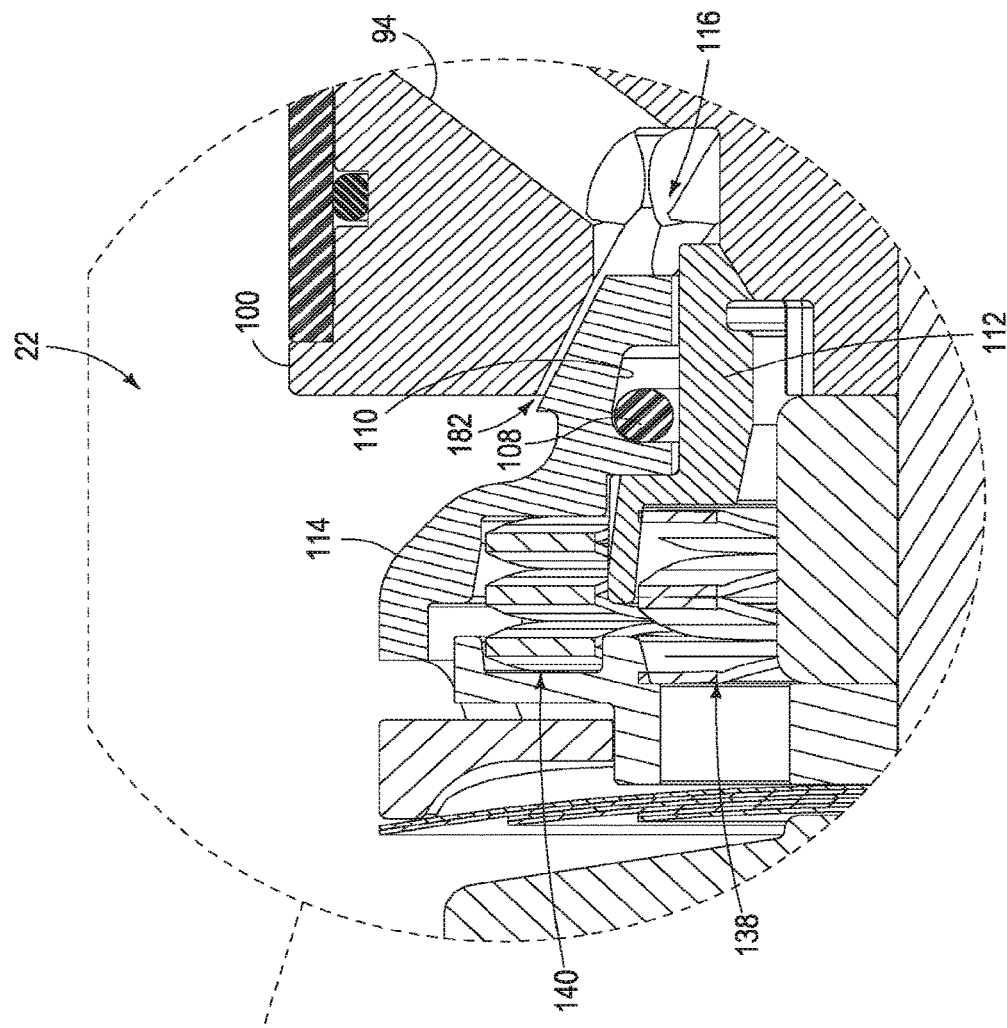
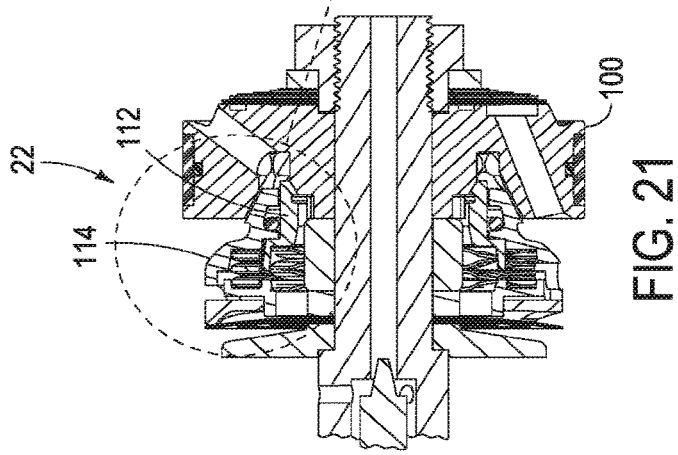
FIG. 21A
FIG. 21

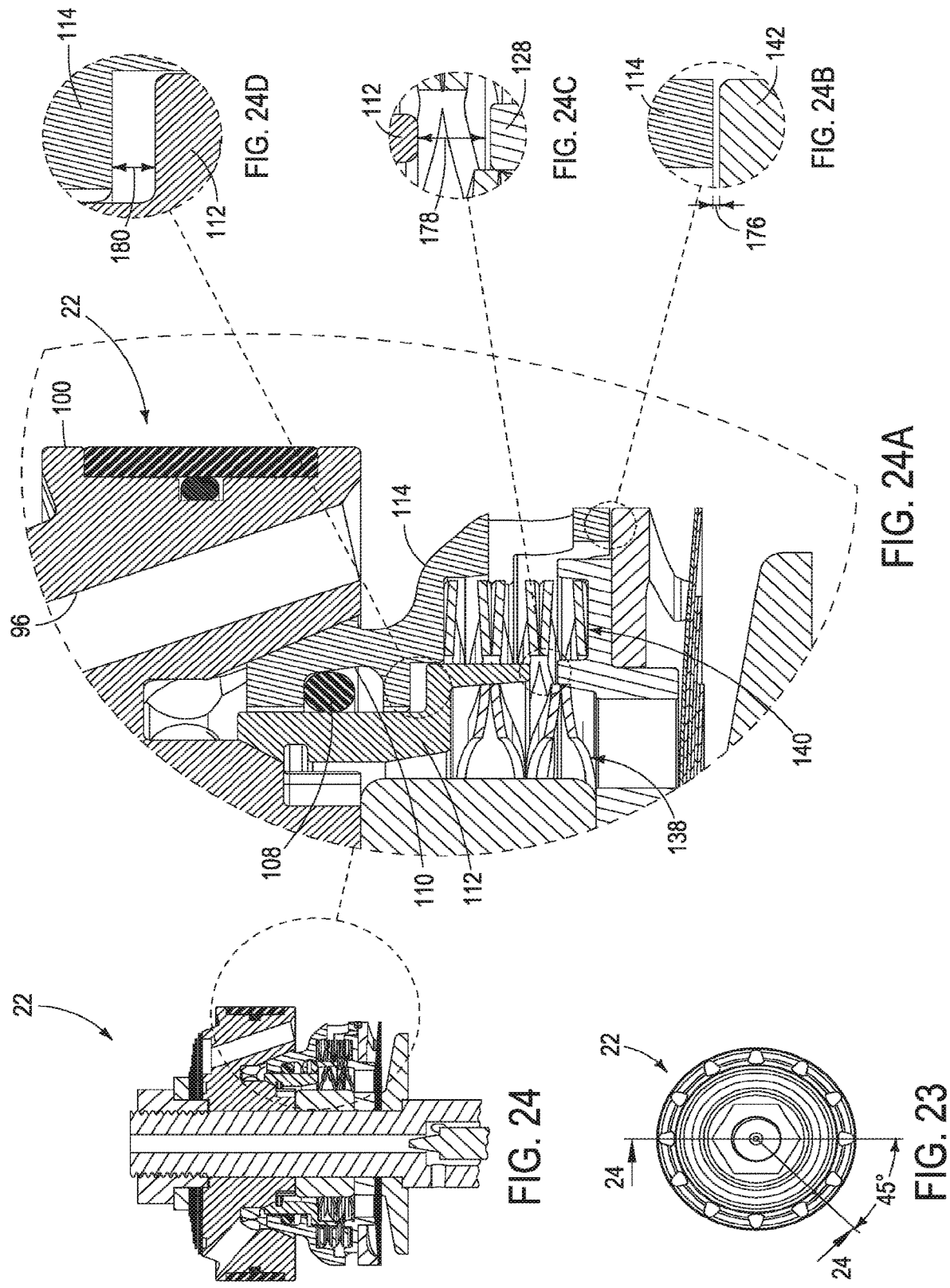

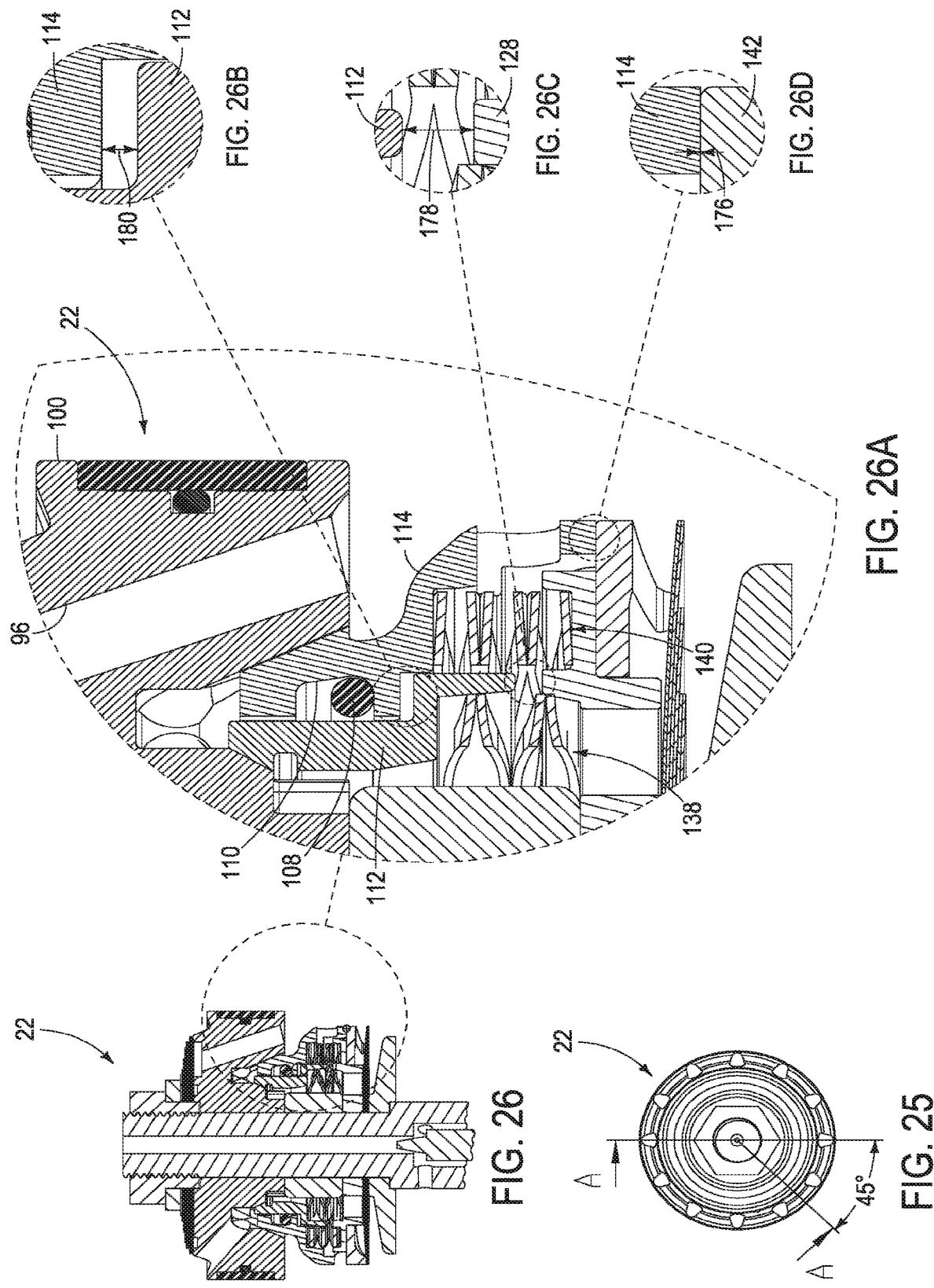

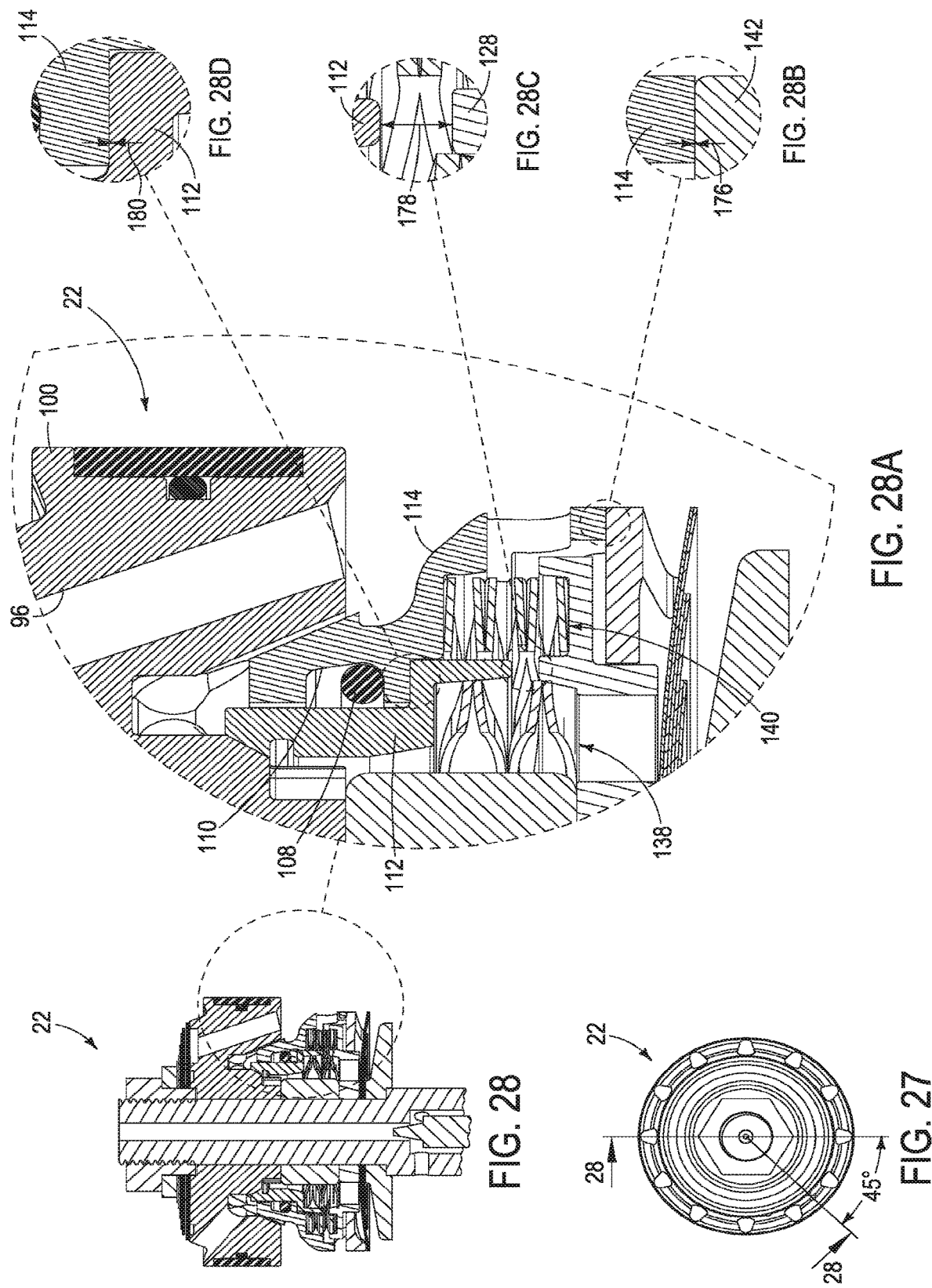

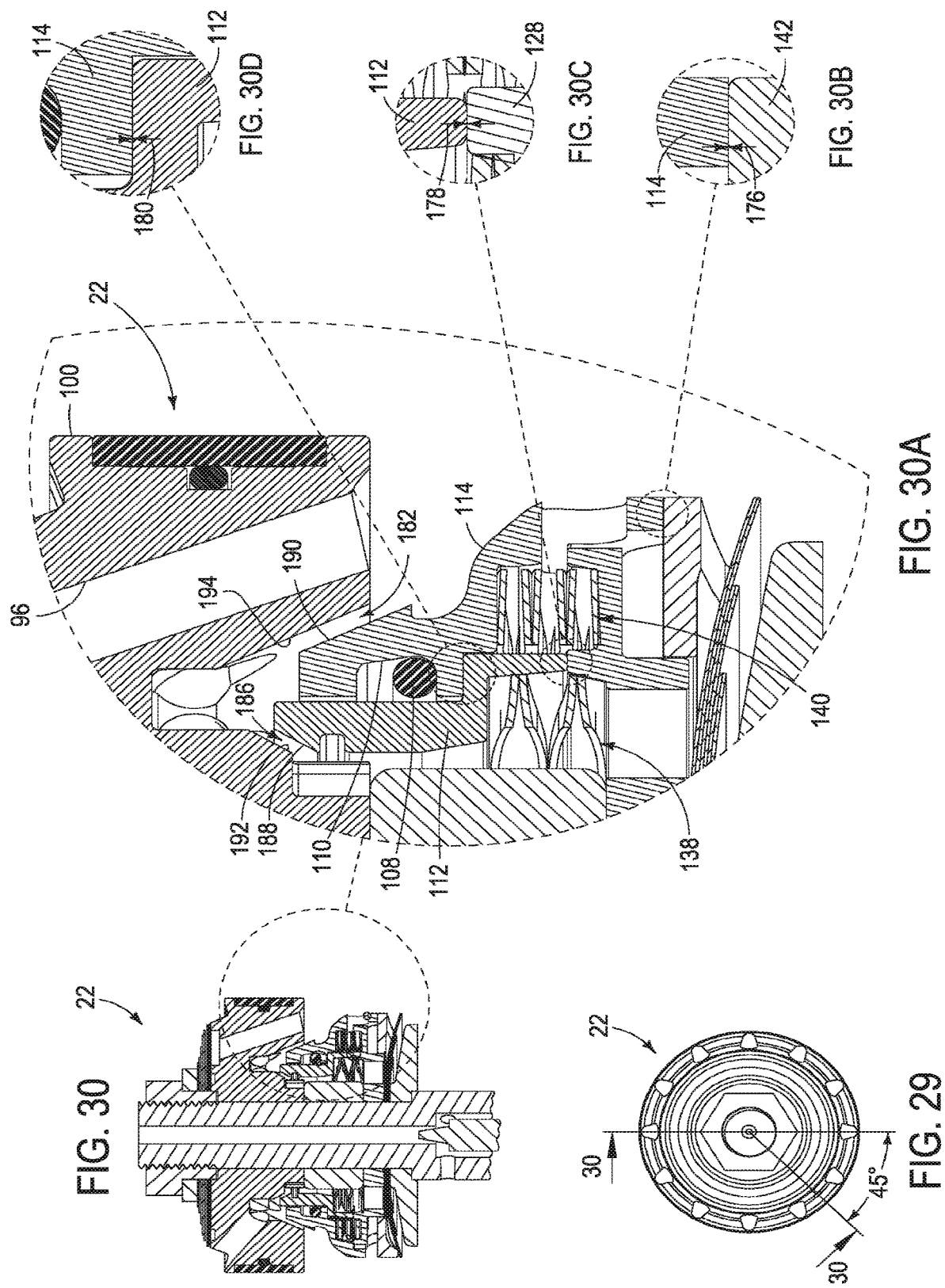

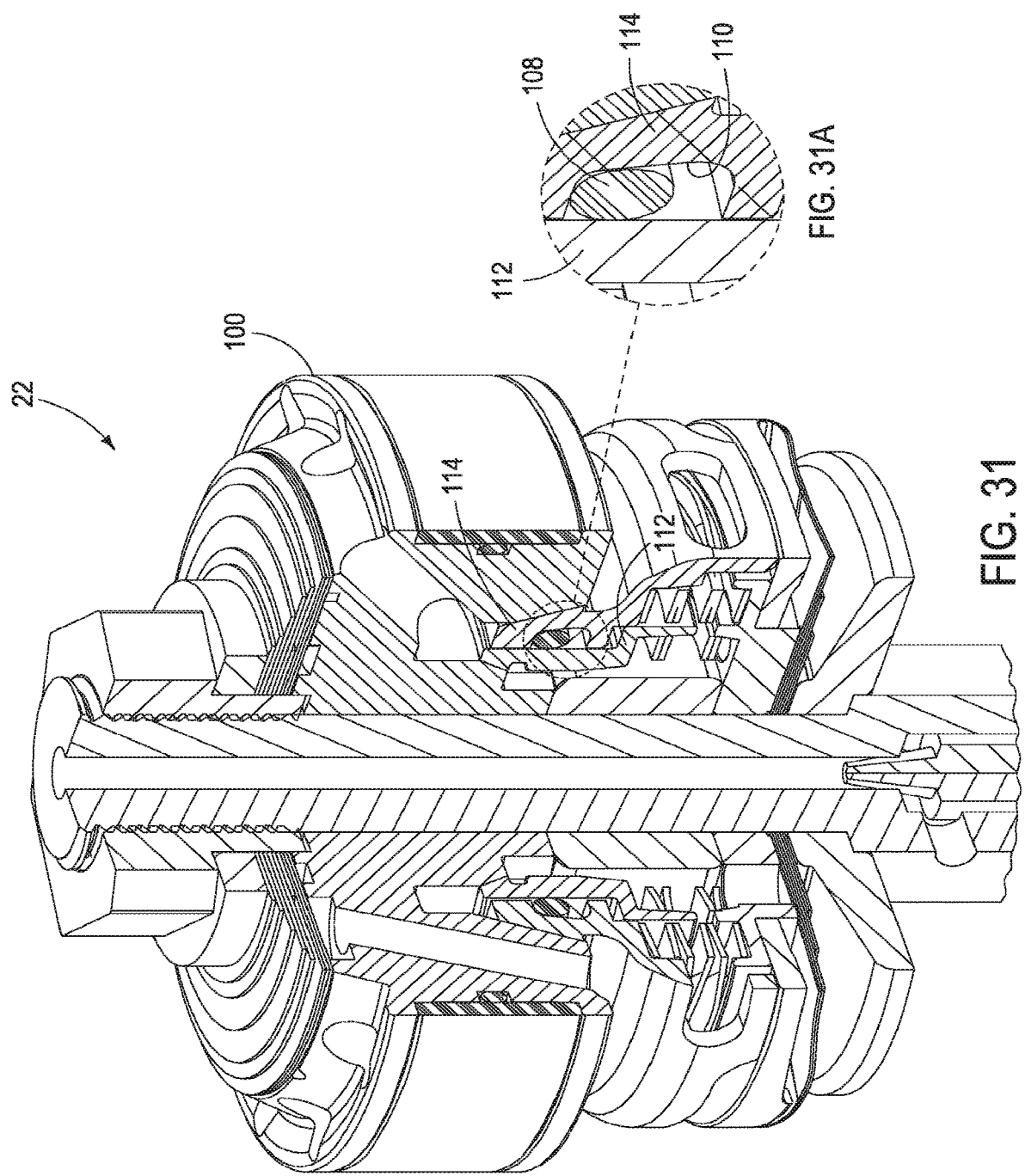

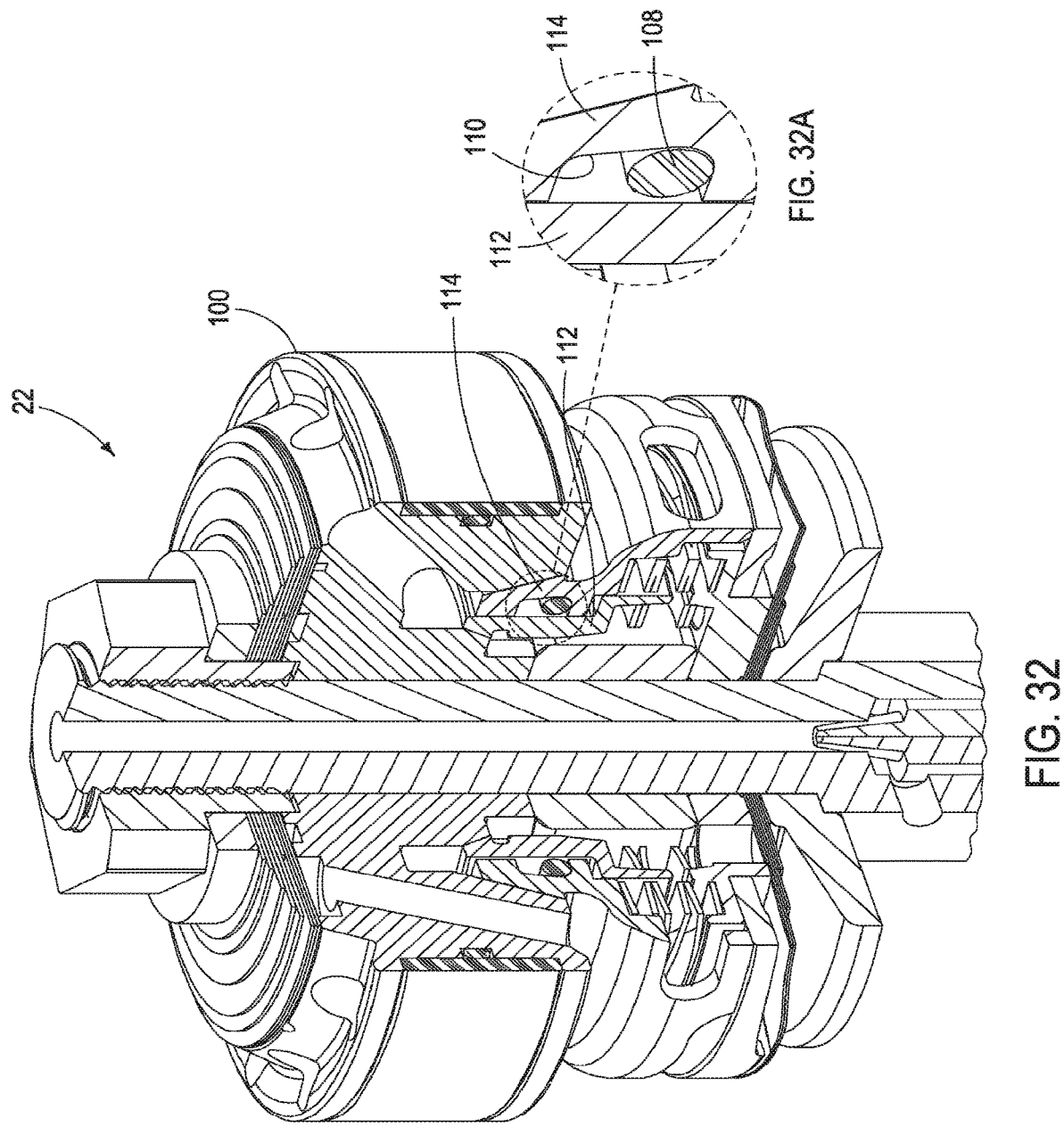

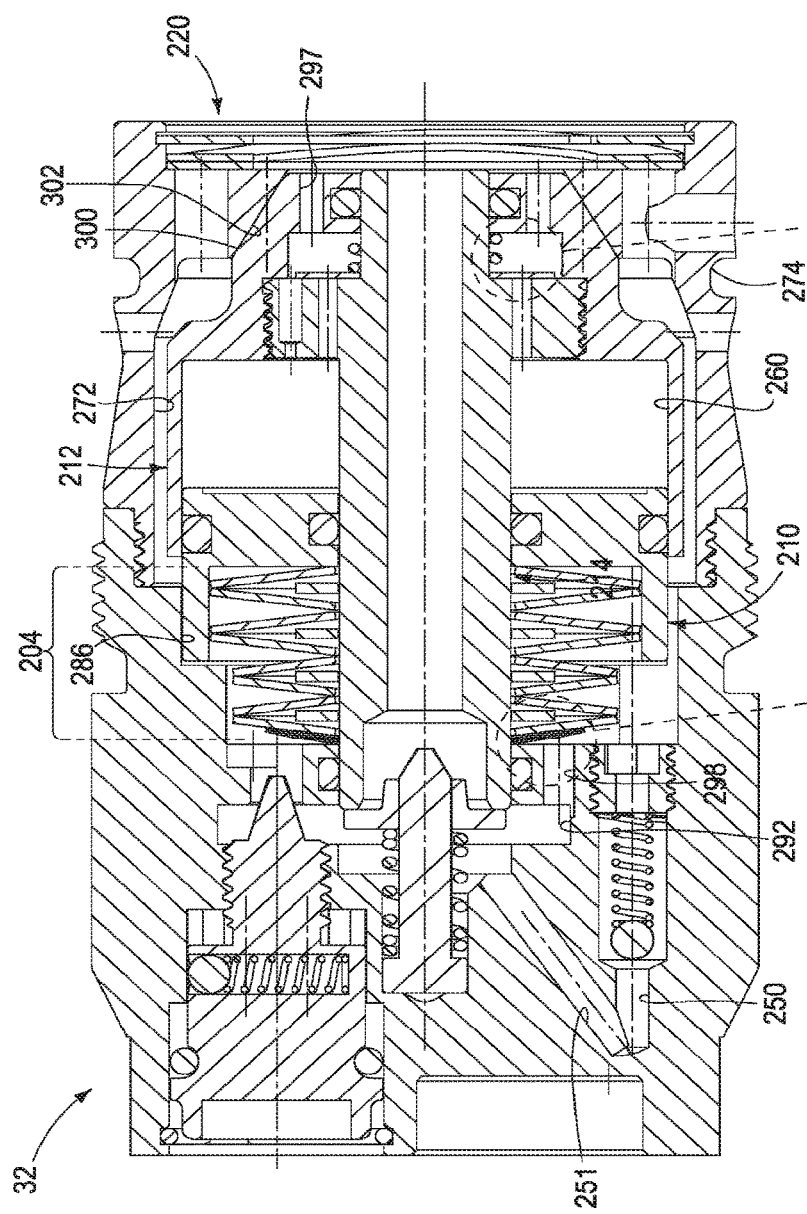
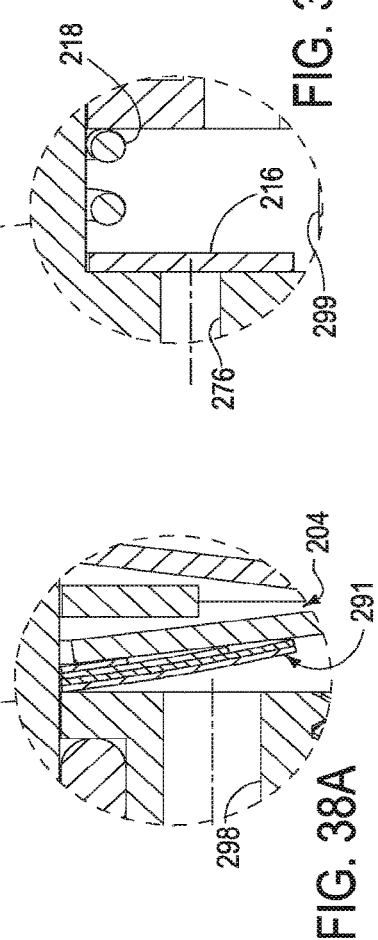
FIG. 38
FIG. 38A
FIG. 38B

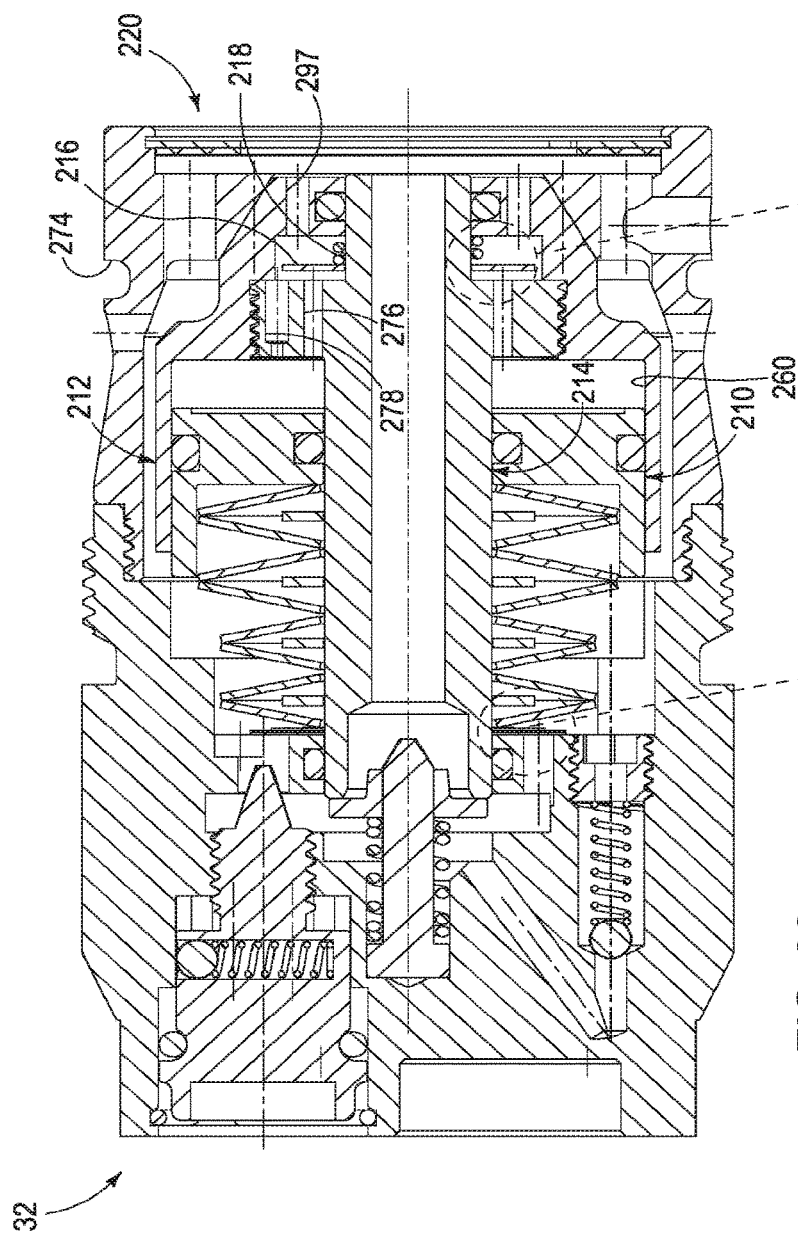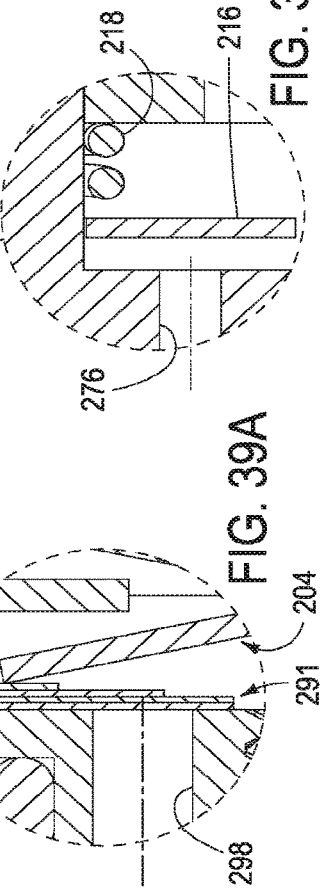
FIG. 39
FIG. 39A
FIG. 39B

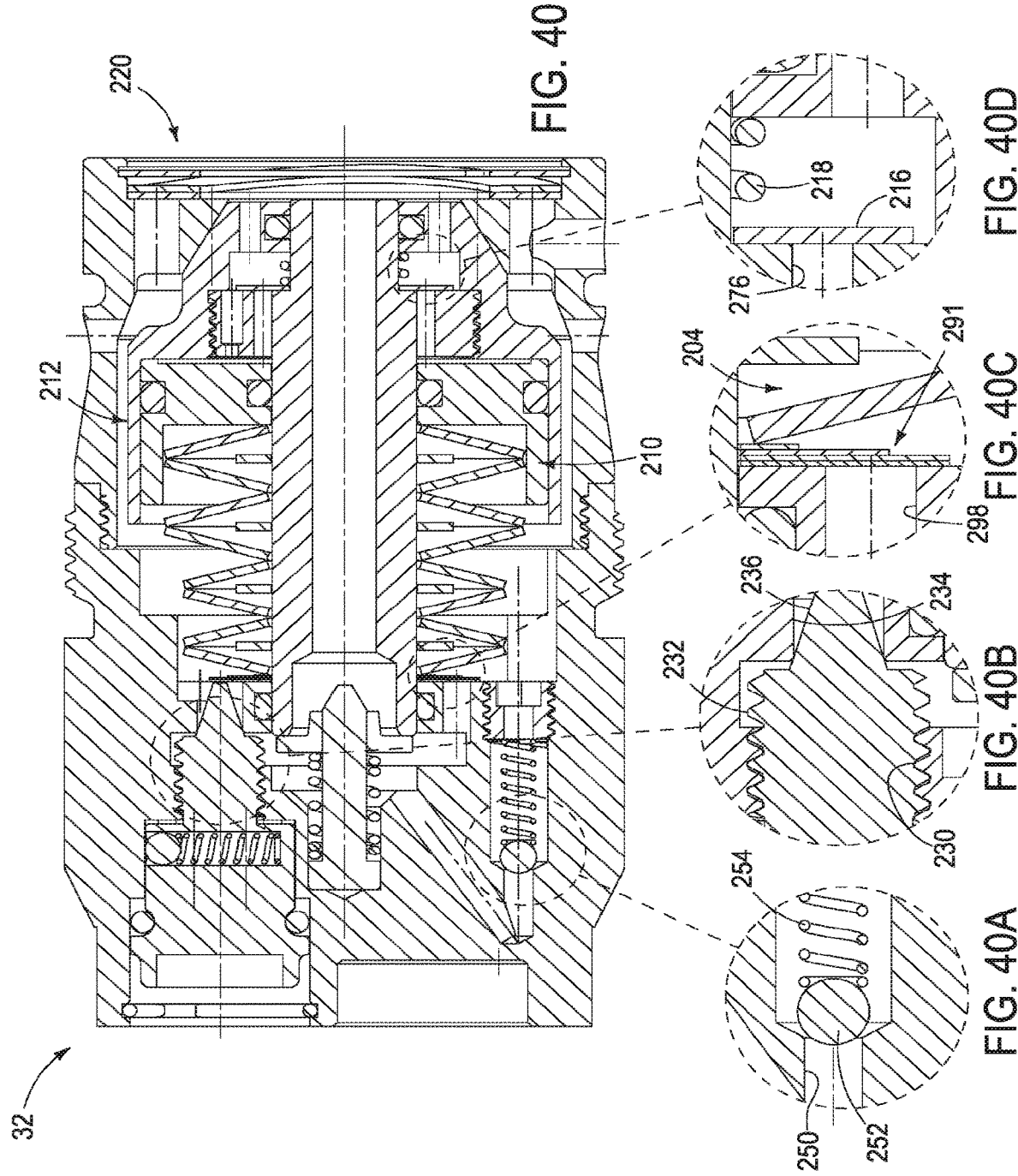

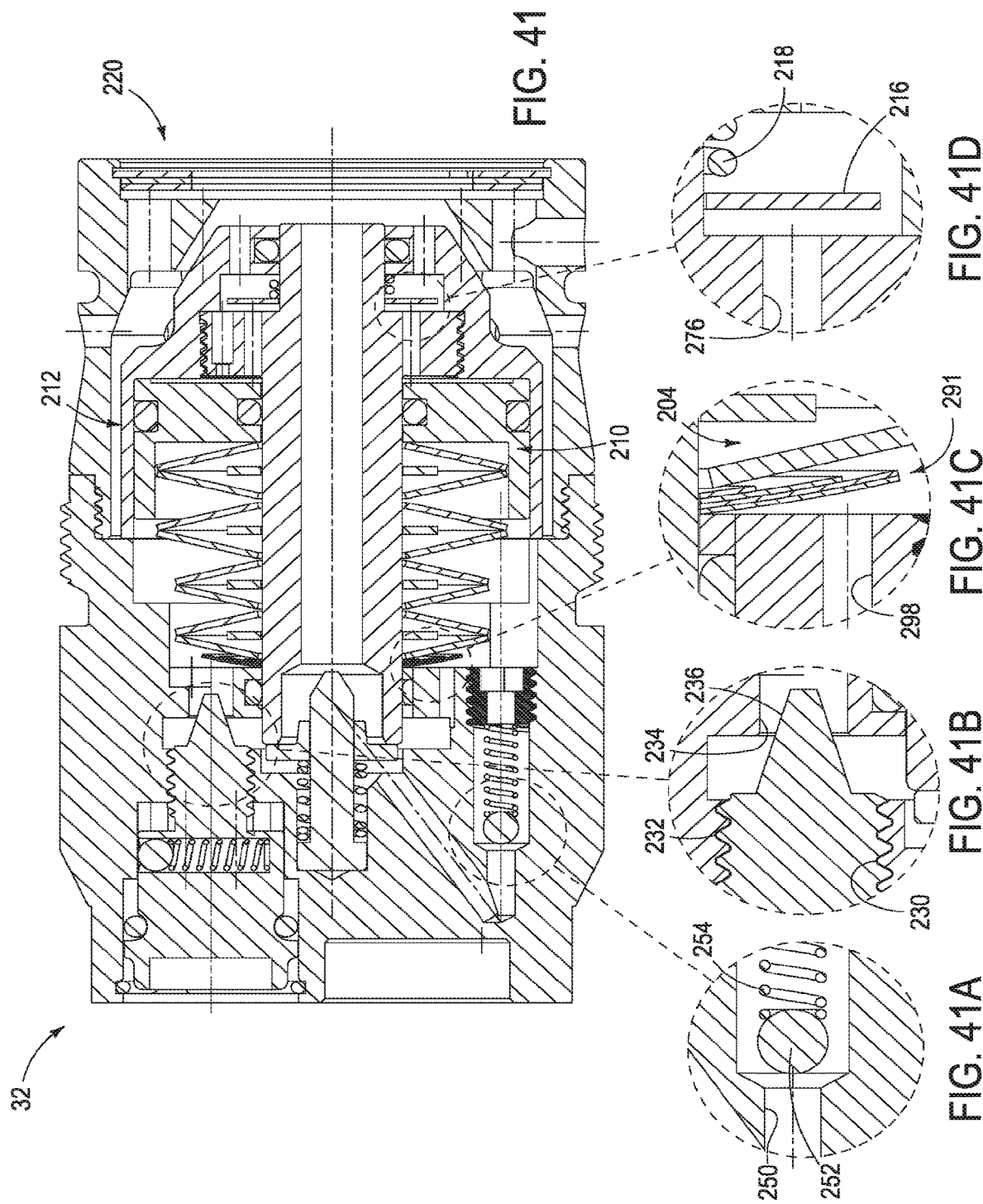

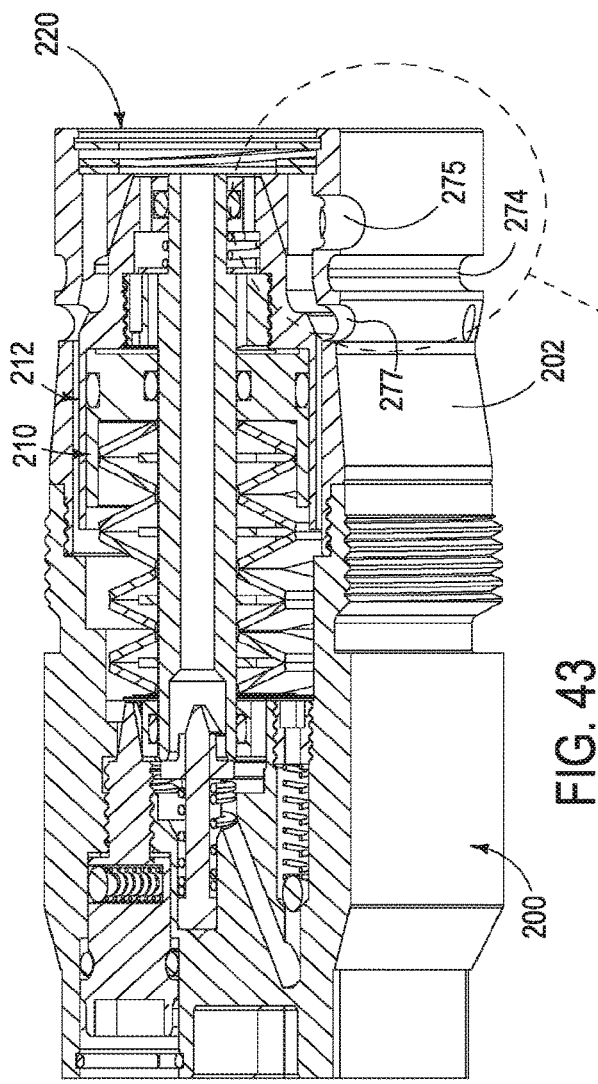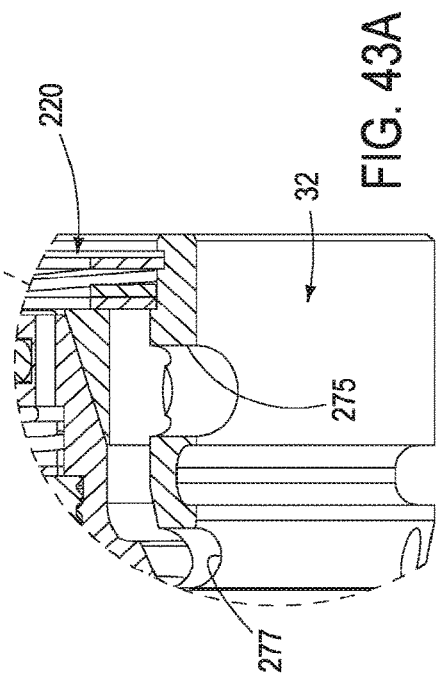
FIG. 43
FIG. 43A

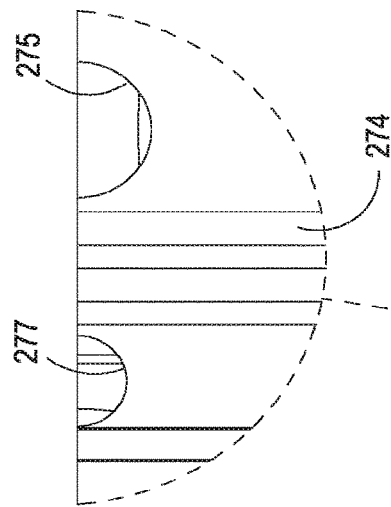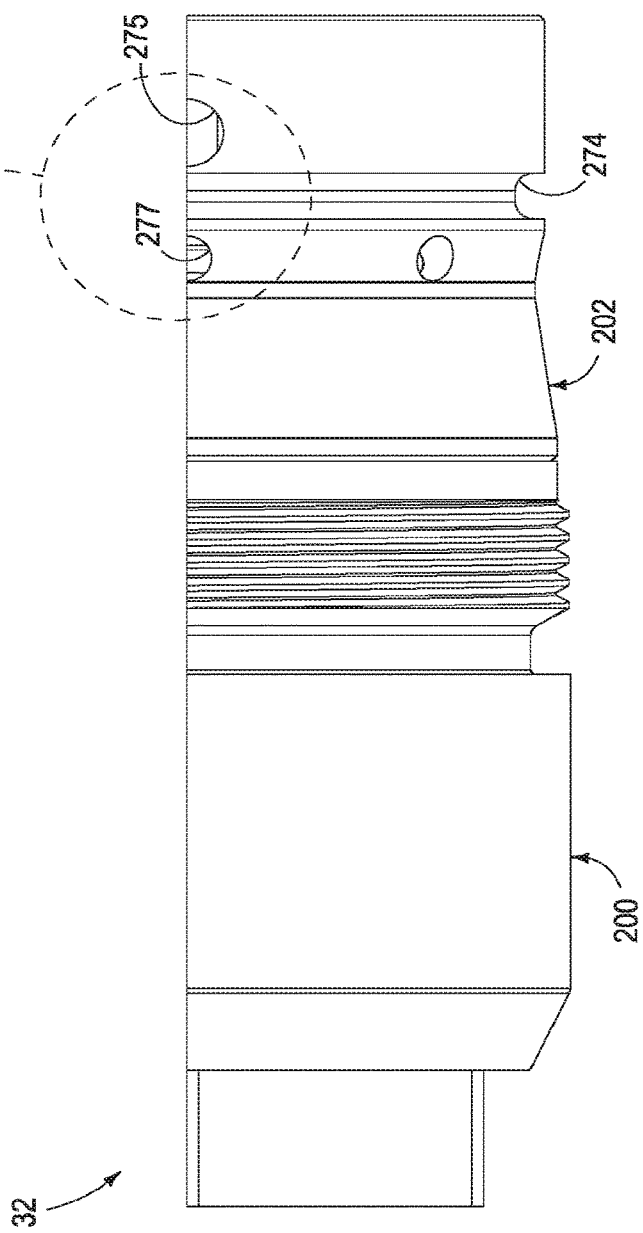

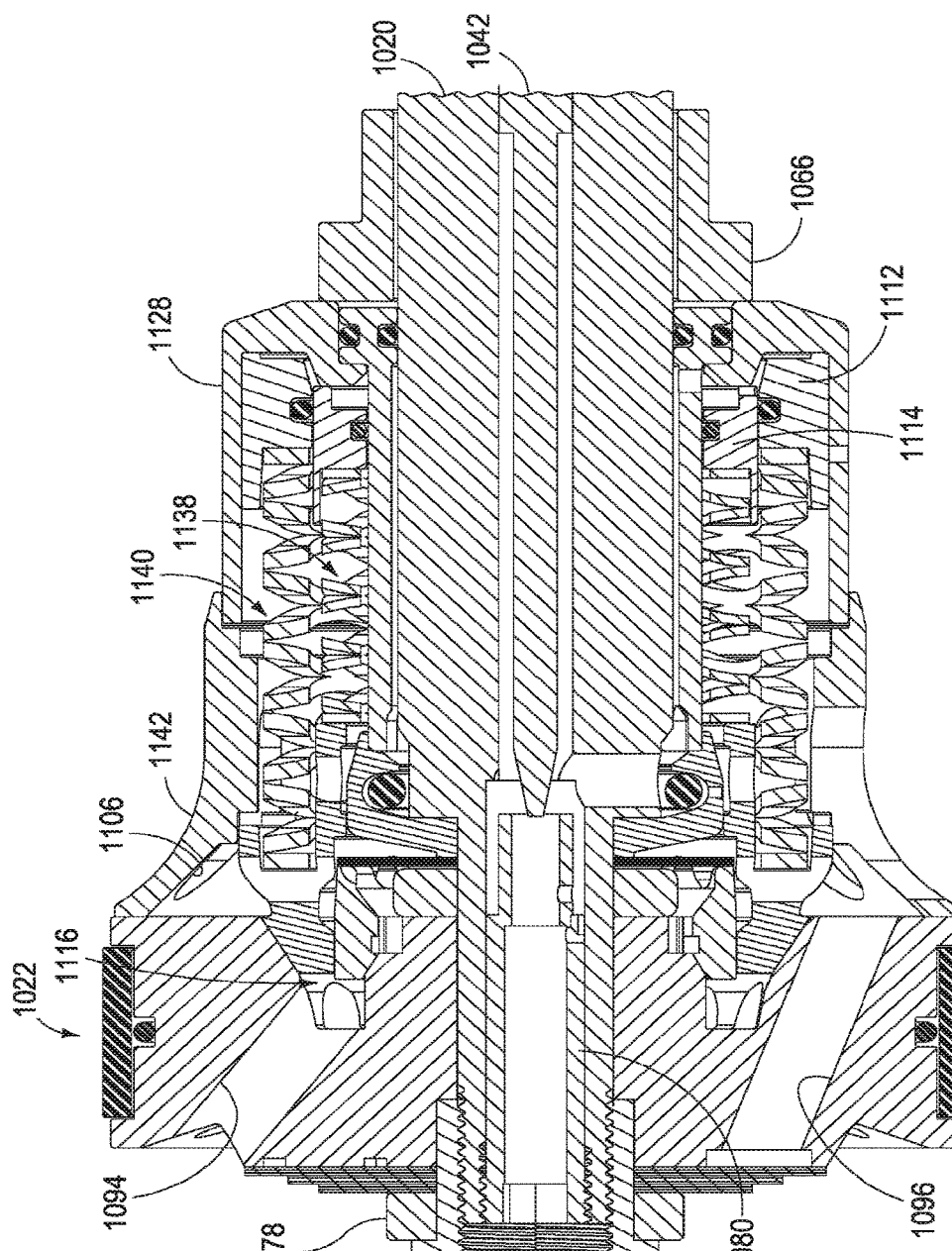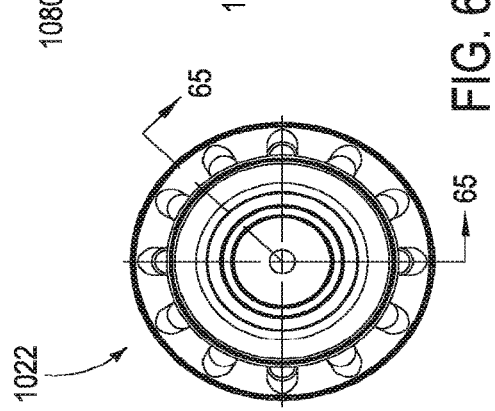

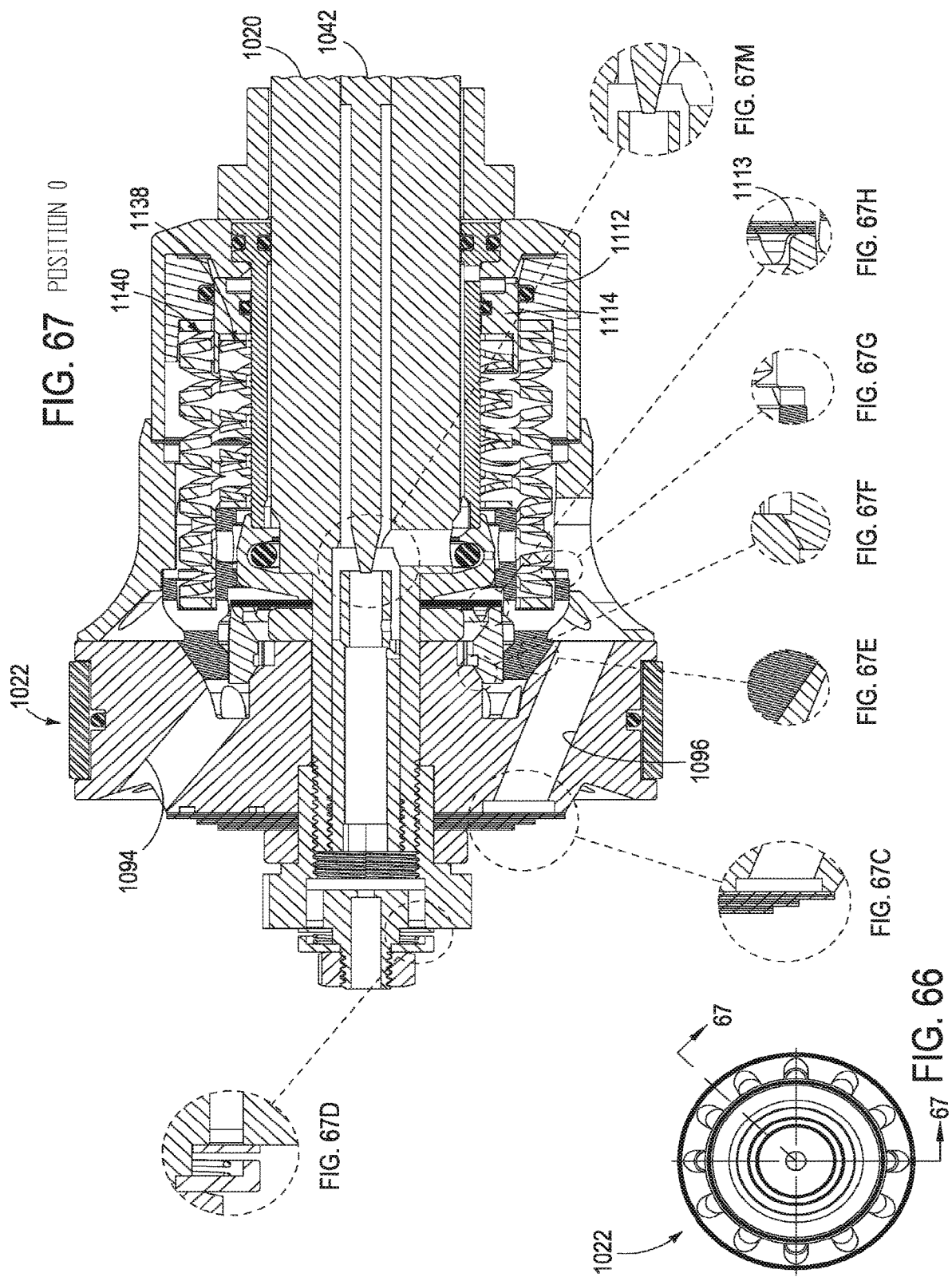

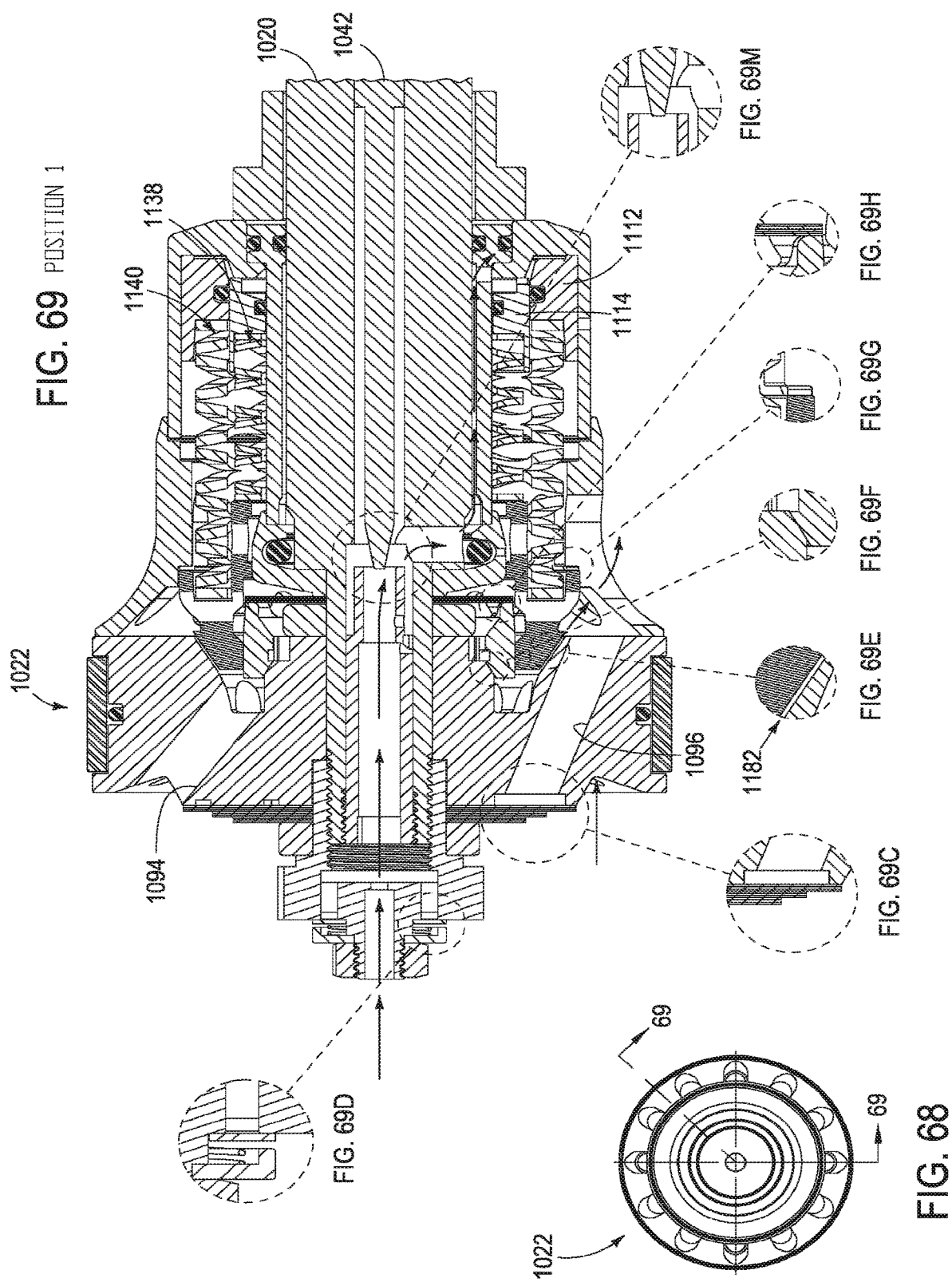

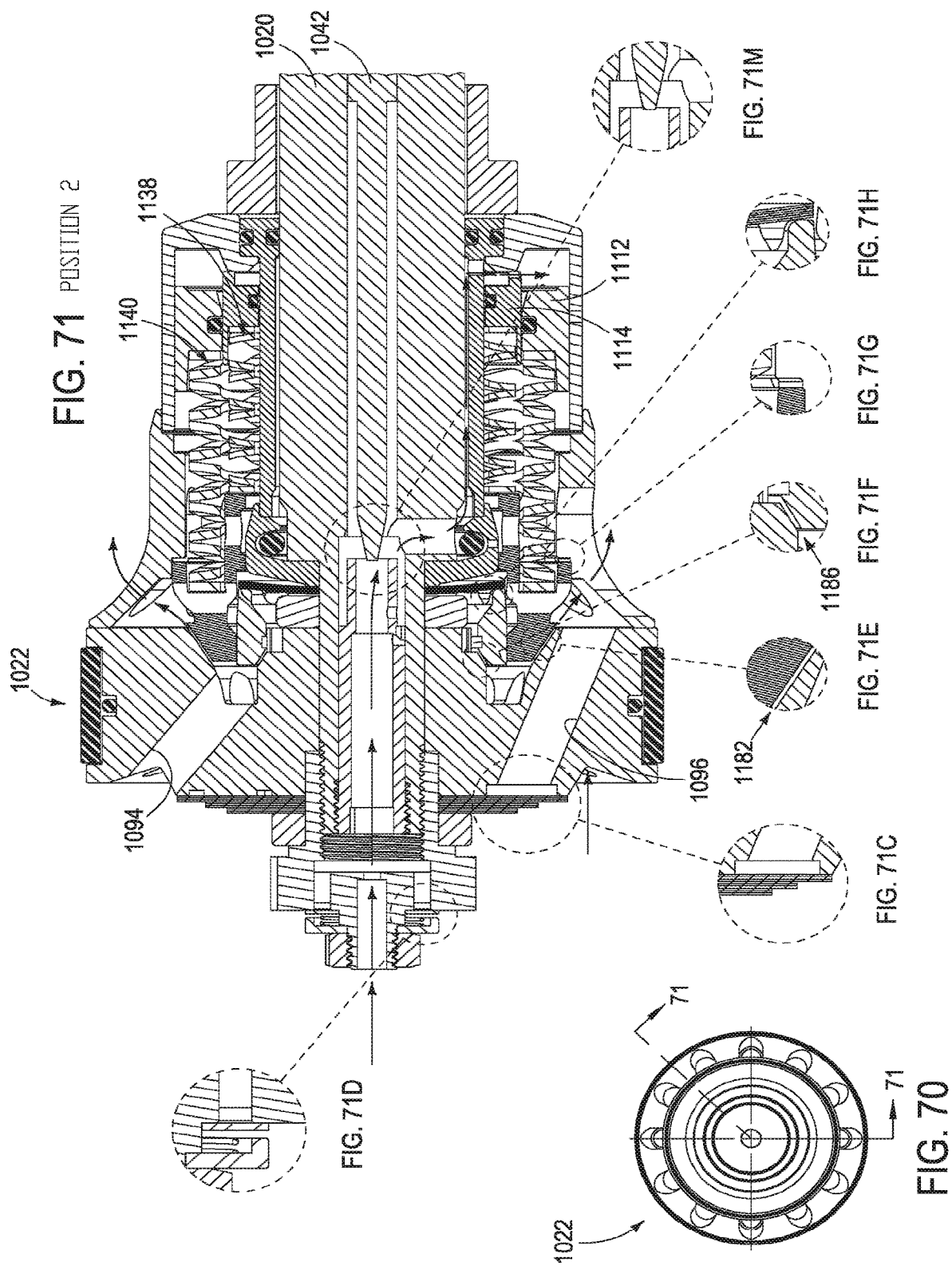

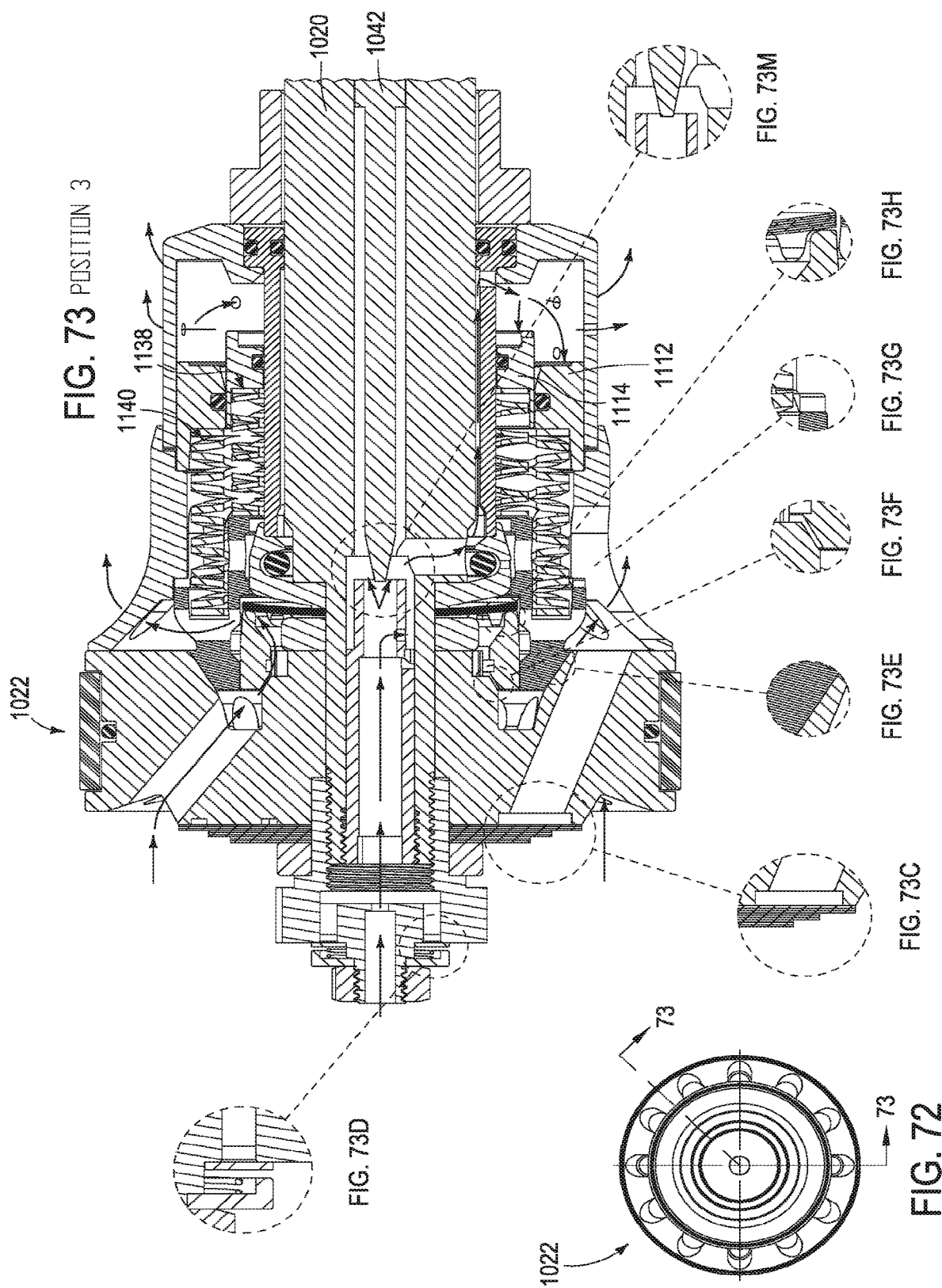

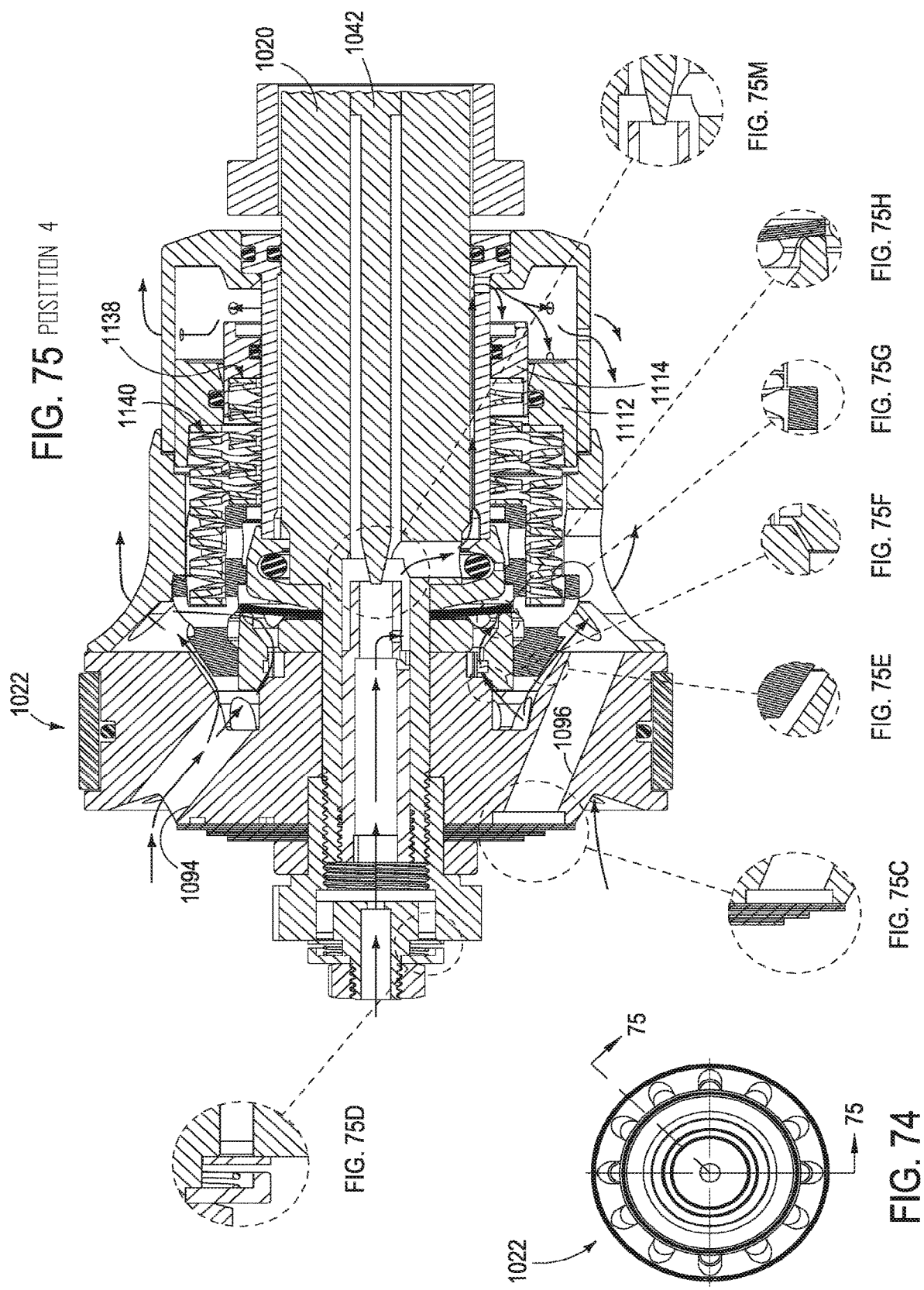

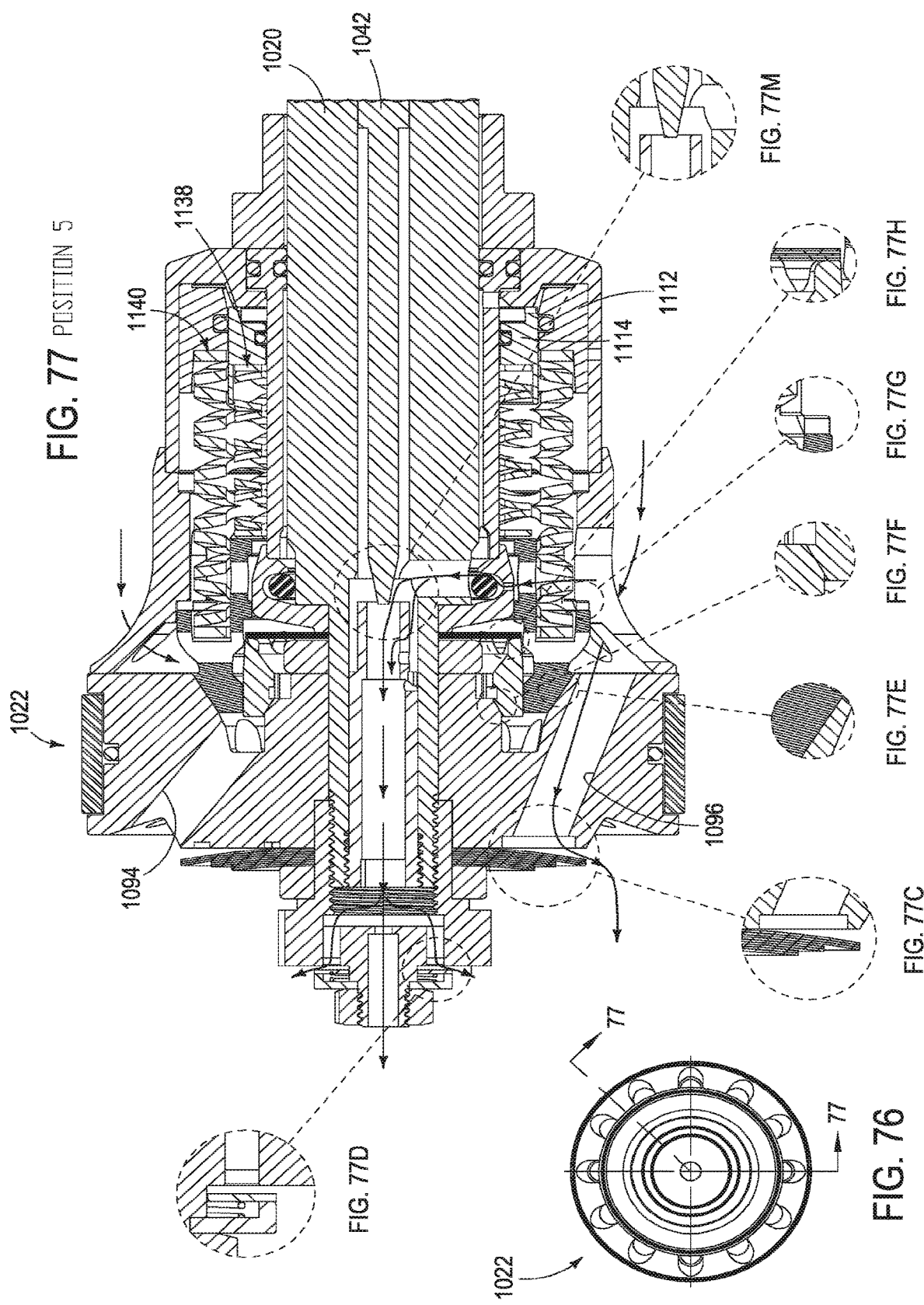

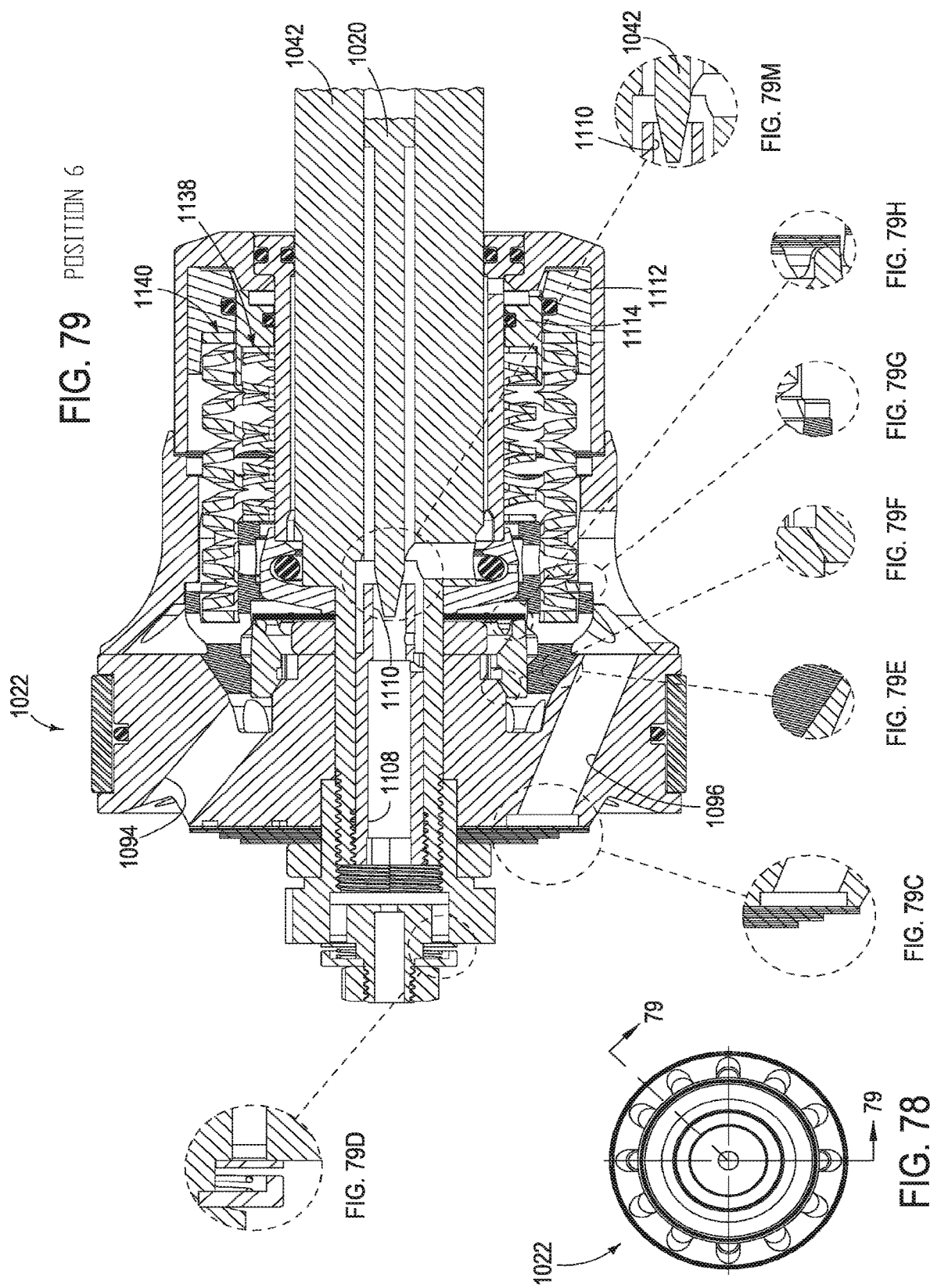

SHOCK ABSORBER ASSEMBLY

CROSS REFERENCE TO RELATED APPLICATION

This application claims priority to U.S. patent application Ser. No. 16/447,772, entitled "Shock Absorber Assembly", filed on Jun. 20, 2019; which claims priority to U.S. Provisional Patent Application Ser. No. 62/687,708, entitled "Shock Absorber Assembly", which was filed on Jun. 20, 2018; the entirety of which is incorporated by reference herein.

TECHNICAL FIELD

This disclosure pertains to a hydraulic or pneumatic shock absorbers and damping and/or shock mitigating valves and mechanisms for mitigation of shock transmission. More particularly, this disclosure relates to shock absorbers and damping and/or shock mitigating valves and control of shock absorber cavity pressures where impact force of a moving object is absorbed by causing a piston to displace hydraulic fluid from a cylinder through metering orifices, sprung bodies, fluid feedback loops and/or valves.

BACKGROUND OF THE INVENTION

Shock absorbers and damping valves have been used on a number of vehicles including automobiles, trucks, motorcycles, and off-road vehicles to dampen shock transmission from a vehicle wheel to a frame or structure. Such shock absorbers and damping valves have also been used on industrial machines and processing equipment to dampen shock transmission between parts or subassemblies. They have also been used on any of a number of various operating mechanism and machines, including weapons systems and mitigation systems for a pipe fluid shock transmission system. However, certain environments impart a broad range of high speed, large deformation, high speed, small deformation, low speed, large deformation, and low speed, small deformation. Presently used shock absorbers and valve assemblies fail to provide optimal performance across a full spectrum of such shock transmission conditions and further improvements are needed to provide higher order response characteristics and tunability in order to maximize performance, particularly for racing and competition conditions.

SUMMARY OF THE INVENTION

A hydraulic shock absorber and auxiliary hydraulic fluid valve assemblies are provided for tuning and mitigating shock transmission over a broad range of impact speeds, forces, and volumetric fluid displacements for vehicles, machinery, and equipment.

According to one aspect, a shock absorber is provided having a cylinder, a piston rod, a piston body, a valve, and a housing. The cylinder is filled with a fluid. The piston rod reciprocates within the cylinder. The valve is carried by the piston body having: at least one flow port through the piston body and communicating with a compression chamber end of the valve body; a first valve seat formed at least in part by the piston body; a second valve seat formed at least in part by the piston body; an annular valve chamber defined in part by the piston body and fluid coupled with the at least one flow port; at least one circumferential valving element configured to mate and demate with the first valve seat and the second valve seat; and at least one spring configured to urge the at least one valving element in movable mating and demating relation against the first valve seat and the second valve seat, the at least one valve seat demated from the first valve seat and the second valve seat responsive to fluid pressure in the annular valve chamber compressing the at least one spring to provide a first fluid flow path and a second fluid flow path at least one of radially inwardly and outwardly of the first fluid flow path, and forming a first fluid flow path with a first flow diversion angle and a second fluid flow path with a second flow diversion angle less than the first flow diversion angle. The housing includes an auxiliary reservoir communicating with one of the compression chamber and the rebound chamber and a by-pass passage penetrating an inside of the piston rod in a longitudinal direction of the piston rod, the housing configured to form an auxiliary passage connected to one of the compression chamber and the rebound chamber.

According to another aspect, a shock absorber piston is provided having a piston body and a valve. The valve is carried by the piston body having: at least one flow port through the piston body and communicating with a compression chamber end of the valve body; an annular volumetric expansion chamber defined in part by the piston body and fluid coupled with the at least one flow port; a first annular valve seat carried by the piston body proximate the annular volumetric expansion chamber; a second annular valve seat carried by the piston body proximate the annular volumetric expansion chamber; at least one valving element configured to mate and demate with the first valve seat and the second valve seat; and at least one spring configured to urge the at least one valving element in mating and demating relation against the first valve seat and the second valve seat, the at least one valving element demated from the first valve seat and the second valve seat responsive to fluid pressure in the annular volumetric expansion chamber to compress the at least one spring and provide a first fluid flow path having a first flow diversion angle and a second fluid flow path with a second flow diversion angle less than the first flow diversion angle.

According to yet another aspect, a shock absorber valve is provided having a valve body, an outer piston, an inner piston, a spring, a compression fluid passage, and a rebound fluid passage. The valve body has an axial bore forming an annular valve seat at one end. The outer piston is carried in the axial bore having an inner axial bore opposite the valve seat. The inner piston slidably received in the axial bore of the outer piston and cooperating with the outer piston axial bore to define a variable volume reservoir. The spring is seated against the inner piston to urge the inner piston and the outer piston biased towards the annular valve seat. The compression fluid passage extends from proximate the valve seat through the outer piston to the variable volume reservoir. The rebound fluid passage has a one-way check valve extending from the variable volume reservoir through the outer piston proximate the valve seat.

According to even another aspect, an auxiliary damping valve for a shock absorber is provided having a valve body, a freely reciprocating first piston, a biased second piston, a spring, and a fluid flow passage. The valve body has a hydraulic cylinder. The freely reciprocating first piston is movable axially within the cylinder. The biased second piston is provided in the cylinder adjacent the first piston defining an expansible fluid chamber between the first piston and the second piston. The spring is disposed between the second piston and one end of the cylinder configured to urge the second piston towards the expansible fluid chamber. The fluid flow passage extends from a compression chamber of a shock absorber into the expansible fluid chamber to provide a sprung fluid capacitive storage for the shock absorber.

BRIEF DESCRIPTION OF THE DRAWINGS

Preferred embodiments of the disclosure are described below with reference to the following accompanying drawings.

FIG. 1 is a perspective view from above of an exemplary hydraulic shock absorber having a primary mid-valve piston assembly and a secondary pair of adjustable auxiliary hydraulic fluid valves.

FIG. 1A is a compound sectional and perspective view from above of the hydraulic shock absorber shown in FIG. 1 taken along line 1A-1A of FIG. 1 in a centerline sectional view through the main body and the auxiliary body cylindrical components.

FIG. 4A is an enlarged view of a fluid reservoir communication port between the adjusters from the encircled region of FIG. 4.

FIG. 5A is an enlarged view of a compression bleed rebound seal taken from encircled region 5A of FIG. 5.

FIG. 13 is an end view of the mid-valve piston assembly taken from the compression end.

FIG. 14 is a compound sectional view of the mid-valve piston assembly taken along compound line 14-14 of FIG. 13.

FIG. 14A is an enlarged encircled region 14A from FIG. 14 showing a gap between a rear edge of the outer piston and a forward surface of the stack plate.

FIG. 14B is a gap between a rear edge of the inner piston and a forward surface of the stop plate from the enlarged encircled region 14B from FIG. 14.

FIG. 14C is a gap between an inner shelf of the outer piston and an outer shelf of the inner piston from the enlarged encircled region 14C from FIG. 14.

FIG. 15 is a compound sectional view of the mid-valve piston assembly taken along compound line 15-15 of FIG. 13.

FIG. 15A is an enlarged encircled region 15A from FIG. 15 showing a closed gap between a rear edge of the outer piston and a forward surface of the stack plate.

FIG. 15B is a gap between a rear edge of the inner piston and a forward surface of the stop plate from the enlarged encircled region 15B from FIG. 15.

FIG. 15C is a partially smaller gap between an inner shelf of the outer piston and an outer shelf of the inner piston than depicted in FIG. 14C from the enlarged encircled region 15C from FIG. 15.

FIG. 16 is a compound sectional view of the mid-valve piston assembly taken along compound line 16-16 of FIG. 13.

FIG. 16A is an enlarged encircled region 16A from FIG. 16 showing a closed gap between a rear edge of the outer piston and a forward surface of the stack plate.

FIG. 16B is a gap between a rear edge of the inner piston and a forward surface of the stop plate similar in size to that shown in FIG. 15B from the enlarged encircled region 16B from FIG. 16.

FIG. 16C is a closed gap between an inner shelf of the outer piston and an outer shelf of the inner piston than depicted in FIG. 15C from the enlarged encircled region 16C from FIG. 16.

FIG. 17 is a compound sectional view of the mid-valve piston assembly taken along compound line 17-17 of FIG. 13.

FIG. 17A is an enlarged encircled region 17A from FIG. 17 showing a closed gap between a rear edge of the outer piston and a forward surface of the stack plate.

FIG. 17B is a closed gap between a rear edge of the inner piston and a forward surface of the stop plate from the enlarged encircled region 17B from FIG. 17.

FIG. 17C is a closed gap between an inner shelf of the outer piston and an outer shelf of the inner piston than depicted in FIG. 16C from the enlarged encircled region 17C from FIG. 17.

FIG. 17D is an unseated o-ring in a circumferential channel within an inner wall of the outer piston from the encircled region 17D of FIG. 17.

FIG. 18 is a compound sectional view of the mid-valve piston assembly taken along compound line 18-18 of FIG. 13.

FIG. 18A is a seated o-ring in a circumferential channel within an inner wall of the outer piston from the encircled region 18A of FIG. 18.

FIG. 18B is a circumferential gap between the inner piston and the outer piston shown in the enlarged encircled region 18B of FIG. 18.

FIG. 19 is a compound sectional view of the mid-valve piston assembly with the inner piston and the outer piston in a closed position and compression bleed rebound o-ring seal closed and taken along compound line 19-19 of FIG. 13.

FIG. 19A is an enlarged encircled region from FIG. 19 of the inner and outer piston for the mid-valve piston assembly and the compression bleed rebound o-ring seal.

FIG. 20 is a compound sectional view of the mid-valve piston assembly with the inner piston and the outer piston in a closed position and compression bleed rebound o-ring seal open and taken along compound line 20-20 of FIG. 13.

FIG. 20A is an enlarged encircled region from FIG. 20 of the inner and outer piston for the mid-valve piston assembly and the compression bleed rebound o-ring seal.

FIG. 21 is a compound sectional view of the mid-valve piston assembly taken along compound line 21-21 of FIG. 13.

FIG. 21A is an enlarged encircled region from FIG. 21 of the outer piston moved slightly open than that of FIG. 20.

FIG. 23 is an end view of the mid-valve piston assembly taken from the compression end.

FIG. 24 is a compound sectional view of the mid-valve piston assembly with the outer piston partially open and the inner piston closed with the o-ring in an open position taken along compound line 24-24 of FIG. 23.

FIG. 24A is an enlarged encircled region from FIG. 24 of the inner and outer piston for the mid-valve piston assembly and the compression bleed rebound o-ring seal.

FIG. 24B is an enlarged encircled region 24B from FIG. 24A showing a gap between a rear edge of the outer piston and a forward surface of the stack plate.

FIG. 24C is a gap between a rear edge of the inner piston and a forward surface of the stop plate from the enlarged encircled region 24C from FIG. 24A.

FIG. 24D is a gap between an inner shelf of the outer piston and an outer shelf of the inner piston from the enlarged encircled region 24D from FIG. 24A.

FIG. 25 is an end view of the mid-valve piston assembly from the compression end.

FIG. 26 is a compound sectional view of the mid-valve piston assembly taken along compound line 26-26 of FIG. 25.

FIG. 26A is an enlarged encircled region from FIG. 26 of the inner and outer piston for the mid-valve piston assembly and the compression bleed rebound o-ring seal.

FIG. 26B is an enlarged encircled region 26B from FIG. 26A showing a gap between a rear edge of the outer piston and a forward surface of the stack plate.

FIG. 26C is a gap between a rear edge of the inner piston and a forward surface of the stop plate from the enlarged encircled region 26C from FIG. 26A.

FIG. 26D is a gap between an inner shelf of the outer piston and an outer shelf of the inner piston from the enlarged encircled region 26D from FIG. 26A.

FIG. 27 is an end view of the mid-valve piston assembly from the compression end.

FIG. 28 is a compound sectional view of the mid-valve piston assembly taken along compound line 28-28 of FIG. 27.

FIG. 28A is an enlarged encircled region from FIG. 28 of the inner and outer piston for the mid-valve piston assembly and the compression bleed rebound o-ring seal.

FIG. 28B is an enlarged encircled region 28B from FIG. 28A showing a gap between a rear edge of the outer piston and a forward surface of the stack plate.

FIG. 28C is a gap between a rear edge of the inner piston and a forward surface of the stop plate from the enlarged encircled region 28C from FIG. 28A.

FIG. 28D is a gap between an inner shelf of the outer piston and an outer shelf of the inner piston from the enlarged encircled region 28D from FIG. 28A.

FIG. 29 is an end view of the mid-valve piston assembly from the compression end.

FIG. 30 is a compound sectional view of the mid-valve piston assembly taken along compound line 30-30 of FIG. 29.

FIG. 30A is an enlarged encircled region from FIG. 30 of the inner and outer piston for the mid-valve piston assembly and the compression bleed rebound o-ring seal.

FIG. 30B is an enlarged encircled region 30B from FIG. 30A showing a gap between a rear edge of the outer piston and a forward surface of the stack plate.

FIG. 30C is a gap between a rear edge of the inner piston and a forward surface of the stop plate from the enlarged encircled region 30C from FIG. 30A.

FIG. 30D is a gap between an inner shelf of the outer piston and an outer shelf of the inner piston from the enlarged encircled region 30D from FIG. 30A.

FIG. 31 is an enlarged component compound sectional perspective view from above of the mid-valve piston assembly for the shock absorber of FIG. 1 showing the compression bleed rebound seal in a rebound closed position and further showing the inner piston and the outer piston in a closed position.

FIG. 31A is an enlarged view of encircled region 31A from FIG. 31 of the inner and outer piston for the mid-valve piston assembly and the compression bleed rebound o-ring seal.

FIG. 32 is an enlarged component compound sectional perspective view from above of the mid-valve piston assembly of FIG. 31 showing the compression bleed rebound seal in an open flow position and showing the inner piston and outer piston in an open position.

FIG. 32A is an enlarged view of encircled region 32A from FIG. 32 of the inner and outer piston for the mid-valve piston assembly and the compression bleed rebound o-ring seal.

FIG. 34A is an enlarged view of encircled region 34A from FIG. 34 of the inner and outer piston for the mid-valve piston assembly and the compression bleed rebound o-ring seal.

FIG. 38 is a centerline sectional view of the primary auxiliary hydraulic fluid valve as shown in section in FIGS. 1-3 depicting the conical piston body more tightly closed and the pump piston urged further leftward against the stacked springs than depicted in FIG. 37.

FIGS. 38A and 38B show respectively a displaced return flow shim stack and a return check valve washer from encircled regions 38A and 38B of FIG. 38.

FIG. 39 is a centerline sectional view of the primary auxiliary hydraulic fluid valve as shown in section in FIGS. 1-3 depicting the conical piston body closed and the pump piston urged further leftward against the stacked springs than in FIG. 37 and the check valve is in an open state showing a paused state of compression and rebound.

FIGS. 39A and 39B show respectively a closed return flow shim stack and an open return check valve washer from encircled regions 39A and 39B of FIG. 39.

FIG. 40 is a centerline sectional view of the primary auxiliary hydraulic fluid valve as shown in section in FIGS. 1-3 depicting all hydraulic fluid flow valves in closed positions.

FIGS. 40A through 40D show respectively a closed ball check valve, a closed tapered metering pin, a closed return flow shim stack, and a closed return check valve washer shown in encircled regions 40A through 40D.

FIG. 41 is a centerline sectional view of the primary auxiliary hydraulic fluid valve as shown in section in FIGS. 1-3 depicting all hydraulic fluid flow valves in open positions.

FIGS. 41A through 41D show respectively, an open ball check valve, an open tapered metering pin, an open return flow shim stack, and an open return check valve washer shown in encircled regions 41A through 41D.

FIG. 43 is an angled side view from above of the sectioned primary auxiliary hydraulic fluid valve of FIG. 42.

FIG. 43A is an enlarged view of the check valve and the assembly bleed port from encircled region 43A of FIG. 43.

FIG. 44 is a side view of the primary auxiliary hydraulic fluid valve of FIG. 42 in centerline section.

FIG. 44A is an enlarged view of the check valve and the assembly bleed port from encircled region 44A of FIG. 44.

FIG. 64 is an end view of the mid-valve piston of FIGS. 62-63 showing the compression ports.

FIG. 65 is a compound sectional view of the mid-valve piston of FIG. 64 showing both a compression port and a rebound port.

FIG. 66 is an end view of the mid-valve piston of FIGS. 64-65 showing the compression ports.

FIG. 67 is a compound sectional view of the mid-valve piston of FIGS. 64-66 showing both a compression port and a rebound port at a beginning state with no fluid flow.

FIG. 67C is an enlarged encircled region view showing the rebound flapper shims in a closed position.

FIG. 67D is an enlarged encircled region view showing the check valve in a closed position.

FIG. 67E is an enlarged encircled region view showing the outer conical piston body closed against the outer piston frustoconical seat.

FIG. 67F is an enlarged encircled region view showing the inner cone piston body closed against the inner piston frustoconical seat.

FIG. 67G is an enlarged encircled region view showing a motion limiting gap between a back surface of the outer cone piston body and the outer sleeve travelling limiting radially inwardly extending shoulder.

FIG. 67H is an enlarged encircled region view showing the inner cone flapper shim stack closed or more unloaded state (and minimally preloaded) against the rear surface of the inner cone piston body.

FIG. 67M is an enlarged encircled region view showing the rebound metering fluid needle and tube seat adjusted to one of a plurality of potential open positions.

FIG. 68 is an end view of the mid-valve piston of FIGS. 64-67 showing the compression ports.

FIG. 69 is a compound sectional view of the mid-valve piston of FIGS. 62-67 showing both a compression port and a rebound port at a later state than shown in FIG. 67 with more fluid flow at a later point in time.

FIG. 69C is an enlarged encircled region view showing the flapper shims in a closed position.

FIG. 69D is an enlarged encircled region view showing the check valve in a closed position.

FIG. 69E is an enlarged encircled region view showing the outer cone piston body partially open relative to the outer piston frustoconical seat.

FIG. 69F is an enlarged encircled region view showing the inner cone piston body closed against the inner piston frustoconical seat.

FIG. 69G is an enlarged encircled region view showing a motion limiting gap decreasing in size over that shown in FIG. 67G between a back surface of the outer piston body and the outer sleeve travelling limiting radially inwardly extending shoulder.

FIG. 69H is an enlarged encircled region view showing the inner cone flapper shim stack closed and less loaded (minimally preloaded state) against the rear surface of the inner cone piston body.

Figure 2:
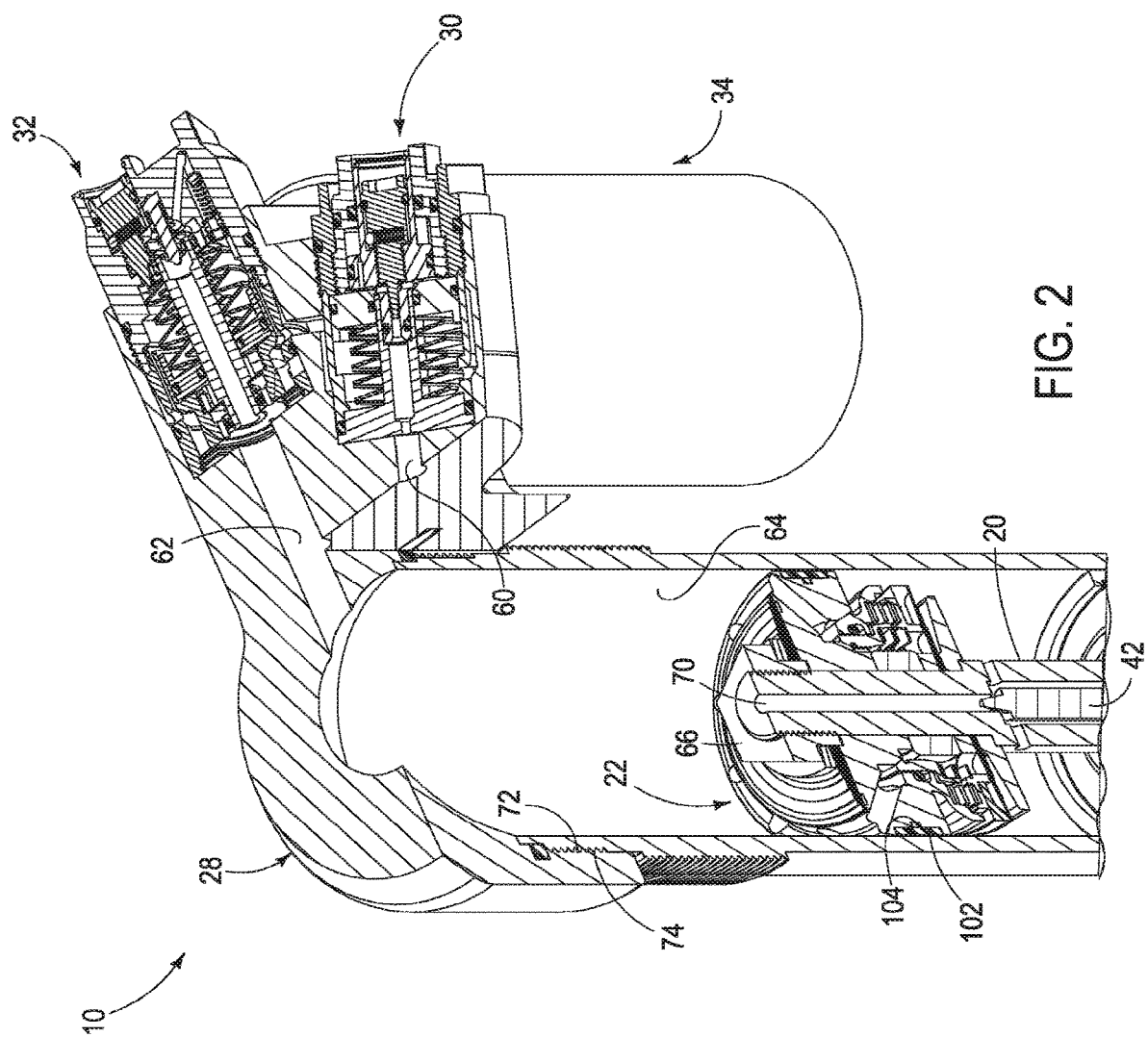
FIG. 2 is an enlarged partial and compound sectional and perspective view of the shock absorber rotated counter-clockwise from that shown in FIG. 1.

FIG. 69M is an enlarged encircled region view showing the rebound metering fluid needle and tube seat adjusted to one of a plurality of potential open positions.

FIG. 70 is an end view of the mid-valve piston of FIGS. 62-69 showing the compression ports.

FIG. 71 is a compound sectional view of the mid-valve piston of FIGS. 62-69 showing both a compression port and a rebound port at a later state than shown in FIG. 69 with yet even more fluid flow and the initiation of pump piston movement to initiate shutting of the outer conical piston.

FIG. 71C is an enlarged view from the encircled region and showing the rebound flapper shims in a closed position.

FIG. 71D is an enlarged view from the encircled region and showing the check valve in a closed position.

FIG. 71E is an enlarged encircled region view showing the outer cone piston body partially open relative to the outer piston frustoconical seat.

FIG. 71F is an enlarged encircled region view showing the inner cone piston body partially open relative to the inner piston frustoconical seat.

FIG. 71G is an enlarged encircled region view showing a motion limiting gap same in size over that shown in FIG. 69G between a back surface of the outer cone piston body and the outer sleeve travelling limiting radially inwardly extending shoulder.

FIG. 71H is an enlarged encircled region view showing the inner cone flapper shim stack being urged and flexed by rearward movement of the rear surface of the inner cone piston body.

FIG. 71M is an enlarged encircled region view showing the rebound metering fluid needle and tube seat adjusted to one of a plurality of potential open positions.

FIG. 72 is an end view of the mid-valve piston of FIGS. 64-71 showing the compression ports.

FIG. 73 is a compound sectional view of the mid-valve piston of FIGS. 64-71 showing both a compression port and a rebound port at a later state than shown in FIG. 71 with fluid flow restriction where the outer conical piston is closed.

FIG. 73C is an enlarged view from the encircled region and showing the rebound flapper shims in a closed position.

FIG. 73D is an enlarged view from the encircled region and showing the check valve in a closed position.

FIG. 73E is an enlarged encircled region view showing the outer cone piston body closed against the outer piston frustoconical seat.

FIG. 73F is an enlarged encircled region view showing the inner cone piston body partially open relative to the inner piston frustoconical seat.

FIG. 73G is an enlarged encircled region view showing a motion limiting gap increasing in size over that shown in FIG. 71G between a back surface of the outer piston body and the outer sleeve travelling limiting radially inwardly extending shoulder.

FIG. 73H is an enlarged encircled region view showing the inner cone flapper shim stack being urged and flexed by rearward movement of the rear surface of the inner cone piston body.

FIG. 73M is an enlarged encircled region view showing the rebound metering fluid needle and tube seat adjusted to one of a plurality of potential open positions.

FIG. 74 is an end view of the mid-valve piston of FIGS. 62-73 showing the compression ports.

FIG. 75 is a compound sectional view of the mid-valve piston of FIGS. 64-73 showing both a compression port and a rebound port at a later state than shown in FIG. 73 with fluid flow restriction allowing bypass where the outer conical piston body is opening again in response to a threshold excessive force.

FIG. 75C is an enlarged view from the encircled region and showing the rebound flapper shims in a closed position.

FIG. 75D is an enlarged view of the encircled region and showing the check valve in a closed position.

FIG. 75E is an enlarged encircled region view showing the outer cone piston body fully open relative to the outer piston frustoconical seat.

FIG. 75F is an enlarged encircled region view showing the inner cone piston body partially open relative to the inner piston frustoconical seat.

FIG. 75G is an enlarged encircled region view showing a motion limiting gap completely closed over that shown in FIG. 73G between a back surface of the outer piston body and the outer sleeve travelling limiting radially inwardly extending shoulder.

FIG. 75H is an enlarged encircled region view showing the inner cone flapper shim stack being urged and flexed by rearward movement of the rear surface of the inner cone piston body.

FIG. 75M is an enlarged encircled region view showing the rebound metering fluid needle and tube seat adjusted to one of a plurality of potential open positions.

FIG. 76 is an end view of the mid-valve piston of FIGS. 64-75 showing the compression ports.

FIG. 77 is a compound sectional view of the mid-valve piston of FIGS. 64-75 showing both a compression port and a rebound port at a later state than shown in FIG. 75 with a perspective in a rebound fluid flow direction causing the rebound flapper valve stack to an open flow position in response to a rebound stroke.

FIG. 77C is an enlarged view of the encircled region and showing the flapper shims in an open position.

FIG. 77D is an enlarged view of the encircled region and showing the check valve in an open position.

FIG. 77E is an enlarged encircled region view showing the outer cone piston body closed against the inner piston frustoconical seat.

FIG. 77F is an enlarged encircled region view showing the outer cone closed against the outer piston frustoconical seat.

FIG. 77G is an enlarged encircled region view showing a motion limiting gap same as that shown in FIG. 67G between a back surface of the outer piston body and the outer sleeve travelling limiting radially inwardly extending shoulder.

FIG. 77H is an enlarged encircled region view showing the inner cone flapper shim stack closed (and preloaded) against the rear surface of the inner cone piston body.

FIG. 77M is an enlarged encircled region view showing the rebound metering fluid needle and tube seat adjusted to one of a plurality of potential open positions.

FIG. 78 is an end view of the mid-valve piston of FIGS. 64-77 showing the compression ports.

FIG. 79 is a compound sectional view of the mid-valve piston of FIGS. 64-78 showing both a compression port and the mid-valve piston is at a static state and a rebound port at a static state showing a rebound needle position adjustment change from that of FIG. 77 depicting the needle position in a more closed position than that of FIG. 77 and a rebound port at a later state than shown in FIG. 77 with fluid flow restriction allowing bypass where the outer conical piston is opening again in response to a threshold excessive force.

FIG. 79C is an enlarged view of the encircled region and showing the flapper shims in a closed position.

FIG. 79D is an enlarged view of the encircled region and showing the check valve in a closed position.

FIG. 79E is an enlarged encircled region view showing the outer cone piston body closed against the outer piston frustoconical seat.

FIG. 79F is an enlarged encircled region view showing the inner cone piston body closed against the inner piston frustoconical seat.

FIG. 79G is an enlarged encircled region view showing a motion limiting gap same as that shown in FIG. 79G between a back surface of the outer cone piston body and the outer sleeve travelling limiting radially inwardly extending shoulder.

FIG. 79H is an enlarged encircled region view showing the inner cone flapper shim stack closed or in a less loaded state (and minimally preloaded) against the rear surface of the inner cone piston body.

FIG. 79M is an enlarged encircled region view showing the rebound metering fluid needle and tube seat adjusted to a mostly closed position.

Figure 80:
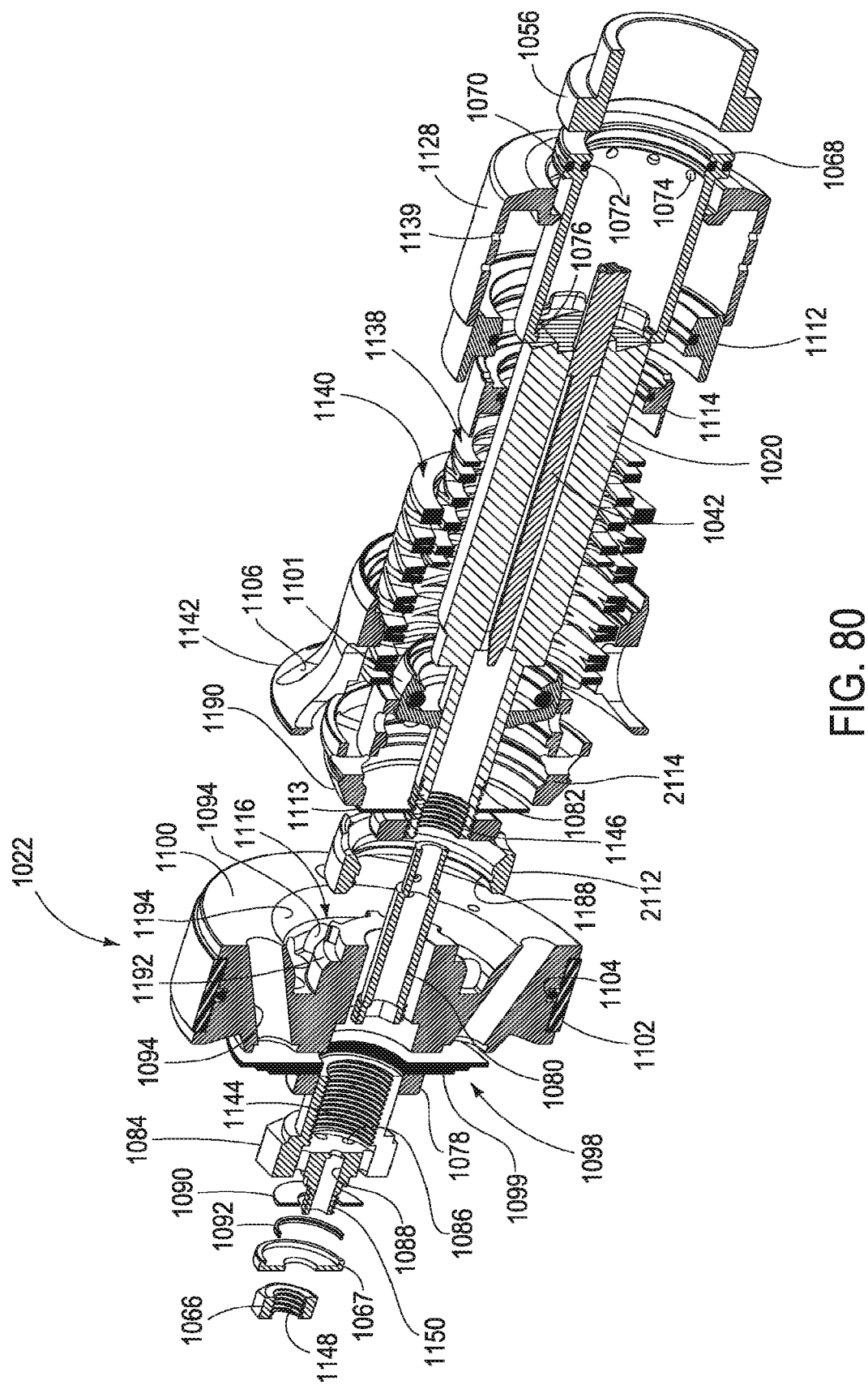

FIG. 80 is an exploded and perspective vertical centerline sectional view of the secondary fluid valve from the inlet end of FIGS. 63-79.

Figure 81B:
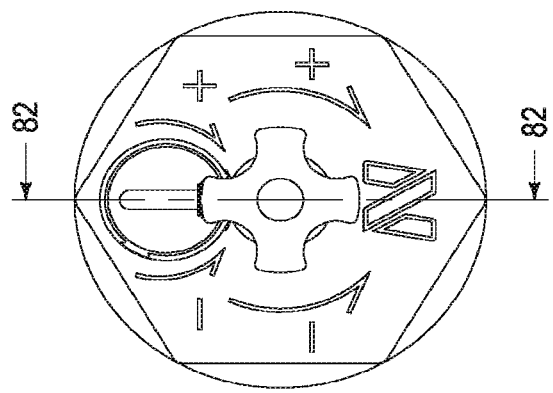
Figure 81A:
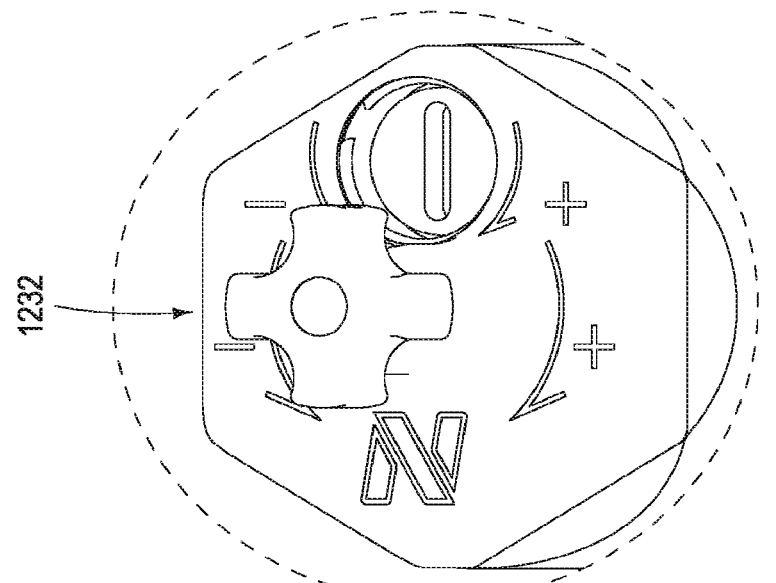
Figure 81:
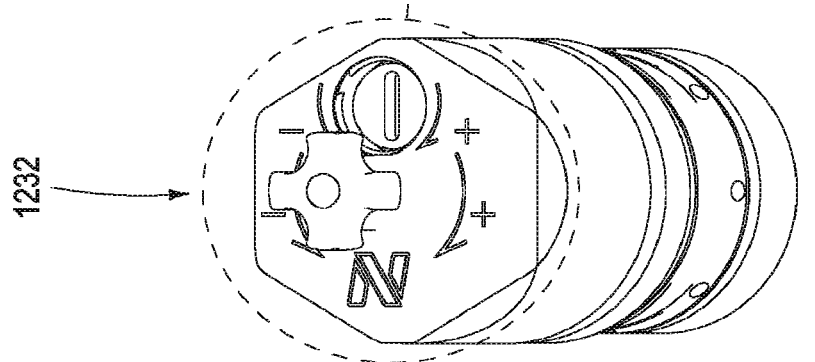

FIG. 81 is a perspective view from above of yet another alternative primary compression adjuster for a shock absorber according to another construction.

FIG. 81A is an enlarged perspective view of the end portion for the primary compression adjuster taken from encircled region 81A from FIG. 81.

FIG. 81B is a plan view of the end portion for the primary compression adjuster.

Figure 82A:
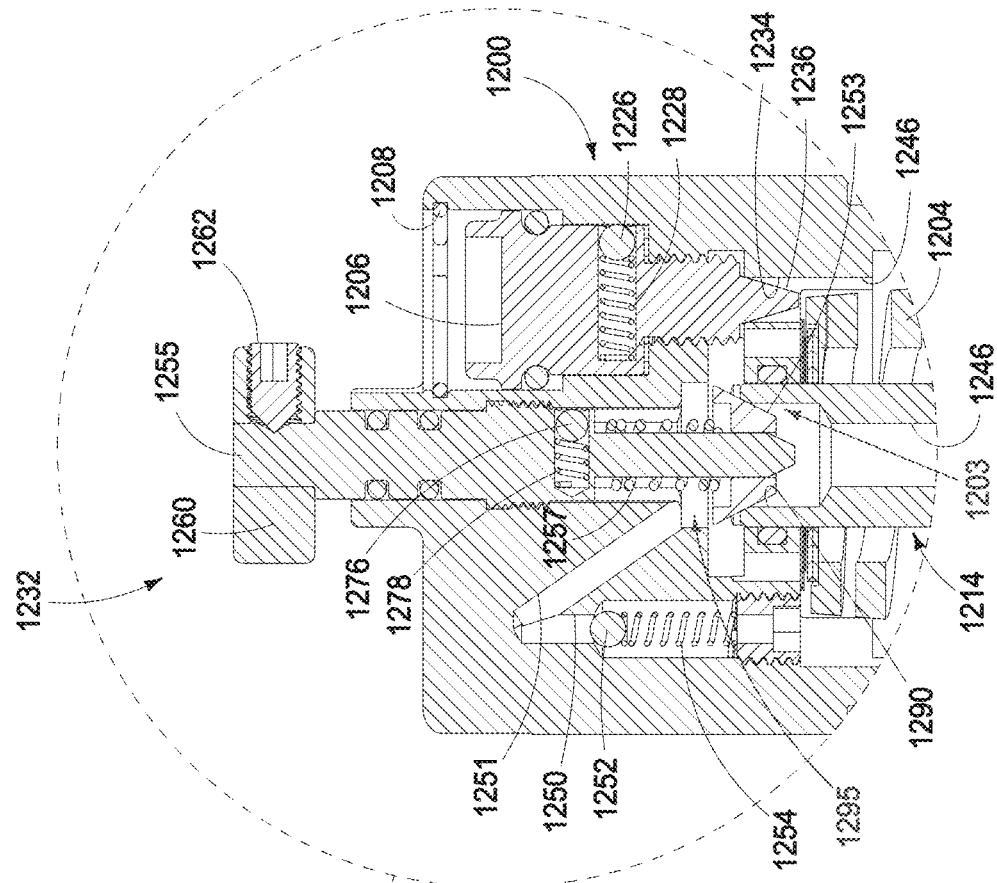
Figure 82:
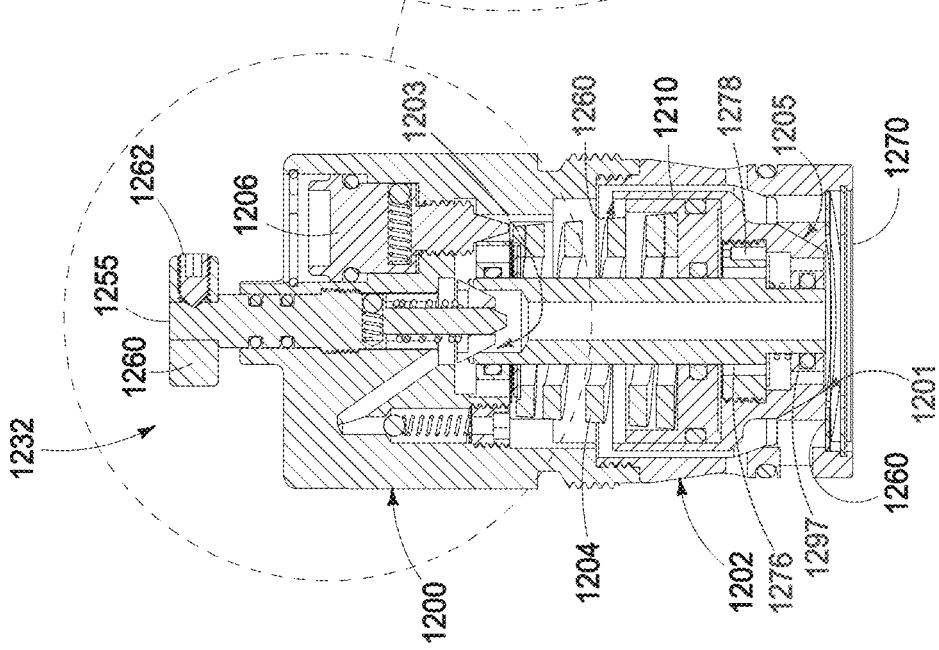

FIG. 82 is a centerline sectional view of the primary compression adjuster taken along line 82-82 of FIG. 81B.

FIG. 82A is an enlarged encircled portion centerline sectional view of the primary compression adjuster of FIG. 82.

Figure 83:
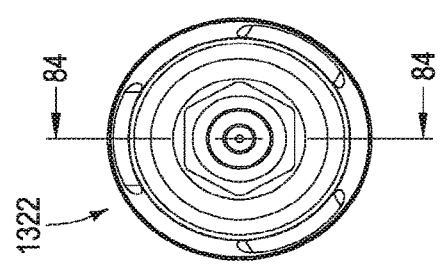

FIG. 83 is an end view of yet even another alternative mid-valve for a shock absorber according to another construction.

Figure 84:
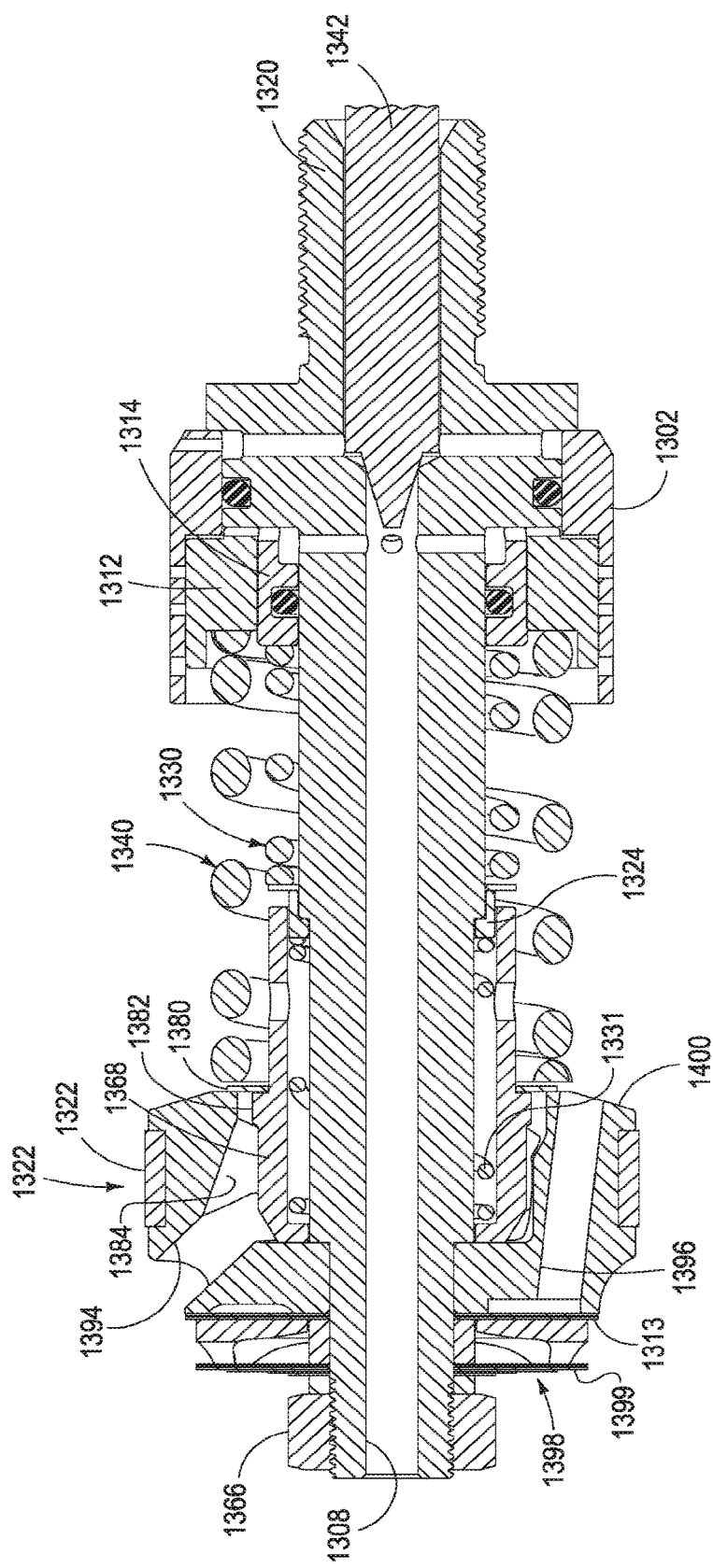

FIG. 84 is a vertical centerline sectional view of the mid-valve of FIG. 83.

DETAILED DESCRIPTION OF THE PREFERRED EMBODIMENTS

This disclosure is submitted in furtherance of the constitutional purposes of the U.S. Patent Laws "to promote the progress of science and useful arts" (Article 1, Section 8).

As shown herein, the drawings (that are not perspective views) are to scale in the x and y axis 1:1 and represent actual engineering drawings to scale, unless otherwise state as being "simplified" or "conceptual".

As used herein, the term "mid-valve piston" refers to a piston assembly having a two-way fluid, hydraulic, or air valve and placed for reciprocating movement intermediate of a shock absorber between a compression chamber and a rebound chamber or for shocks having bypass passages communicating with a shock tube of a sealed shock body.

Figure 61:
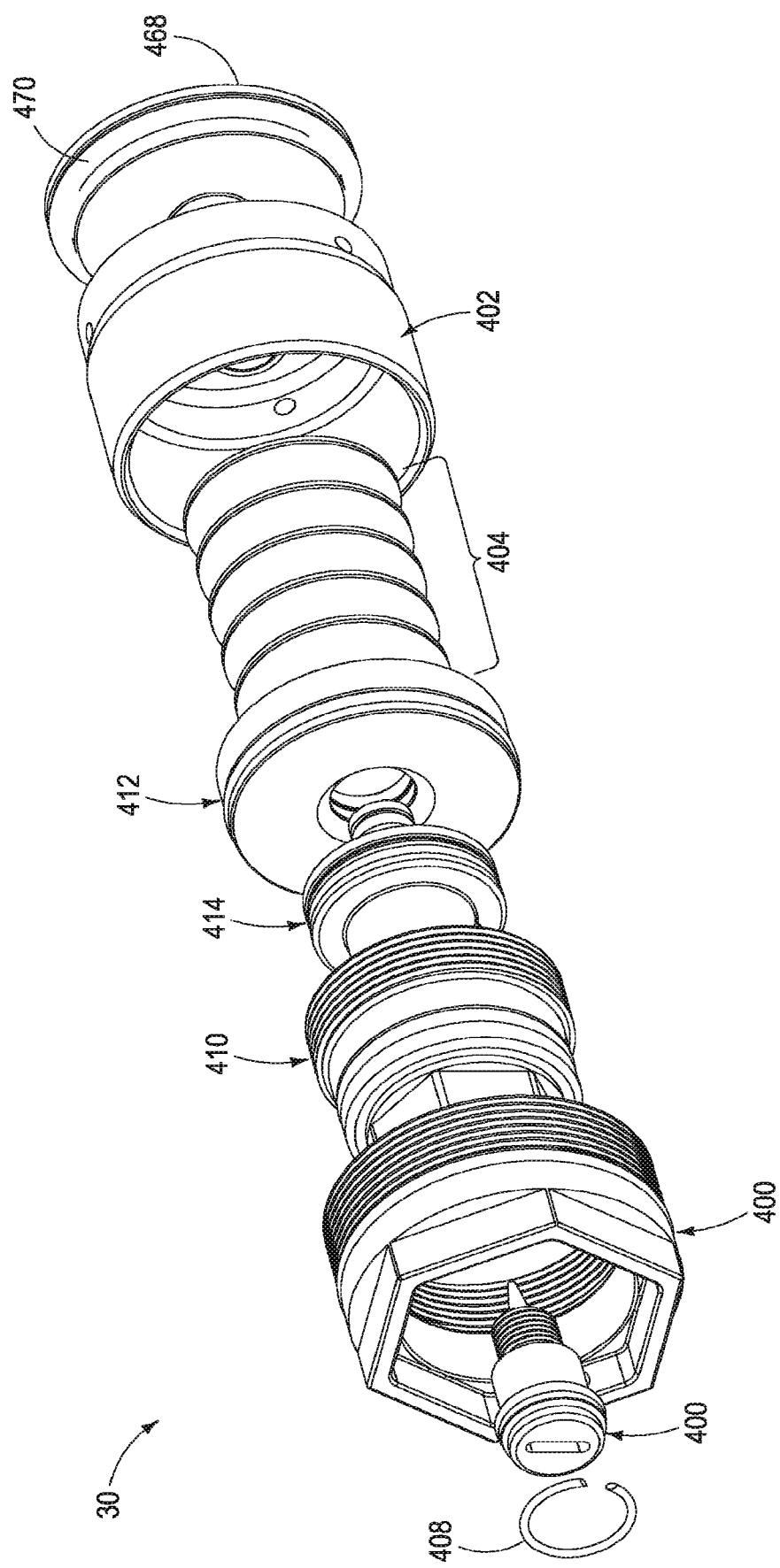
FIG. 61 is an exploded and perspective view of the secondary fluid valve from the adjuster end of FIGS. 51-60.

FIGS. 1-61 are various views of a first exemplary hydraulic shock absorber 10 having a primary mid-valve piston valve 16 and a secondary pair of adjustable auxiliary hydraulic fluid valves 32 and 34. Cross-sectional views are show in 1:1 scale in the x-axis and y-axis and were obtained from engineering drawings in the drawing set provided herein.

FIG. 1 is a perspective view from above of an exemplary hydraulic shock absorber assembly 10 having a main cylindrical shock tube, or cylinder 12 having a primary mid-valve piston 22 (see FIG. 1A) contained for movement within tube 12 via an end cap 28, forming an adjuster and reservoir end cap assembly 16 that contains a secondary pair of primary and secondary adjustable auxiliary hydraulic fluid valves 30 and 32 within a bridge end cap, or body 28. Each fluid valve 30 and 32 communicates with a piston and reservoir assembly 34. Assembly 10 is installed between articulating components of a suspension or shock absorbing mechanism, such as a vehicle suspension, using a bushing and bolt (not shown) through top-most bushing bore 17 and a bolt and bushing (not shown) that extends through bottom-most clevis 18. Clevis 18 is affixed to a bottom end of a reciprocating piston rod assembly 14.

FIG. 1A is a compound sectional and perspective view from above of the hydraulic shock absorber assembly 10 shown in FIG. 1 taken along line 1A-1A of FIG. 1 in a centerline sectional view through the main body and the auxiliary body cylindrical components for an exemplary hydraulic shock absorber assembly 10 according to one aspect. Shock absorber assembly 10 includes a sealed shock body 12 including a main cylindrical shock tube, or cylinder 36, a bridge end cap 28, and a dust cap 26. End cap 28 is threaded in sealed engagement via an o-ring seal 38 to tube 36. Optionally, shock body 12 can be made from one or more parts that are integrally formed together, or are welded or bonded together in assembly. A pair of fluid ports 60 and 62 fluid couple adjusters 30 and 32, respectively, with compression chamber 76. Shock absorber assembly 10 also includes piston rod assembly 14 having a hollow piston rod, or shaft 20, a mid-valve piston 22 moveable within tube 36 as between a compression chamber 76 and a rebound chamber 78 each filled with hydraulic fluid (not shown). A clevis 18 is provided affixed to a bottom end of piston rod 20, forming piston rod assembly 14 for affixing to a frame member or a vehicle component. A top cap assembly, or bridge 16 is affixed atop cylinder 12 opposite clevis 38 and includes a bushing bore post 17 (see FIG. 1) for affixing a top end of shock 10. Movement of mid-valve piston 22 within cylinder 12 causes hydraulic fluid contained within sealed shock body 12 to move through bi-directional resistance valving structures in mid-valve piston 22 and also through adjustors, or adjustable primary valve 30 and adjustable secondary valve 32. A piston and reservoir assembly 34 includes a separator piston 48 (having a sliding o-ring seal 50) that divides an inner portion of a reservoir body 46 into an oil filled chamber 82 and an air-filled chamber 84. Optionally, piston 48 can be a flexible divider membrane within a medial portion of reservoir body 46. Oil reservoir, or chamber 82 receives hydraulic fluid passing through one or both adjusters 32 and 34, while air-filled chamber 84 contains pressurized air received via a closable air valve 52. Such pneumatic pressure provides a spring force against separator piston 48 and optionally, a coil spring can be substituted for air-filled chamber 84.

As shown in FIG. 1A, a seal head assembly 24 is affixed adjacent a bottom end of shock tube 36 behind a seal cap 26. More particularly, seal head assembly 24 includes a seal head body 58 with a radially inwardly extending circumferential groove configured to receive an o-ring seal 54 and a bumper stop 56 formed of a resilient energy absorbing material, such as a synthetic rubber. Bumper stop 56 is a cylindrical rubber washer having vertically extending cylindrical inner and outer wall edge flanges that serve to provide progressive resistance when mid-valve piston 22 extends to a maximum position on rebound. Seal head body 58 has a cylindrical radially outwardly extending groove in an outer wall portion that matches a radially inwardly extending groove in tube 36, each cooperating to receive a c-shaped spring clip 40 to affix seal head body 58 within tube 36. An air chamber 80 is provided between piston 58 and dust cap 26. Piston 58 includes a bushing along the piston rod, a washer and top and bottom wiper seals (not numbered).

Also shown in FIG. 1A, piston shaft 20 includes a rebound needle 42 that is axially positioned using a threaded rebound adjuster screw 44 (threads not shown) provided in clevis 18.

FIG. 2 is an enlarged partial and compound sectional and perspective view of the shock absorber 10 rotated counterclockwise from that shown in FIG. 1. More particularly, shock absorber 10 is shown with bridge end cap 28 having a female threaded portion 72 that secures to a complementary male threaded portion 74. Mid-valve piston 22 has a piston band seal 102 received in a radial inward groove on an outer surface of piston 22. A compression o-ring 104 is retained in a circumferential groove of piston 22 beneath piston band seal 102. A nut 66 is affixed with complementary threaded portions to shaft 20. A port, or bore 70 in shaft 20 is flow regulated for hydraulic fluid via axial positioning of rebound needle 42 within shaft 20. Bore 70 communications with a compression chamber defined within inner cylindrical bore 64 above piston 22. Such chamber for hydraulic fluid also communications with flow ports 60 and 62 to drive primary adjuster 30 and secondary adjuster 32. Piston and reservoir assembly 34 stores excess hydraulic fluid during a shock absorbing operation.

Figure 3:
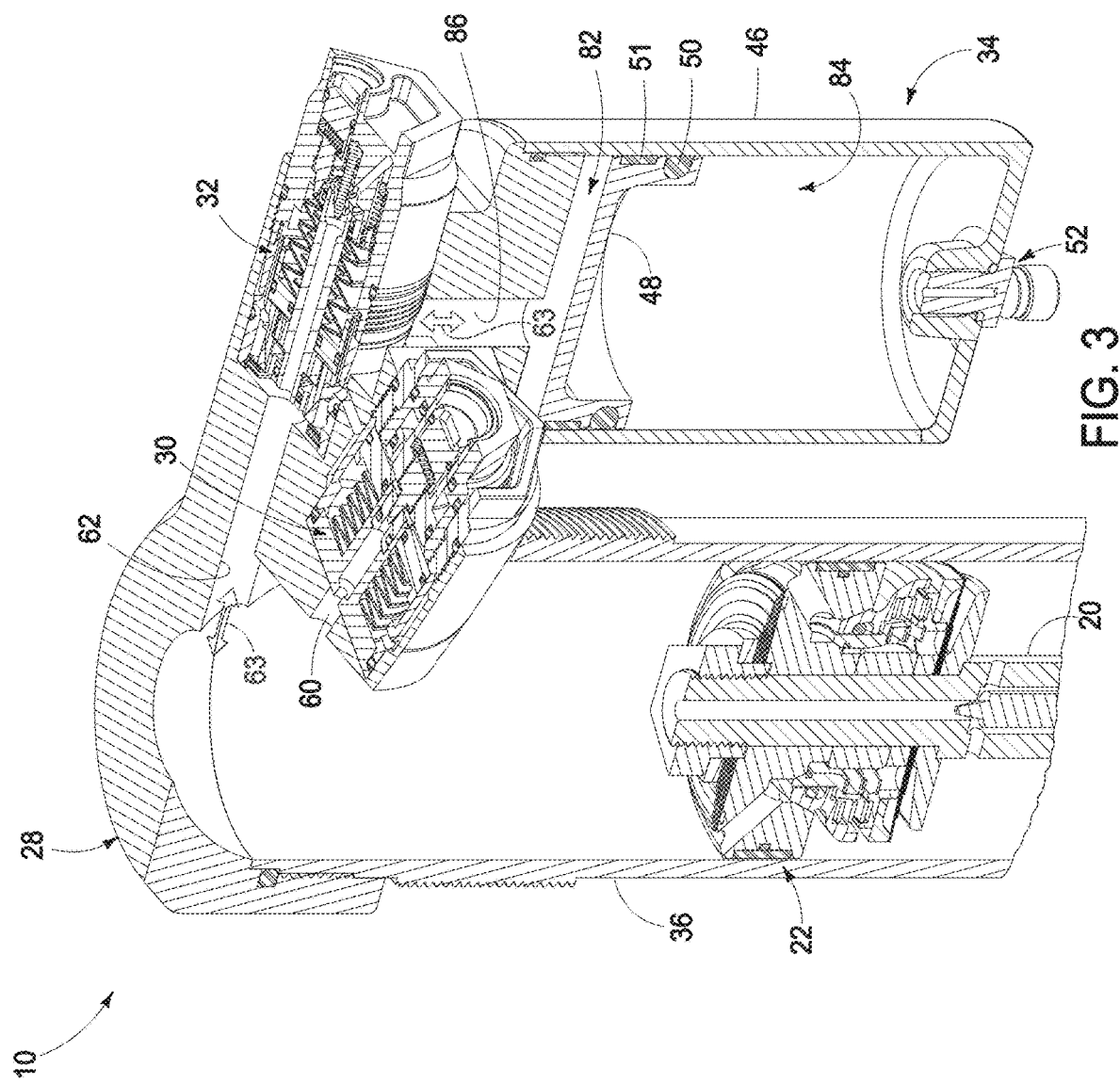
FIG. 3 is an enlarged partial and compound sectional and perspective view of the sectioned shock absorber as shown in FIG. 1.

FIG. 3 is an enlarged partial and compound sectional and perspective view of the sectioned shock absorber 10 as shown in FIG. 1. More particularly, bridge end cap 28 is secured atop shock tube 36 to contain mid-valve piston 22 and piston rod, or shaft 20 for reciprocation therein. Fluid, such as hydraulic fluid, is forced through primary adjuster 32 and secondary, or pre-adjuster 30 via fluid ports 62 and 60, respectively. After passing through adjusters 32 and/or 30 and communicating together via cross port 92 (see FIG. 4A), fluid passes through fluid port 86 and into fluid, or oil chamber 82. Pneumatic, or air pressure in air chamber 84 urges a separator piston 48 against oil inside of chamber 82 with a preset pressure applied via a Schrader pneumatic valve mounted in threaded and sealing relation in a bottom surface of a reservoir body 46 of piston and reservoir assembly 34. Separator piston 48 includes an o-ring seal 50 and a piston band seal 51 each provided in a respective outer peripheral groove of piston 48.

Figure 4:
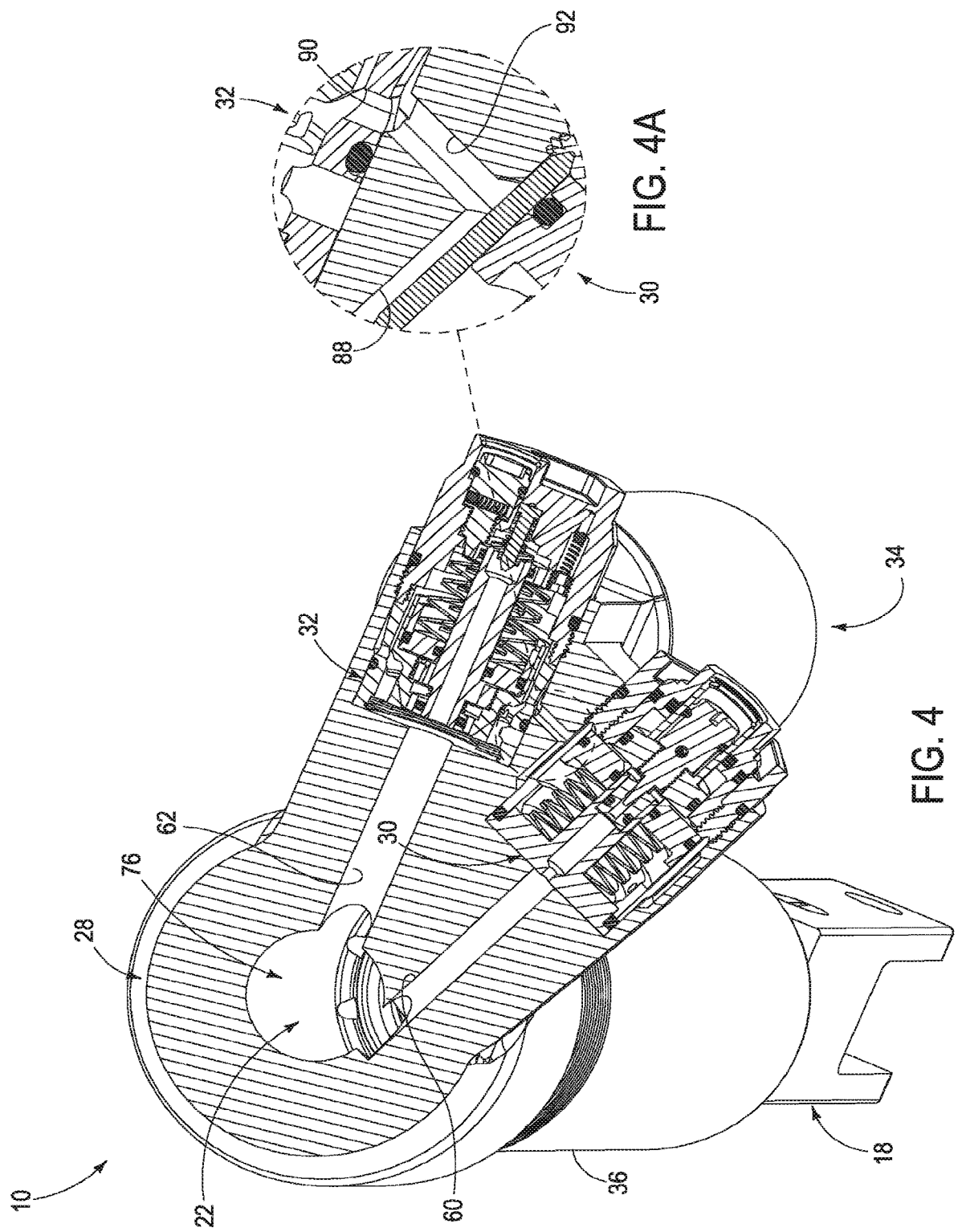
FIG. 4 is an enlarged partial sectional and perspective view of the sectioned shock absorber as shown in FIG. 3, but from a higher perspective angle above.

FIG. 4 is an enlarged partial sectional and perspective view of the sectioned shock absorber 10 as shown in FIG. 3, but from a higher perspective angle above. Bridge end cap 28 is shown with a horizontal section taken through an upper portion of cap 28, exposing mid-valve piston assembly 22 within the compression chamber 76. Fluid ports 60 and 62 delivers hydraulic fluid, or oil from compression chamber 76 and through valves 30 and 32 as mid-valve piston assembly 22 rises in tube 36 from compression forces exerted via yoke 18 mounted to a suspension frame component (not shown). Such fluid passes through valves 30 and 32 where further energy is managed/stored/released so as to mitigate shock transmission where it is stored in piston and reservoir assembly 34. Fluid passes into and out of valve 30, but passes through (bidirectionally) valve 32. However, valve 32 can produce a net flow in either direction through valve 32 and into reservoir 34. However, valve 30 only produces a differential pressure flow that accommodates capacitive fluid storage against spring forces inside of valve 30 and does not produce a net flow through valve 30 during a compression and expansion cycle.

FIG. 4A is an enlarged view of a fluid reservoir communication port, or cross-port 92 provided between the adjusters 30 and 32 from the encircled region of FIG. 4. More particularly, when the shock absorber is compressed fluid passes through adjusters 30 and 32 and into circumferential cavities, or chambers 88 and 90 where fluid leaves chamber 88 and enters into chamber 90 via cross port 92 into vertical port 86 and chamber 82 (see FIG. 3).

Figure 5:
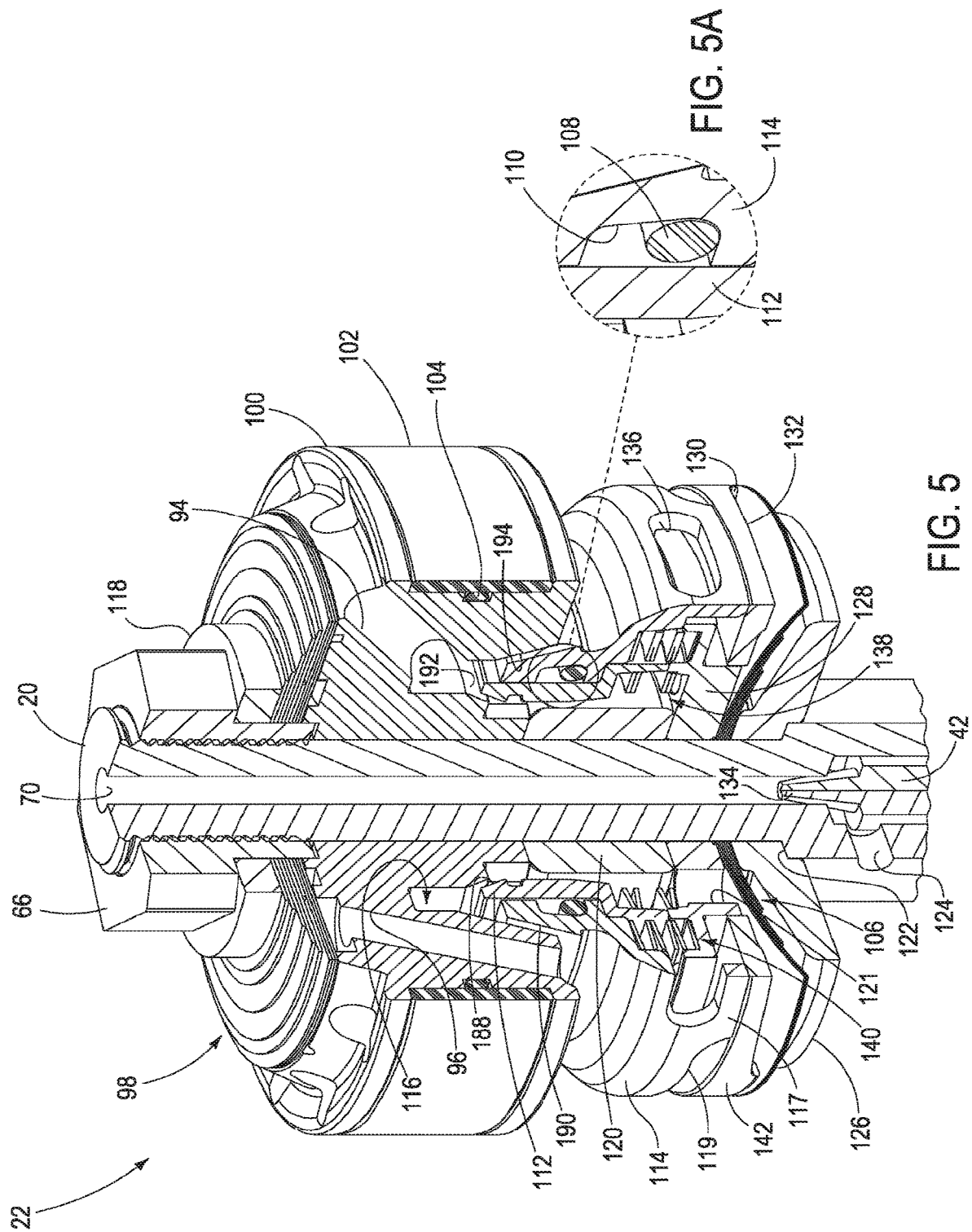
FIG. 5 is an enlarged component sectional perspective view from above of the mid-valve piston assembly showing the compression bleed rebound seal in a sealed closed position and showing the inner piston and the outer piston in an open position for the shock absorber of FIGS. 1 and 1A.

FIG. 5 is an enlarged component sectional perspective view from above of the mid-valve piston assembly 22 showing the compression bleed rebound seal 108 in a compression closed position and showing the inner piston 112 and the outer piston 114 in an open position for the shock absorber 10 of FIGS. 1 and 1A. More particularly, piston assembly 22 includes a cylindrical piston body 100 carried coaxially by piston rod, or shaft 20. Piston body 100 is trapped onto shaft 20 between a cylindrical shoulder 120 and a threaded end nut 66. A central fluid port 70 extends through piston body 100 down to a tapered metering pin end 134 that is axially adjustable in position via integral rebound needle 42 being adjusted in threaded engagement at an opposite end (not shown) with shaft 20. In this way, the flow rate of shock absorber fluid, or oil through port 70 of piston assembly 22 can be adjusted for optional performance for certain shock conditions. Radially outwardly extending ports, such as port 124, let such fluid pass through piston body 100 during compression and rebound movements within a shock tube 36 (see FIG. 1A).

Also retained between shaft 20 and piston body 100, a washer 118 and a flexible rebound shim stack assembly 98 are secured between nut 66 and piston body 100 in assembly as shown in FIG. 5. A pair of stepped circumferential grooves are provided in a radial outer surface of piston body 100 to secure a piston band seal 102 and a compression o-ring seal 104 there beneath. According to one construction, band seal 102 is a PTFE (polytetrafluoroethylene) bronze filled band seal. Optionally, any other suitable sealing surface and material can be used. Circumferential arrays of equally spaced-apart compression ports 94 and rebound ports 96 are provided between opposed faces of piston body 100 for enabling fluid, or oil to pass from one side of piston body 100 to an opposite side when mid-valve piston assembly 22 (see FIG. 1A) moves toward a compression chamber and a rebound chamber during respective compression and rebound stages of suspension travel. Concurrently, fluid also moves through port 70 from one side of piston body 100 to another side through piston body 100 and the amount of fluid flow is tailored, or tuned by presetting position of tapered metering pin end 134 relative to an opening on port, or bore 70 in order to tailor shock performance.

Figure 10:
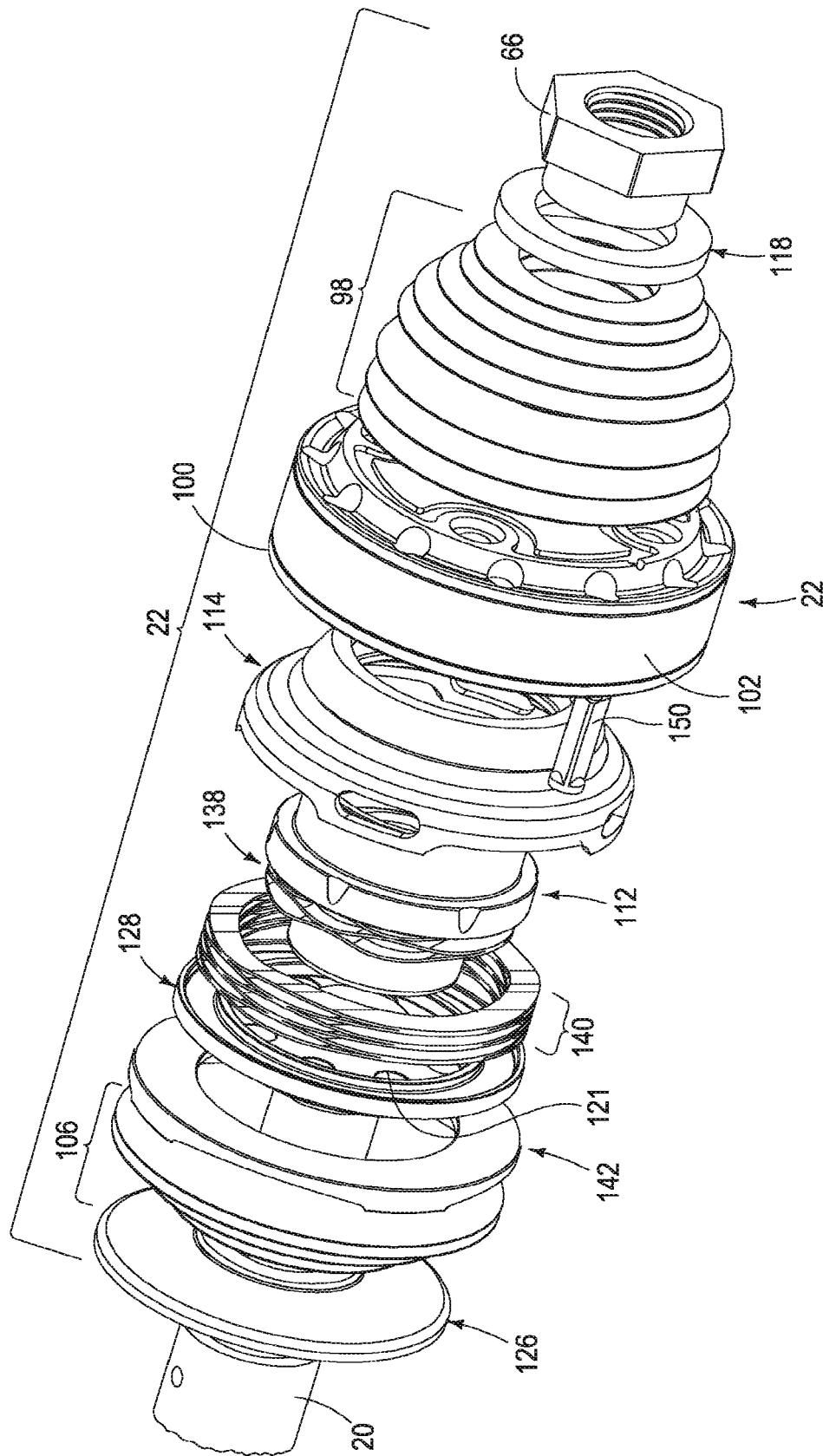
FIG. 10 is an exploded perspective view taken from the compression chamber end of the mid-valve piston assembly of FIG. 6 showing an opposed side depicted in FIG. 8.

In order to further add shock absorption and/or damping control to a shock assembly, fluid flow through ports 94 and 96 are resisted by the action of fluid flow past respective pistons and flow restrictors as shown in FIG. 5. More particularly, compression ports 94 each join together into an annular volumetric expansion chamber 116 where fluid, or oil builds pressure that urges a pair of circumferential pistons, an inner piston 112 and an outer piston 114 against a pair of corresponding inner spring stacks, such as inner spring stack 138 and outer spring stack 140. Spring stacks 138 and 140 are seated against a cylindrical stop plate 128 that is trapped about shaft 20 between a cylindrical spacer 120 and a cylindrical stack plate 142 and a cylindrical disk plate 126 such that piston assembly 22 is assembled together in stacked relation. An array of circumferentially equally spaced-apart ports 121 are provided through platen 128 (see also FIGS. 7 and 10) to enable fluid flow through plate 128. Similarly, rebound ports 96 covered on a compression chamber end by rebound shim stack assembly 98. Individual cylindrical spring plates of assembly 98 flex under fluid pressure from ports 96 to allow fluid passage through piston body 100 from a rebound chamber to a compression chamber on opposed sides of piston body 100. In this way, fluid flow through piston body 100 is regulated by flow path resistance of ports 96 and spring resistance of shim stack 98 during a rebound movement of mid-valve piston assembly 22.

As shown in FIG. 5, inner circumferential piston 112 and outer circumferential piston 114 each have a beveled, or frustoconical piston surface 188 and 190 that seats in parallel engagement with a respective stationary frustoconical piston valve seat 192 and 194. As inner piston 112 and outer piston 114 move away from piston body 100, surfaces 188 and 190 move away from seat surfaces 192 and 194, forming circumferential flow paths for fluid or oil to pass through piston body 100 from a compression chamber to a rebound chamber. Pursuant of a first implementation, inner spring stack 138 and outer spring stack 140 are constructed from wave coil springs of similar material. Since outer spring stack 140 has a larger diameter than inner spring stack 140, this results in outer spring stack 140 compressing before spring stack 138, enabling outer piston 114 to compress and open before inner piston 112. Optionally, spring stiffnesses between springs stacks 138 and 140 can be adjusted so that the inner spring stack compresses before or concurrently with the outer spring stack.

In addition to spring stacks 138 and 140 and pistons 112 and 114 resisting fluid flow during a compression stage of a shock, another compression shim, or spring stack 106 modifies the resulting fluid flow, as shown in FIG. 5. A first flow path downstream of pistons 112 and 114 is provided by a circumferential array of radially outwardly extending elongate oval-shaped ports 136 provided equally-distance spaced apart about an outer periphery of outer piston 114. A second flow path is provided when piston 114 is only partially compressed by a gap between a bottom edge of piston 114 and plate 142. A bottom edge of piston 114 includes a circumferential array of circumferentially equally spaced and scalloped relief vents, or gaps 119 provided in a bottom surface of stack plate 142 between adjacent legs 117. A third flow path is provided by a circumferential array of circumferentially equally spaced and scalloped relief vents, or gaps 132 provided in a bottom surface of stack plate 142. Each vent 132 is bordered on each end by a downward terminal leg 130. Shim stack 106 normally seats against legs 130. As fluid flow and pressure increase, individual shim springs of stack 106 flex downwardly and a further gap forms between stack 106 and a bottom outer-peripheral surface edge of plate 142, enabling a greater flow volume along such path during a compression phase of shock operation.

FIG. 5A is an enlarged view of a compression bleed rebound seal, or o-ring 108 taken from encircled region 5A of FIG. 5. More particularly, a tapered circumferential channel 110 is formed in a circumferential inner surface of outer piston 114, between piston 114 and an outer circumferential surface of inner piston 112. Channel 110 is tapered so as to widen extending towards a bottom edge, as shown in FIG. 5A. O-ring 108, shown in a lowered position within channel 110 provides a circumferential fluid passage between inner piston 112 and outer piston 114 for fluid flowing in a downward direction and raises to seat and seal any fluid flow when raised in an upward direction.

Figure 6:
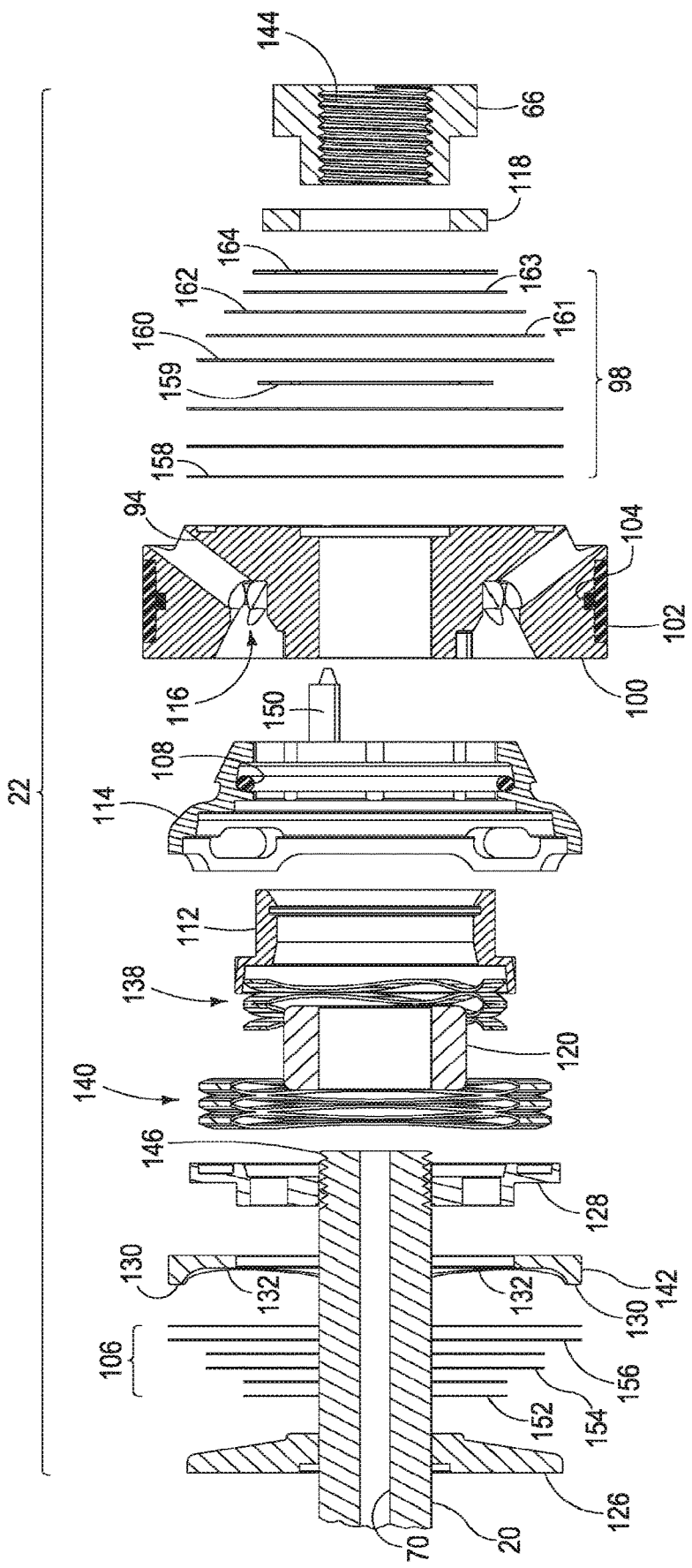
FIG. 6 is a midline vertical centerline sectional and exploded perspective view of the mid-valve piston assembly of FIG. 5.

FIGS. 6-10 variously show in exploded views the construction and components of mid-valve piston assembly 22 of FIG. 5. FIG. 6 is a midline vertical centerline sectional and exploded perspective view, while FIGS. 7-10 are various exploded perspective views of mid-valve piston assembly 22. As shown in FIG. 6, female threads 144 on nut 144 affix in threaded engagement with complementary male threads 146 on piston rod, or shaft 20 such that disc plate 126, compression shim stack assembly 106 (springs 152, 154 and 156), stack plate 142, stop plate 128, outer spring stack 140, spacer 120, inner spring stack 138, inner piston 112, outer piston 114, piston body 100, rebound shim stack assembly 98 (springs 158-164), and washer 118 are stacked together and entrapped between cylindrical shoulder 122 (see FIG. 7) on shaft 20 and nut 144. FIGS. 7-10 also show further construction and assembly details of such components.

As further shown in FIG. 6, central bore, or port 70 extends down piston shaft 20 to provide a fluid, or oil flow path. Scalloped edges, or vents 132 in stack plate 142 provide another fluid flow path. Inner piston 112 and outer piston 114 assemble inside of annular volumetric expansion chamber 116 which communicates with ports 94 and 96 (see FIG. 7). O-ring 108 is carried within a groove in piston 114 and band seal 102 and o-ring seal 104 are carried in corresponding cylindrical recesses in piston body 100. An axially movable needle valve 150 is carried within a port 151 (see FIG. 8) in outer piston 114. Further details of such components are shown variously in FIGS. 7-10.

Figure 7:
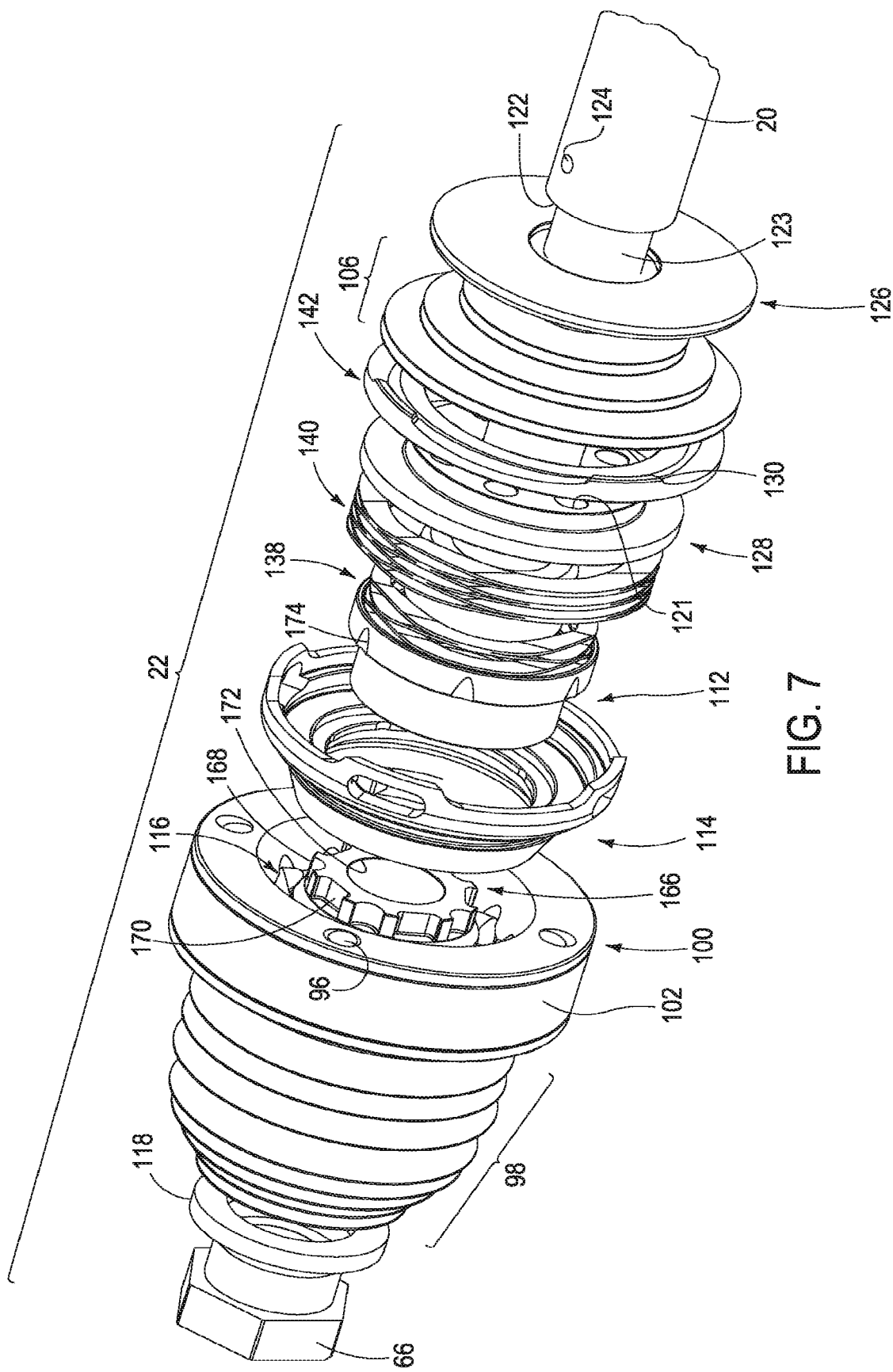
FIG. 7 is an exploded perspective view from the rebound end of the mid valve piston of FIG. 6.

As shown in FIG. 7, a sprocket-shaped hollow post 166 is provided centrally of and integrally with piston body 100. Post 166 includes an array of equally spaced-apart and radially outwardly extending fingers, or legs 168. Each adjacent pair of legs 168 are separated from one another by a flute, or groove 170, allowing inner cone piston 112 and inner cone frusta-conical seat 188 to slide concentrically and align and be guided by the circular circumferential bushing type surface caused by post 166 and a frustoconical piston seat 192 inner angular circumferential surface to create hydraulic fluid pathways by the flutes 170 when inner cone piston 112 opens and angularly exposing the flutes to a hydraulic fluid path extending hydraulic fluid flow towards spacer 120 with its end rounded edges and smaller diameter than that of inner cone piston 112 internal bore, allowing a smooth transfer of hydraulic fluid (not shown) pressure at an less angular fluid path flow and spreading or dissipating the dynamic fluid back pressure feedback threshold towards fluid exit or pathway through circumferential lower body end of the inner cone piston 112 and through inner wave spring 138 open gaps between coils and outer wave spring 140 gaps between coils and stop plate 128 inner circumferential array of ports (need a number) (best seen in FIG. 219A) and further fluid path from inner cone piston 112 extends to ports 136 and scallops 119 in outer cone piston 114 and scallops 132 in stack plate 142 flowing past the angular gaps of shim stack 106 making the spread of feedback hydraulic pressure to a minimum. Post 166 further includes a central bore 172. Furthermore, inner piston 112 includes an array of equally spaced-apart and radially inwardly extending flutes 174. Flutes 170 and 174 provide fluid flow paths in assembly under certain operating conditions. Port 124 is also shown in FIG. 7 adjacent to a reduced diameter end portion 123 of shaft 122.

FIGS. 11-34 variously illustrate mid-valve piston assembly 22 in various stages of operation including in a resting, unloaded state. FIGS. 11-18 show successive end and sectional views of piston assembly 22. FIGS. 19-30D show successive end, sectional and enlarged partial sectional views of piston assembly 22. FIGS. 31-34 show enlarged component sectional perspective views from above of the mid-valve piston assembly 22 for the shock absorber 10 of FIG. 1.

Figure 11:
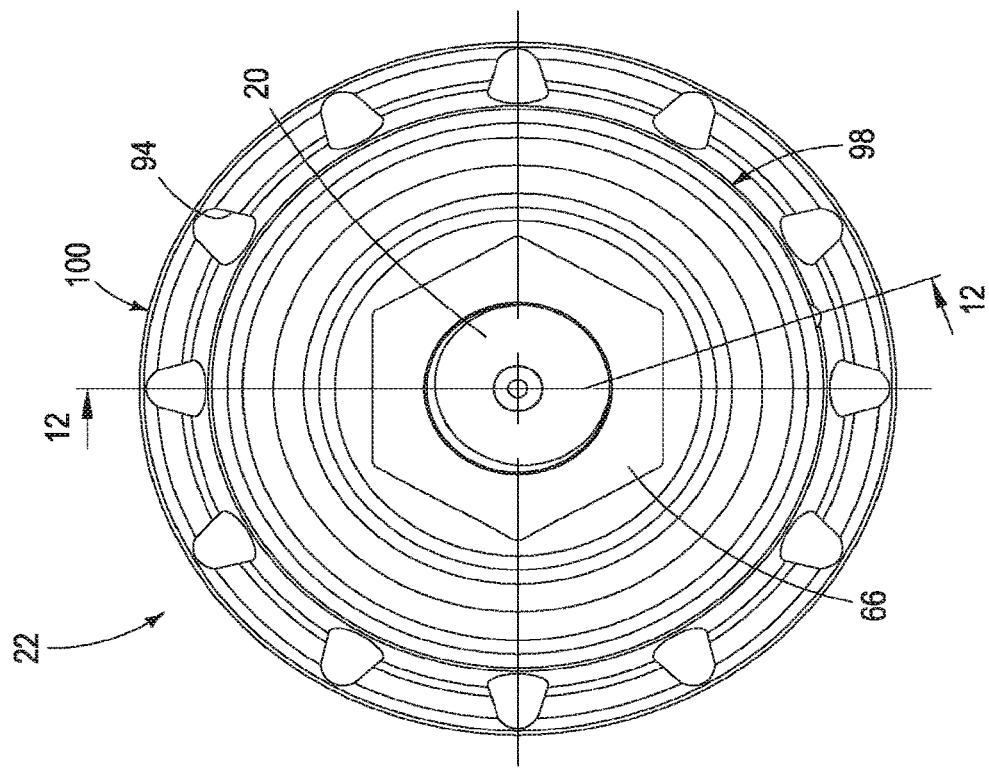
FIG. 11 is an end view of the mid-valve piston assembly taken from the compression end.

FIG. 11 is an end view of the mid-valve piston assembly 22 taken from the compression end of a shock absorber. More particularly, piston assembly 22 in end view shows a circumferential array of compression ports 94 about central piston rod shaft 20 and nut 66. Ports 94 are just outboard of an outer peripheral portion of rebound shim stack assembly 98.

Figure 12:
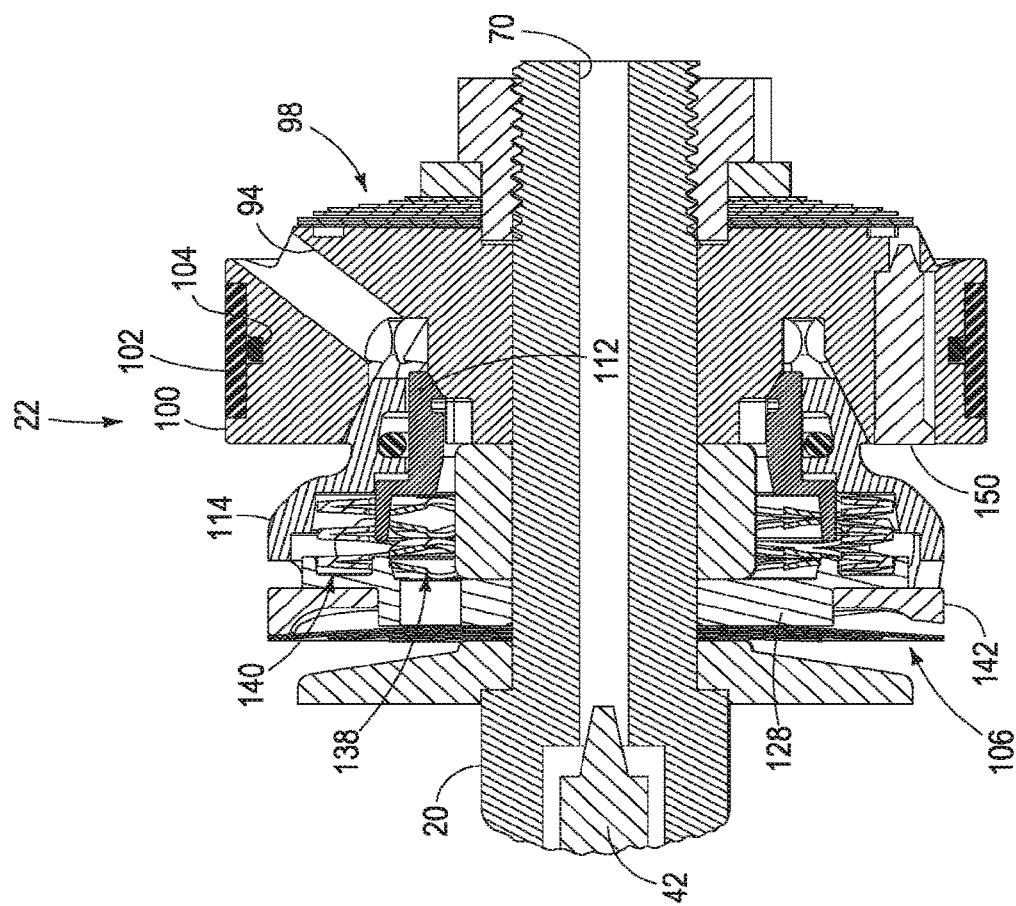
FIG. 12 is a compound sectional view of the mid-valve piston assembly taken along compound line 12-12 of FIG. 11.

FIG. 12 is a compound sectional view of the mid-valve piston assembly 22 taken along compound line 12-12 of FIG. 11 and showing the mid-valve piston assembly 22 in a static state without any fluid flow. More particularly, rebound needle 42 is shown positioned in bore 70 of shaft 20, while shim stack assemblies 98 and 106 and pistons 112 and 114 are shown in fluid flow closed positions. Springs stacks 138 and 140 are fully expanded to seat pistons 112 and 114 into piston body 100. In such static state, no fluid is moving through ports 94 and shim stack assembly 106 is seated against portions, or legs 130 of stack plate 142 and is held against stop plate 128 by shim stack 106 preload. Stack plate 142 consist of legs 130 with many different configurations and spacings such as three legs 130 or four legs 130 to perform many kinds of shim deformation tactics, such as longer legs 130 on two opposing sides and 2 shorter legs 130 on two opposing sides inner legs 130 and outer legs 130 with different length legs 130 making shim stack 106 deformation flex and preload spring force to act as a more progressive stack 106 with less preload or a less progressive stack 106 with more preload, creating an endless variation of stack plate 142 configuration to match a suitable ratio of stack plate 142 outer cone piston 114 preload and progression to outer cone piston 114 as it opens frustoconically away from the piston 100. Piston band seal 102 and O-ring seal 104 are carried with body 100 and are not moving relative to the piston tube (not shown). Finally, needle valve 150 is shown closed within body 100. It is understood that needle valve 150 has a central shaft with three sides, two adjacent sides are flat, and a third side is curved and convex. The terminal tip end of the needle valve 150 has a conical tapering end and the head end is flared and enlarged. As the needle valve 150 acts, compression fluid flow direction is allowed and the needle flows back into its stepped orifice 151 and seals during a rebound stroke, making the needle valve 150 a one-way check valve.

FIG. 13 is an end view of the mid-valve piston assembly 22 taken from the compression end and showing a compound section taken to realize cross-section views for FIGS. 14-22.

FIG. 14 is a compound sectional view of the mid-valve piston assembly 22 taken along compound line 14-14 of FIG. 13 and showing the mid-valve piston assembly 22 in a static state without any fluid flow. The compound cross-section is taken through both ports 94 and 96 and shows springs 138 and 140 in a fully expanded state that closes pistons 112 and 114 against piston body 100 to minimize volume of annular chamber 116. Shim stack assembly 106 is closed at rest but in a preloaded state against stack plate 142 while springs 138 and 140 are seated against plate 128. Shim stack assembly 98 is also closed at rest against a top face of piston body 100 which means each cylindrical spring plate 99 is flat.

FIG. 14A is an enlarged encircled region 14A from FIG. 14 showing a gap 176 between a rear edge of the outer piston 114 and a forward surface of stack plate 142.

FIG. 14B is a gap 178 between a rear edge of the inner piston 112 and a forward surface of the stop plate 128 from the enlarged encircled region 14B from FIG. 14.

FIG. 14C is a gap 180 between an inner shelf of the outer piston 114 and an outer shelf of the inner piston 112 from the enlarged encircled region 14C from FIG. 14.

FIG. 15 is a compound sectional view of the mid-valve piston assembly 22 taken along compound line 15-15 of FIG. 13 and showing the mid-valve piston assembly 22 in a small fluid flow rate state where fluid passes between inner piston 112 and outer piston 114 as o-ring seal is in an open position. The compound cross-section is taken through both ports 94 and 96 and shows springs 138 and 140 in a slightly loaded state that closes piston 112 and starts to slightly open piston 114 relative to piston body 100 to slightly increase fluid flow from annular chamber 116. Shim stack assembly 106 is closed at rest against plate 142 while springs 138 and 140 are seated against plate 128. Shim stack assembly 98 is also closed at rest against a top face of piston body 100 which means each cylindrical spring plate 99 is flat. Optionally, a small taper can be provided on the face of piston 100 on the rebound side creating an initial load tension or preload to the shock stack 98.

FIG. 15A is an enlarged encircled region 15A from FIG. 15 showing a closed gap 176 between a rear edge of the outer piston 114 and a forward surface of the stack plate 142.

FIG. 15B is a gap 178 between a rear edge of the inner piston 112 and a forward surface of the stop plate 128 from the enlarged encircled region 15B from FIG. 15.

FIG. 15C is a partially smaller gap 180 between an inner shelf of the outer piston 114 and an outer shelf of the inner piston 112 smaller than depicted in FIG. 14C from the enlarged encircled region 15C from FIG. 15.

FIG. 16 is a compound sectional view of the mid-valve piston assembly taken along compound line 16-16 of FIG. 13 and showing the mid-valve piston assembly 22 in a small-to-medium fluid flow rate state. The compound cross-section is taken through both ports 94 and 96 and shows springs 138 and 140 in an increased loaded state over that shown in FIG. 14 that closes inner piston 112 and partially opens outer piston 114 relative to piston body 100 to form a frustoconical fluid flow gap 182 that further increases fluid flow from annular chamber 116. Shim stack assembly 106 is urged rearward by stack plate 142 and outer piston 114 while springs 138 and 140 are seated and compressed against stop plate 128. Shim stack assembly 98 is also closed at rest against a top face of piston body 100 which means each cylindrical spring plate 99 is flat.

FIG. 16A is an enlarged encircled region 16A from FIG. 16 showing a closed gap 176 between a rear edge of the outer piston 114 and a forward surface of the stack plate 142.

FIG. 16B is a gap 178 between a rear edge of the inner piston 112 and a forward surface of the stop plate 128 similar in size to that shown in FIG. 15B from the enlarged encircled region 16B from FIG. 16.

FIG. 16C is a closed gap 180 between an inner shelf of the outer piston 114 and an outer shelf of the inner piston 112 smaller than depicted in FIG. 15C from the enlarged encircled region 16C from FIG. 16.

FIG. 17 is a compound sectional view of the mid-valve piston assembly 22 taken along compound line 17-17 of FIG. 13 and showing the mid-valve piston assembly 22 in a large fluid flow rate state. The compound cross-section is taken through both ports 94 and 96 and shows both inner piston 112 and outer piston 114 compressed against their respective springs in large, or maximum loaded state over that shown in FIG. 14 that fully opens both inner piston 112 and outer piston 114 relative to piston body 100 to form an outer frustoconical fluid flow gap 182 and an inner frustoconical fluid flow gap 186 that further increases fluid flow from the annular chamber. Shim stack assembly 106 is urged even further rearward by stack plate 142 (than in FIG. 16) and outer piston 114 while springs 138 and 140 are further seated and compressed against plate 128. Shim stack assembly 98 is also closed at rest against a top face of piston body 100 which means each cylindrical spring plate 99 is flat. Shim stack assembly 98 opens on a rebound phase of operation.

FIG. 17A is an enlarged encircled region 17A from FIG. 17 showing a closed gap 176 between a rear edge of the outer piston 114 and a forward surface of the stack plate 142.

FIG. 17B is a closed gap 178 between a rear edge of the inner piston 112 and a forward surface of the stop plate 128 from the enlarged encircled region 17B from FIG. 17.

FIG. 17C is a closed gap 180 between an inner shelf of the outer piston 114 and an outer shelf of the inner piston 112 than depicted in FIG. 16C from the enlarged encircled region 17C from FIG. 17.

FIG. 17D is an unseated o-ring 108 in a circumferential channel 110 within an inner wall of the outer piston from the encircled region 17D of FIG. 17.

FIG. 18 is a sectional view of the mid-valve piston assembly 22 taken along compound line 18-18 of FIG. 13 and showing the mid-valve piston assembly 22 in a static, or zero fluid flow rate state. The compound cross-section is taken through both ports 94 and 96 and shows both inner piston 112 and outer piston 114 closed relative to piston body 100 that minimizes size of the annular chamber. Shim stack assembly 106 is in a resting state seated against plate 142 and outer piston 114 while springs 138 and 140 are in their fully extended state against plate 128. Shim stack assembly 98 is also closed at rest against a top face of piston body 100 which means each cylindrical spring plate is flat. Shim stack assembly 98 opens on a rebound phase of operation.

FIG. 18A is a seated o-ring 108 in a circumferential channel 110 within an inner wall of the outer piston 114 from the encircled region 18A of FIG. 18 showing o-ring 108 in a sealed position that stops fluid flow towards the compression chamber of a shock absorber.

FIG. 18B is a circumferential gap 184 between the inner piston 112 and the outer piston 114 shown in the enlarged encircled region 18B of FIG. 18.

FIG. 19 is a sectional view of the mid-valve piston assembly 22 with the inner piston 112 and the outer piston 114 in a closed position against piston body 100 in a static state and the compression bleed rebound o-ring seal 108 closed and taken along compound line 19-19 of FIG. 13.

FIG. 19A is an enlarged encircled region from FIG. 19 of the inner piston 112 and the outer piston 114 for the mid-valve piston assembly 22 and the compression bleed rebound o-ring seal 108 shown in a static, unloaded state. More particularly, inner spring stack 112 and outer spring stack 114 are both expanded while o-ring seal 108 is driven forward within circumferential channel 110 to seal any fluid passage between inner piston 112 and outer piston 114. Likewise, pistons 112 and 114 are fully seated against piston body 100 to prevent any fluid exchange with compression port 94 chamber 116. Piston, or cone 112 has an inner circumferential ledge 125, while piston, or cone 114 has an outer circumferential ledge 127. Ledges 125 and 127 provide fluid driving surfaces that urge pistons 112 and 114, respectively, into engagement with piston body 100 during a rebound initiation of a shock absorber.

FIG. 20 is a sectional view of the mid-valve piston assembly 22 with the inner piston 112 and the outer piston 114 urged against piston body 100 in a small flow position and with the compression bleed rebound o-ring seal open and taken along compound line 20-20 of FIG. 13.

FIG. 20A is an enlarged encircled region from FIG. 20 of the inner piston 112 and the outer piston 114 for the mid-valve piston assembly 22 and the compression bleed rebound o-ring seal 108 shown in an open flow position within circumferential channel 110. In the small flow position, o-ring seal 108 enables fluid flow between piston 112 and piston 114 while engaged against piston base 100 via flow path 184 during a compression shock absorption phase. In this manner, fluid or oil flows from port 94 and chamber 116 into circumferential (or frustoconical) flow path 184. Flutes 184 enable fluid flow from fluid path 184 to the rebound side of piston body 100 and around springs 138 and 140.

FIG. 21 is a sectional view of the mid-valve piston assembly 22 taken along line 21-21 of FIG. 13 with the inner piston 112 urged against piston body 100 and the and the outer piston 114 urged slightly away from piston body 100 in a small/medium flow position and with the compression bleed rebound o-ring seal open and taken along line 20-20 of FIG. 13.

FIG. 21A is an enlarged encircled region from FIG. 21 of the inner piston 112 and the outer piston 114 for the mid-valve piston assembly 22 and the compression bleed rebound o-ring seal 108 shown in an open flow position within circumferential channel 110. In the small flow position, o-ring seal 108 enables fluid flow between piston 112 and piston 114 along a flow path between pistons 112 and 114. Inner piston 112 is still engaged against piston base 100 and spring stack 138 during such a compression shock absorption phase, while outer piston 114 is urged against spring stack 140, compressing stack 140 to provide a circumferential and frustoconical fluid flow path 182 between piston 114 and piston body 100. In this manner, fluid or oil flows from port 94 and chamber 116 into flow path 182 and between pistons 112 and 114.

Figure 22A:
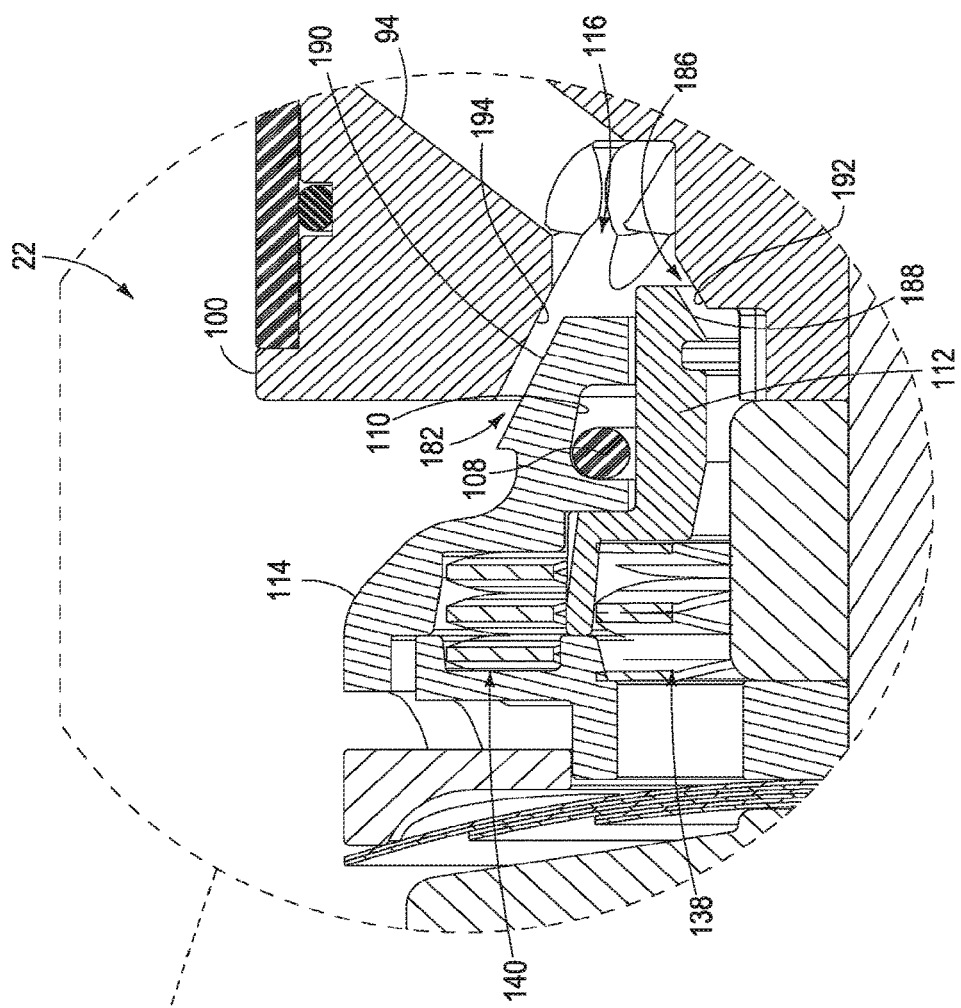
FIG. 22A is an enlarged encircled region from FIG. 22.
Figure 22:
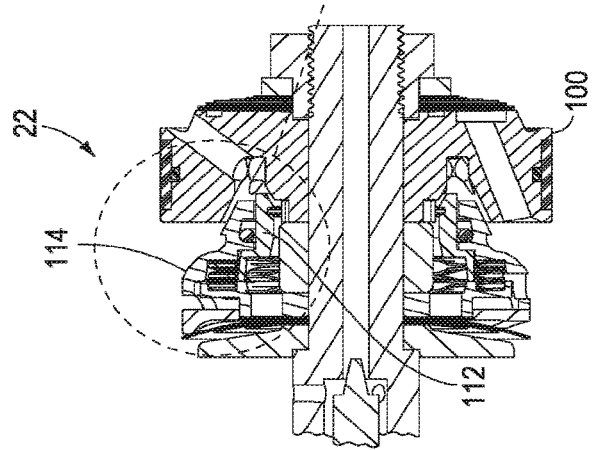
FIG. 22 is a compound sectional view of the mid-valve piston assembly showing a fully open inner piston and outer piston and o-ring in an open position taken along compound line 22-22 of FIG. 13.

FIG. 22 is a sectional view of the mid-valve piston assembly 22 taken along line 22-22 of FIG. 13 with the inner piston 112 urged fully away from the piston body 100 and the and the outer piston 114 urged fully away from piston body 100 in a large flow position and with the compression bleed rebound o-ring seal 108 open and taken along line 20-20 of FIG. 13.

FIG. 22A is an enlarged encircled region from FIG. 22 of the inner piston 112 and the outer piston 114 for the mid-valve piston assembly 22 and the compression bleed rebound o-ring seal 108 shown in an open flow position within circumferential channel 110. In the small flow position, o-ring seal 108 enables fluid flow between piston 112 and piston 114 along a flow path between pistons 112 and 114. Inner piston 112 is disengaged from piston base 100 and urged against spring stack 138 during such a compression shock absorption phase to form a cylindrical, or frustoconical flow path 186, while outer piston 114 is urged against spring stack 140, compressing stack 140 to provide a circumferential and frustoconical fluid flow path 182 between piston 114 and piston body 100. In this manner, fluid or oil flows from port 94 and chamber 116 into flow paths 182 and 186, and between pistons 112 and 114.

As shown in FIG. 22A, a first frustoconical piston contact surface 188 on inner piston 112 engages and disengages with a complementary first frustoconical valve seat 192 on body 100. A second frustoconical piston contact surface 190 on outer piston 114 engages and disengages with a complementary second frustoconical valve seat 194 on body 100. Although surfaces 188 and 190 and seats 192 and 194 are shown as frustoconical surfaces, they are also conical sections, and it is understood that they can alternatively be conical, frustoconical, curved conical segments or surfaces, linear conical surfaces or portions, or any portion or circumferential or partial circumferential surface geometry capable of providing passage of fluid between the piston body 100 and the pistons 112 and 114.

FIG. 23 is an end view of the mid-valve piston assembly 22 taken from the compression end and showing a compound section taken to realize the cross-sectional view for FIG. 24.

FIG. 24 is a centerline sectional view of the mid-valve piston assembly 22 taken along line 24-24 of FIG. 23 showing a static no fluid flow condition.

FIG. 24A is an enlarged encircled region from FIG. 24 of the inner piston 112 and the outer piston 114 for the mid-valve piston assembly 22 both closed against the piston body 100 from force of respective spring stacks 138 and 140 during a static no fluid flow condition and showing the compression bleed rebound o-ring seal 108 in a closed or sealed position within circumferential channel 110.

FIG. 24B is an enlarged encircled region 24B from FIG. 24A showing a small gap 176 between a rear edge of the outer piston 114 and a forward surface of the stack plate 142.

FIG. 24C is a gap 178 between a rear edge of the inner piston 112 and a forward surface of the stop plate 128 from the enlarged encircled region 24C from FIG. 24A.

FIG. 24D is a gap 180 between an inner shelf of the outer piston 114 and an outer shelf of the inner piston 112 from the enlarged encircled region 24D from FIG. 24A.

FIG. 25 is an end view of the mid-valve piston assembly 22 from the compression end and showing a compound section taken to realize the cross-sectional view for FIG. 26.

FIG. 26 is a centerline sectional view of the mid-valve piston assembly 22 taken along line 26-26 of FIG. 25 showing a small fluid flow condition.

FIG. 26A is an enlarged encircled region from FIG. 26 of the inner piston 112 and the outer piston 114 for the mid-valve piston assembly 22 both closed against the piston body 100 (with rebound return port 96) from force of respective spring stacks 138 and 140 during a small fluid flow condition and showing the compression bleed rebound o-ring seal 108 in an open fluid flow position within circumferential channel 110.

FIG. 26B is an enlarged encircled region 26B from FIG. 26A showing a closed gap 176 between a rear edge of the outer piston 114 and a forward surface of the stack plate 142.

FIG. 26C is a gap 178 between a rear edge of the inner piston 112 and a forward surface of the stop plate 128 from the enlarged encircled region 26C from FIG. 26A.

FIG. 26D is a gap 180 between an inner shelf of the outer piston 114 and an outer shelf of the inner piston 112 from the enlarged encircled region 26D from FIG. 26A.

FIG. 27 is an end view of the mid-valve piston assembly 22 from the compression end and showing a compound section taken to realize the cross-sectional view for FIG. 28.

FIG. 28 is a centerline sectional view of the mid-valve piston assembly 22 taken along line 28-28 of FIG. 27 showing a small/medium fluid flow condition.

FIG. 28A is an enlarged encircled region from FIG. 28 of the inner piston 112 and the outer piston 114 for the mid-valve piston assembly 22 with the inner piston 112 closed against the piston body 100 (with return port 96) and the outer piston 114 open relative to the piston body acting against the force of respective spring stacks 138 and 140 during a small-to-medium fluid flow condition and showing the compression bleed rebound o-ring seal 108 in an open fluid flow position within circumferential channel 110.

FIG. 28B is an enlarged encircled region 28B from FIG. 28A showing a gap 176 between a rear edge of the outer piston 114 and a forward surface of the stack plate 142.

FIG. 28C is a gap 178 between a rear edge of the inner piston 112 and a forward surface of the stop plate 178 from the enlarged encircled region 28C from FIG. 28A.

FIG. 28D is a closed gap 180 between an inner shelf of the outer piston. 114 and an outer shelf of the inner piston 112 from the enlarged encircled region 28D from FIG. 28A.

FIG. 29 is an end view of the mid-valve piston assembly 22 from the compression end and showing a compound section taken to realize the cross-sectional view for FIG. 30.

FIG. 30 is a centerline sectional view of the mid-valve piston assembly 22 taken along line 30-30 of FIG. 29 showing a large fluid flow condition.

FIG. 30A is an enlarged encircled region from FIG. 30 of the inner piston 112 and the outer piston 114 for the mid-valve piston assembly 22 both open fully relative to the piston body 100 (with return port 96) acting against the force of respective spring stacks 138 and 140 during a full fluid flow condition to provide fluid flow paths 186 and 190 between surface 188 and seat 192 and surface 190 and seat 194, and further showing the compression bleed rebound o-ring seal 108 in an open fluid flow position within circumferential channel 110.

FIG. 30B is an enlarged encircled region 30B from FIG. 30A showing a closed gap 176 between a rear edge of the outer piston 114 and a forward surface of the stack plate 142.

FIG. 30C is a closed gap 178 between a rear edge of the inner piston 112 and a forward surface of the stop plate 128 from the enlarged encircled region 30C from FIG. 30A.

FIG. 30D is a closed gap 180 between an inner shelf of the outer piston 114 and an outer shelf of the inner piston 112 from the enlarged encircled region 30D from FIG. 30A.

FIG. 31 is an enlarged component compound sectional perspective view from above of the mid-valve piston assembly 22 for the shock absorber of FIG. 1 showing the compression bleed rebound seal 108 in a fluid flow closed position and further showing the inner piston 112 and the outer piston 114 in a closed position urged against piston body 100 corresponding with a static no fluid flow condition.

FIG. 31A is an enlarged view of encircled region 31A from FIG. 31 of the inner piston 112 and the outer piston 114 for the mid-valve piston assembly 22 and the compression bleed rebound o-ring seal 108 shown in a raised closed flow position within circumferential channel to prevent fluid flow between pistons 112 and 114.

FIG. 32 is an enlarged component compound sectional perspective view from above of the mid-valve piston assembly 22 of FIG. 31 in a small flow position and showing the inner piston 112 and the outer piston 114 in a closed fluid flow position, but showing the compression bleed rebound seal 108 downward in circumferential channel 110 in an open flow position to enable fluid flow between pistons 112 and 114.

FIG. 32A is an enlarged view of encircled region 32A from FIG. 32 of the inner piston 112 and the outer piston 114 closed against the piston body 100 for the mid-valve piston assembly 22 and the compression bleed rebound o-ring seal 108 lowered in circumferential channel 110 to provide fluid flow between pistons 112 and 114.

Figures 33, 33A:
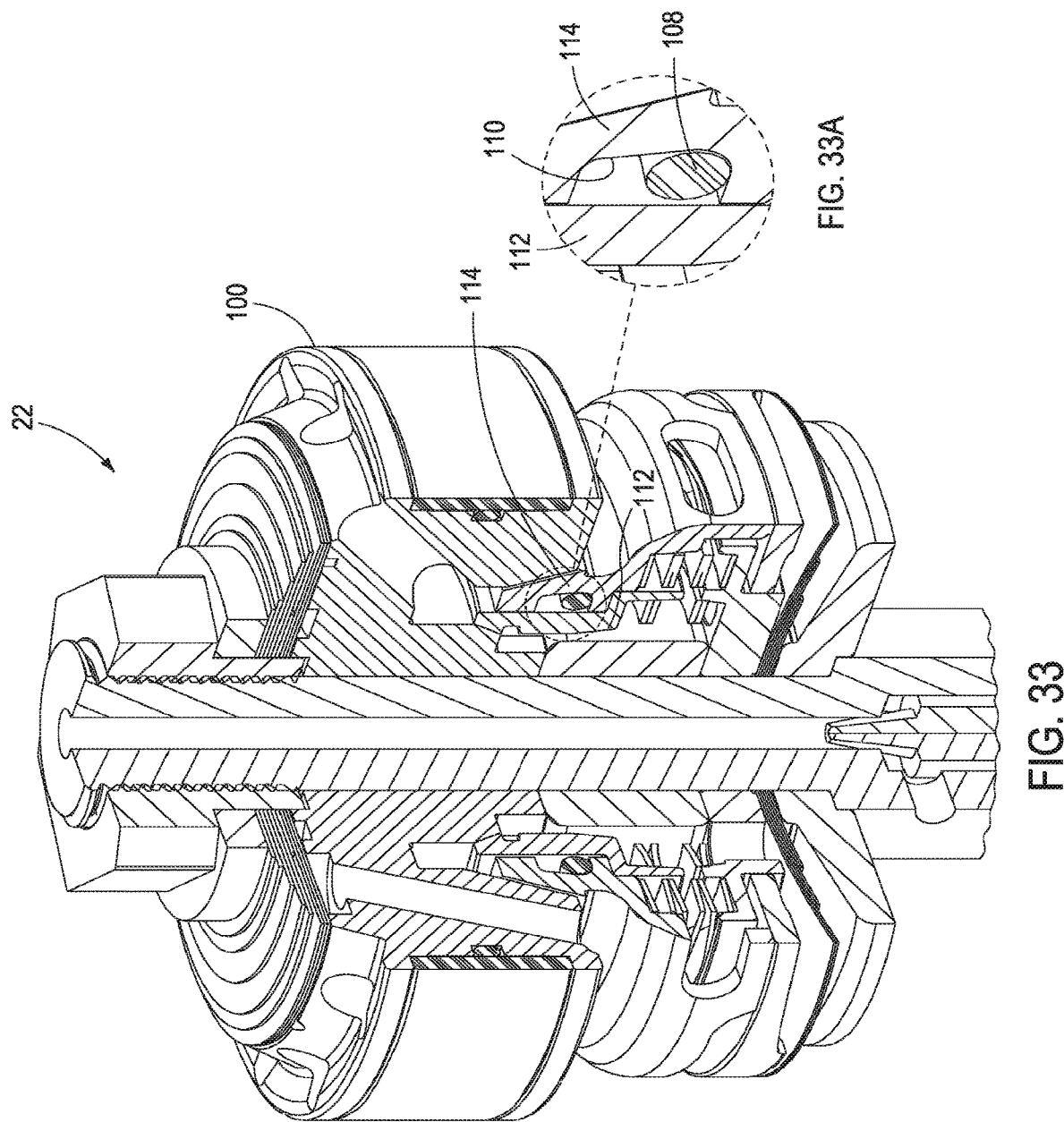
FIG. 33 is an enlarged component compound sectional perspective view from above of the mid-valve piston assembly of FIG. 31 showing the compression bleed rebound seal in a compression open flow position and showing the inner piston in a closed position and the outer piston in an intermediate open position.
FIG. 33A is an enlarged view of encircled region 33A from FIG. 33 of the inner and outer piston for the mid-valve piston assembly and the compression bleed rebound o-ring seal.

FIG. 33 is an enlarged component compound sectional perspective view from above of the mid-valve piston assembly 22 of FIG. 31-32 in a small/medium fluid flow position showing the compression bleed rebound seal 108 in a downward open fluid flow position enabling fluid flow between pistons 112 and 114 and showing the inner piston 112 in a closed position and the outer piston 114 in an intermediate open position.

FIG. 33A is an enlarged view of encircled region 33A from FIG. 33 of the inner piston 112 and the outer piston 114 for the mid-valve piston assembly 22 (of FIG. 33) for a small/medium fluid flow condition where the outer piston is axially displaced from piston body 100 and the inner piston 112 is urged against piston body 100, and the compression bleed rebound o-ring seal 108 is seated downwardly within circumferential chamber 110 to provide a fluid flow passage between pistons 112 and 114.

Figure 34:
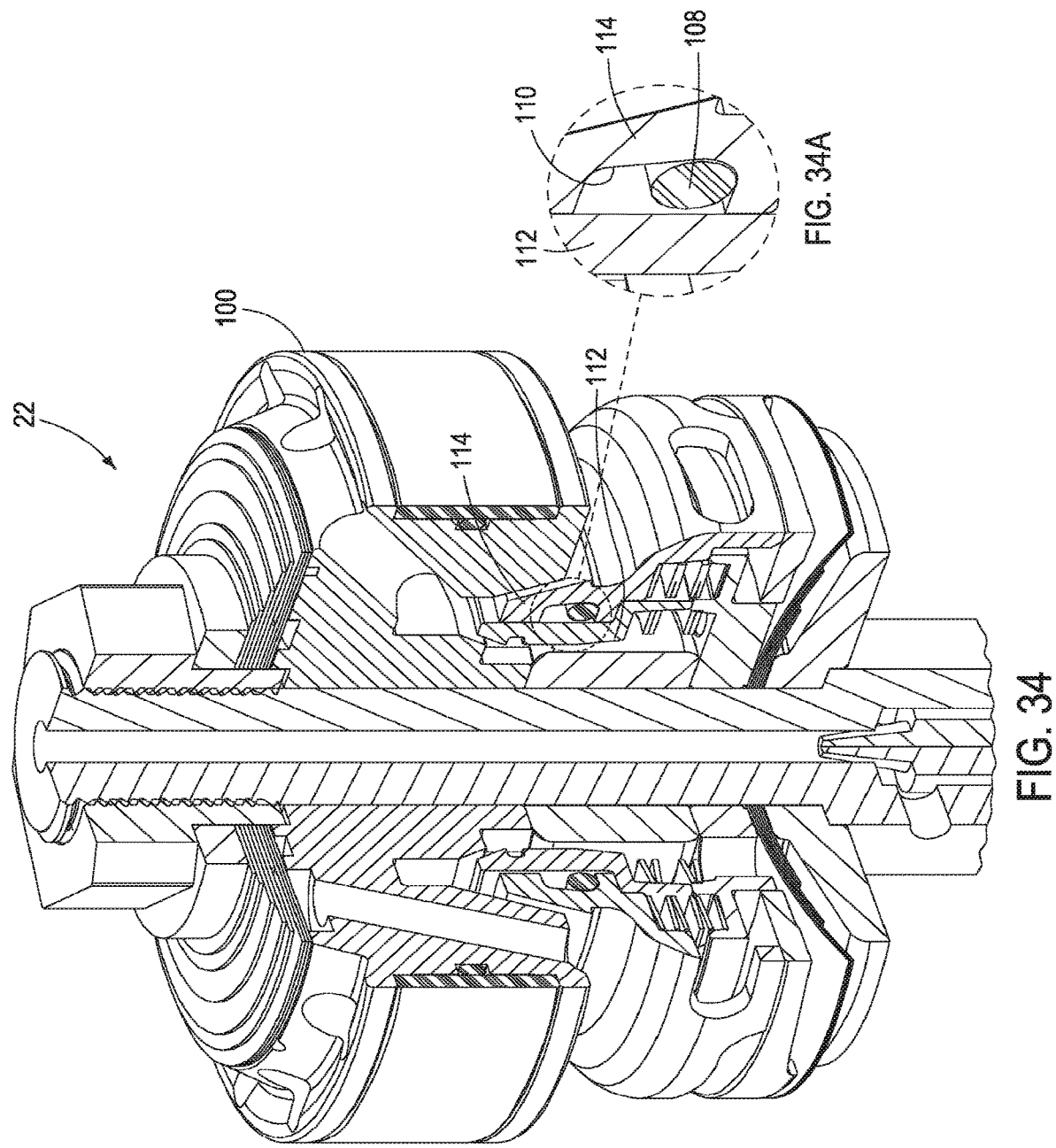
FIG. 34 is an enlarged component compound sectional perspective view from above of the mid-valve piston assembly for the shock absorber of FIG. 1 showing the compression bleed rebound seal in a rebound open position and showing the inner piston and the outer piston both in a closed position.

FIG. 34 is an enlarged component compound sectional perspective view from above of the mid-valve piston assembly for the shock absorber of FIGS. 31-33 showing a large fluid flow position with the compression bleed rebound seal in a downward open fluid flow position enabling fluid flow between pistons 112 and 114, and further showing the inner piston 112 and the outer piston 114 both in a fully open fluid flow position relative to the piston body 100.

FIG. 34A is an enlarged view of encircled region 34A from FIG. 34 of the inner piston 112 and the outer piston 114 for the mid-valve piston assembly and showing the compression bleed rebound o-ring seal 108 in a downward open position at a large or maximum fluid flow position within circumferential channel 110 enabling fluid flow between pistons 112 and 114 while fluid also flows between both of pistons 112 and 114 and the piston body.

Figure 35:
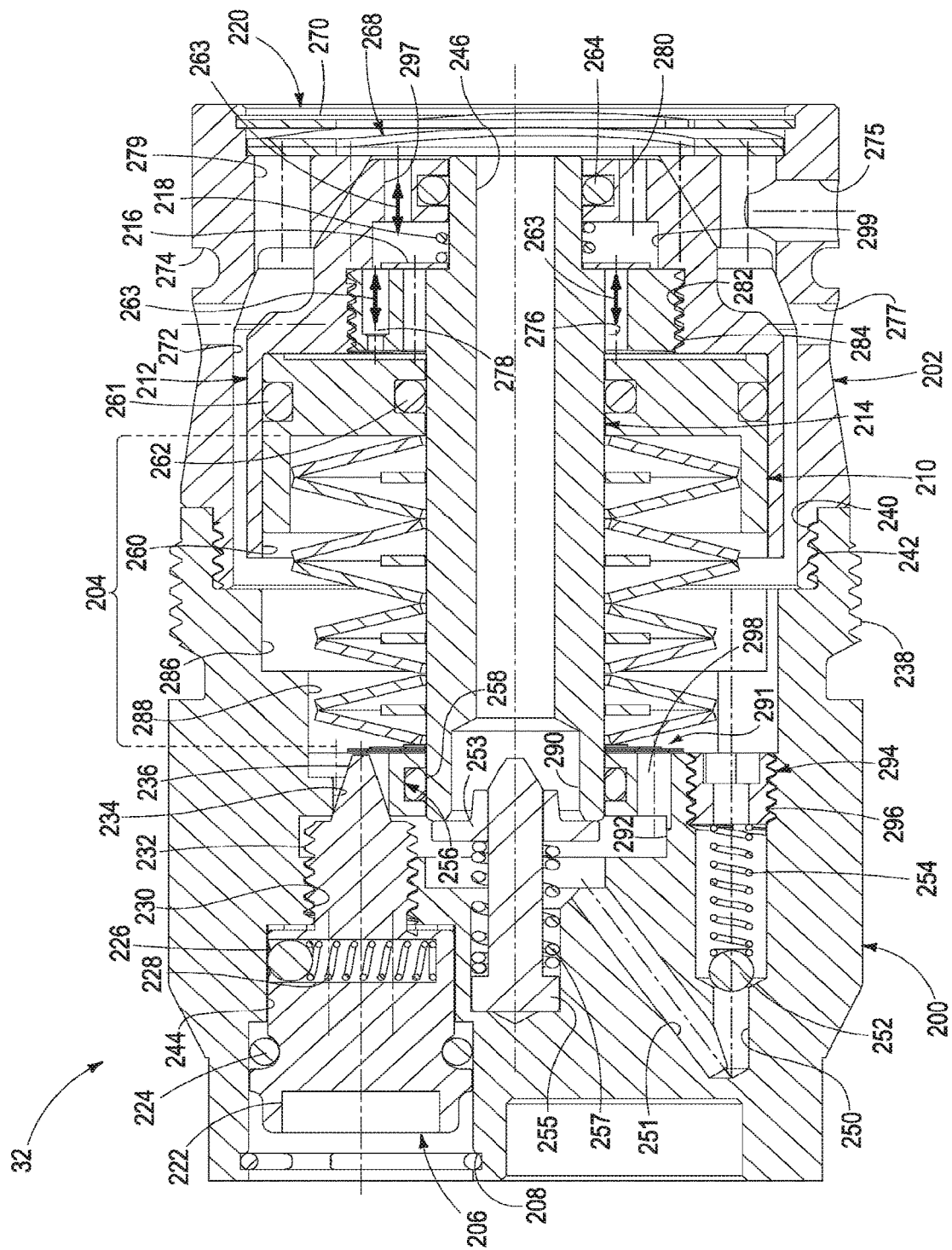
FIG. 35 is a centerline sectional view of the primary auxiliary hydraulic fluid valve as shown in centerline section in FIGS. 1-3 depicting the valve at a shock unloaded state before receiving any auxiliary fluid from the shock with the pump piston sprung to the right.

FIG. 35 is a centerline sectional view of the primary auxiliary hydraulic fluid valve 32 as shown in section in FIGS. 1-3 depicting the valve 32 at a shock unloaded state before receiving any auxiliary fluid (not shown) from the shock with the pump piston 210 sprung to the right. More particularly, fluid valve 32 includes a cap body 200 affixed in threaded engagement with an outer base 202 via male threaded portion 242 and female threaded portion 240 to form a housing. Optionally, cap 200 and body 202 can be press fitted together with tight tolerances. An o-ring groove pictured in FIG. 2 fits the outer periphery grove of valve 32 cap closest to the external portion of body 16, when threaded into housing 16 in FIG. 1A creating a seal barrier between the inner shock and outer shock to retain hydraulic fluid and hydraulic fluid pressure within the shock assembly 10 when threaded in via mating threads 238 coupling the primary auxiliary valve 32 to upper shock housing 16 and or 28. A pump piston 210 is carried for reciprocating movement about an alignment shaft tube body 214 and within an inner cylindrical bore 260 for pump piston 210 of a conical piston body 212. A pair of o-ring seals 261 and 262 seal piston 210 for reciprocation between alignment shaft tube body 214 and body 212. Conical piston body 212 is axially reciprocated relative to a frustoconical seat, or surface 302 (see FIG. 36) of outer base 202. A check valve assembly 220 is provided at an open end of valve 32 with a stack of springs 268 and a slit lock ring 270. A check shim 216 and a coil spring 218 seats against a cylindrical array of ports 276 about a cylindrical flange of alignment shaft tube body 214 (see FIG. 48) and within a bore 299 of outer base 202. A male threaded portion 284 on body 214 is engaged with a complementary threaded portion 282 on cone body 212. A spring stack 204 extends from a shim stack 291 inside of an inner bore within pump piston 210. An adjustable flow volume clicker screw 206 is threaded into cap 200 with male threads 232 engaging in complementary relation with female threads 230. A ball 226 is sprung with coil spring 228 to engage with a discrete number of detents 244 (see FIG. 50) about a periphery of the bore in which screw 206 is seated. An o-ring 224 fits into a groove about threaded screw clicker 206 and seals between the screw 206 and primary cap 200 containing fluid pressure within the valve assembly 32. A tool slot 222 in screw 206 enables rotation to discrete locations defined by each detent 244. A c-shaped snap ring 208 is seated in a circumferential groove to retain screw 206. A metering pin 236 on screw 206 is axially adjusted within a metering pin hole 234 to adjust fluid flow from a central bore 246 via plate 253, spring 257 and pin 255 as fluid pressure moves plate 253 against coil spring 257 forming an annular gap with bore 290. Pin 255 is slidably received in a complementary cylindrical bore 259.

A circumferential array of equally spaced apart bores 277 provides a fluid flow out and in of the outer base 202. A male threaded portion 242 and a female threaded portion 240 are used to secure together adjuster 206 to make a shock absorber adjuster assembly. The assembly of adjuster 32 uses male threaded portion 238 to secure adjuster 32 into the shock absorber cap assembly 16 (see FIG. 1A). An assembly bleed bore 275 in the outer periphery of outer base 202 accommodates installation of Primary valve assembly 32 into shock housing 16 to create a fluid bleed to o-ring (not shown) and to add a bypass flow leak as one option to gain fluid flow through fluid bypass port 275 or better known as assembly bleed bore 275, making a small bypass bleed around the valving structure 32 tuned to precisely acquiesce a non-covered restriction flow path without changing a hydraulic fluid pressure frequency more aggressively by making a non-covered restriction bleed flow path internally and harming the integrity of the primary auxiliary valves 32 pressure building seats.

An array of circumferential fluid ports 279 receive fluid in a rebound shaft 20 movement of piston mid-valve assembly 22 (see FIG. 3) causing fluid to leave the reservoir chamber 34 and fluid chamber 82 presses via gas pressure in chamber 84 separator piston 48 and hydraulic fluid flows through fluid port 86 and around the outer base 202 outer periphery and into an exterior array of fluid ports 277, entering fluid port 279 and penetrating check valve assembly 220 by method of opening check shims 268 and flowing back to shock body compression chamber 76 through fluid port 62. Conical piston body 212 forms a first piston and pump piston 210 forms a second piston. Conical piston body 212 provides a valve body that engages along frustoconical seat, or seal 300 with frustoconical valve seat 302.

A male threaded plug, or set screw 294 having a central through-bore engages with complementary female threads 296 in cap body 200 to provide a flow restriction that is metered with a ball 252 and a coil spring 254, receiving fluid flow from connecting ports 250 and 251. Internal bores 272, 286, and 288 in the resulting housing formed by cap 200 and outer base 202 create clearances with tolerances to flow hydraulic pressurized fluid when close interference of cone valve piston 212 and pump piston 210 are proximate in range during action. An o-ring seal 258 is seated in a circumferential groove 256 integrally within cap 200. A circumferential groove 274 is formed in outer base 202 for receiving an o-ring seal (not shown) to seal within the shock absorber cap assembly (see FIG. 1A).

A circumferential array of equally spaced apart bores 279 in base 202 provide fluid passage to bore 272. O-ring seal 264 within a cylindrical groove seals with a shaft of body 214. A cylindrical array of equally spaced apart bores 297 enable rebound flow from behind plate 216 when spring 218 is compressed. During a compression cycle, a step bore 278 in a flange of alignment shaft tube body 214 provides a fluid flow path to drive piston 210 rearward against springs 204 which tends to urge conical piston body 212 to close with a frustoconical seat 302 (see FIG. 36). Step bore 278 comprises a smaller bore and a larger bore to maximize drilling efficiency of a particularly small drill. A bore 298 in cap 200 carries fluid from circumferential groove 292 for sprung passage past shim stack 292 when over a threshold pressure.

Further relating to a hydraulic fluid (not shown) pressure response in an primary auxiliary hydraulic fluid valve 32 of FIG. 35 in part are o-ring 258 and o-ring 262 working in combination to act as a seal formed with and mating circumferential embodiment to alignment shaft tube body 214 an encapsulated wall inner groove similar to that of circumferential groove 256 and forming an enclosed fitting to capture and retain fluid bypass and also forming a guide bush slidable during receiving and retracting cap body 200 correlation to that of moving part alignment shaft tube body 214 and moving part pump piston, or inner piston 210 to keep concentricity and alignment. Inner piston 210 reciprocates within outer piston, or valve body 212. A differential overflow source 263 is provided along fluid port, or compression fluid passage 278 and fluid passage, or compression fluid passage 297 between adjuster 32 and an inner volume of shock tube 36 (see FIG. 3), as well as along fluid port, or rebound fluid passage 276 in rebound.

Flow paths for FIG. 35 are depicted flowing through a network of proximate flow ports in an primary auxiliary valve 32 starting from inlet check valve 220 end receiving fluid flow of volumetric proportion of piston rod 20 entering sealed piston body 36 to displace a fluid volume ratio of travel used by the piston rod 20 is similar volume to that received through fluid port 60 forcing fluid to meter through primary auxiliary valve actuating a responsive measure, producing counter reacting valve seating and valve seat pressures. As piston rod shaft 20 engages or initiates an entry to shock body 36 fluid acts to flow by hydraulic force into fluid port 60 or fluid port 62 and in an engagement to move hydraulic fluid through the primary auxiliary valve 32, the fluid (not shown) enters into center bore of shim stack check valve 220 and around outer base head end 202 to the assembly bleed port 275 (lead in hole not shown), as fluid continues the direction towards the innermost part of valve 32 it prevails to flow the path of least resistance first. The path towards the frustoconical seal 300 and 302 surface area is the largest surface area seat contained in the valve 32 comprising minimal spring 204 preload when at an static initial state hydraulic fluid pressure opens the frustoconical seat 300 and 302, a circumferential valve plate 253 and surface of outer most end of alignment shaft tube body 214 presses against a loaded tension spring 257 with a smaller surface area volume and more initial spring 257 tension than spring assembly 204, fluid port 297 receives fluid and directs towards stepped fluid port 278 engaging a very small fraction of fluid flow (not shown) into cone piston body 212 cylinder interior wall 260 (see FIG. 37) expanding by volumetric leverage, presses sealed cone piston 210 towards spring assembly 204 towards opposite valve 32 end of incoming fluid flow and cone piston body 212 and conical valve seat 300 drives towards frusta-conical valve seat 302 causing a tighter seat seal pressure and lessoning the surface area volume leverage advantage to open at the frustoconical seat 300 and 302 from incoming continuous frequency changing hydraulic fluid pressure flow, making a self-progressing or adjusting leverage valve, having a mitigation to control the hydraulic fluid flow to the inner cone piston 212 cylinder wall 260 through port 278 and against the inner chamber face of the pump piston 210 to manage a slow chamber fill, leaving or savoring the chance for/of more incoming hydraulic fluid into valve 32 with an intense flow frequency fluid pressure to excite or overcome the spring assembly 204 tension and open again the valve frustaconical valve seat 300 and continue support via stability of the outer periphery of cone piston valve 212 larger diameter along the inner wall 272 and slide freely, keeping concentricity and stability to the conical piston valve 212.

Further detailing yet another arrangement of fluid flow paths in FIG. 35 amid the primary auxiliary valve 32, hydraulic fluid pressure penetrates the sealing surface (see example of an open check washer 253 FIG. 37, not numbered) of check washer 253 resting or seating under spring 257 tension and against alignment shaft tube 214, fluid enters chamber wall 292 area with encountering a mitigated clicker 206 needle valve port 234, fluid also travels through port 251 and redirects through fluid port 250 preceding through ball detent 252 to later bypass spring could of spring 254 and later pass through bored thread plug, also turning hydraulic fluid flow to enter a circumferential array of ports 298 and penetrate flapper shim stack 291 causing an arc bend of flexible flapper shims 291 (not shown in this static state), causing fluid to bypass via the bending arc, transporting through the primary auxiliary valve backwards on the inner periphery of the cylinder was 272 and through the seen octagonal shape cutouts or flats (see FIG. 47) or round edge cutouts of the outermost exterior of the conical piston valve 212 and exiting the amid section of the primary auxiliary valve through a lateral array of fluid ports 277.

Figure 36:
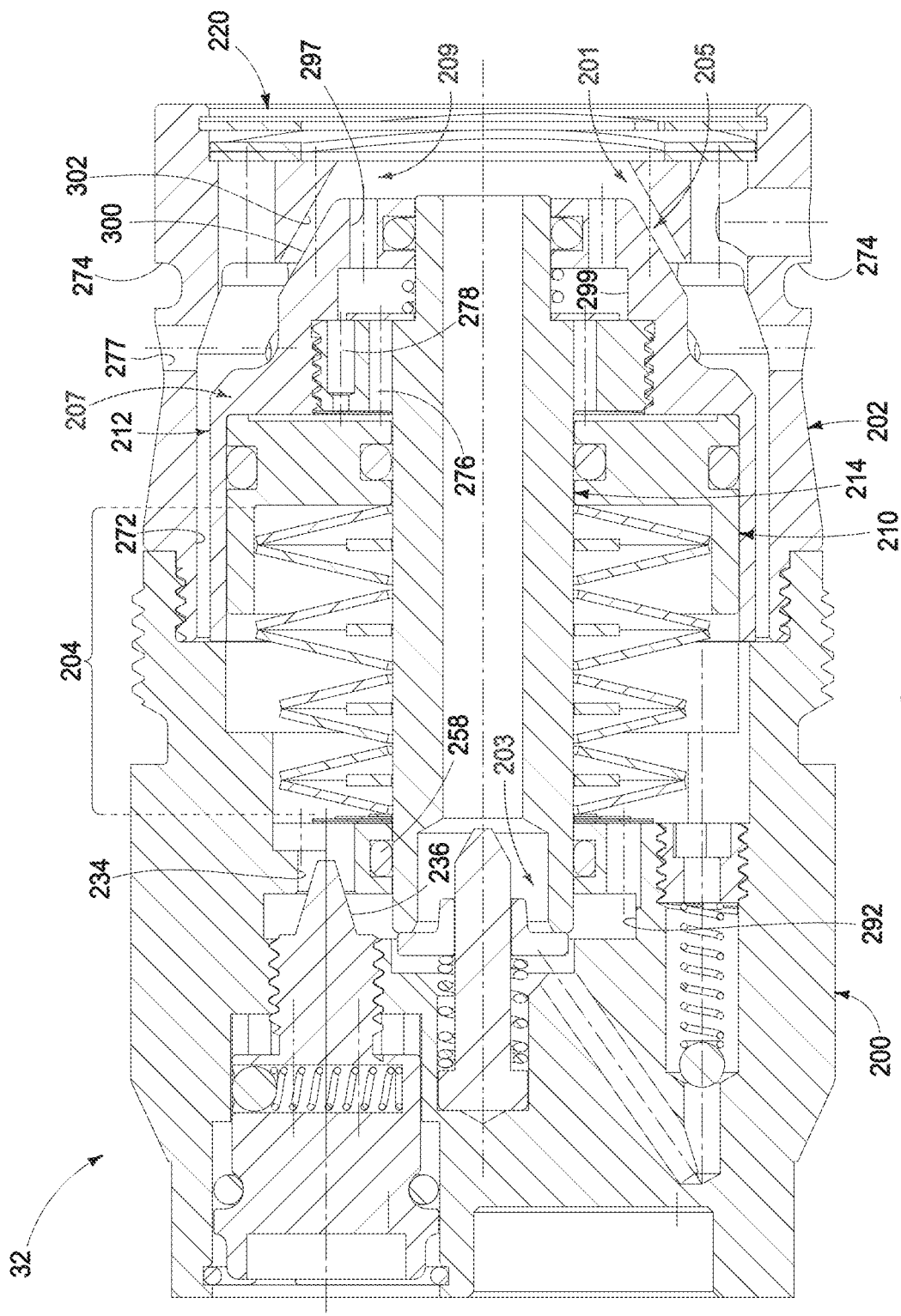
FIG. 36 is a centerline sectional view of the primary auxiliary hydraulic fluid valve as shown in section in FIGS. 1-3 depicting the valve at a shock loaded state showing a movement of the adjuster clicker screw to more open position depicted in FIG. 35 beginning to receive auxiliary fluid from the shock with the pump piston sprung to the right and the conical piston body moving to the left and opening a frustoconical flow path.

FIG. 36 is a centerline sectional view of the primary auxiliary hydraulic fluid valve 32 as shown in section in FIGS. 1-3 further depicting the valve at a shock loaded state showing a more increased opening of the adjuster clicker screw 206 (see FIG. 35) which includes a seal o-ring 224 (see FIG. 35) externally of the clicker making the fluid path more open to hydraulic fluid bleed through bore 234 in the cap body 200 (see FIG. 35) and metering pin 236, showing a fluid path area between the exterior wall of the outer conical valve piston 212 and inner wall 272 of the outer base 202 (see FIG. 35). Conical valve piston 212 is movable to a receiving/internal wall bore 272 within having fluid paths formed by outer flutes or flats creating an octagonally engaged and alignment piston bearing guide (see FIG. 47) further depicted for stability and concentricity to that of the inner wall bore 272 of the outer base 202. Also shown in FIG. 36 is a fluid flow path through fluid port 277. Port 277 further defines a fluid circuit pattern having pathway ports for hydraulic fluid travelling (not shown) within the primary auxiliary hydraulic fluid valve 32. Also providing one possible beginning state to receive auxiliary fluid in an aggressive form from the shock compression of chamber 76 through port 62 received from mid-valve 22 (see FIG. 1-1A) during a compression stroke with the pump piston sprung to the right and the conical piston body moving to the left and opening a frustoconical flow path formed by an inner frustoconical bore, or valve seat 302 in outer base 202 and conical piston frustoconical seat 300 by which hydraulic fluid passes and moves towards and through an array of flow ports 277. Conical piston valve 212 is shown making an end stop against the cap body 200 limiting hydraulic fluid flow through frustoconical seats 300 and 302. Spring assembly 204 shows a more compressed state than that depicted in FIG. 35. One optional use of cone piston valve 212 is to seal the back stop edge against an end of the circumferential bore of cone piston valve 212 to connect with outer cap 200 and form a temporary stop in hydraulic fluid flow through the center alignment shaft tube body 214 in variance of hydraulic frequency blast aiding to push back against cone piston body 212. Circumferential chamber 292 communicates with a plurality of individual ports 234 for fluid flow. O-ring seal 258 seals an elongate shaft of body 214. Piston 210 reciprocates within cone body 212. Check valve 220 admits hydraulic fluid into adjuster 32 and fluid ports 276, 278 and 297 direct fluid through respective components. Finally, circumferential groove 274 receives an o-ring seal (not shown) to seal in assembly with the shock absorber cap assembly housing adjuster 32. A first valve, or cone valve 201 is shown in parallel fluid flow with a second valve, or adjustable bypass valve 203. Cone valve 201 includes a plug, or cone 205 and an orifice, or frustoconical opening 209 that forms when frustoconical surface 300 on cone 205 separates from frustoconical valve seat 302. Movement of piston 210 within piston body 212 via spring biasing of spring stack 204 and counteracting of hydraulic fluid via ports 276, 278 and 297 provide a hydraulic pump 207 that urges piston body 212 and cone 205 towards seat 302 as fluid in opening 209 pushes in opposed force to open first valve 201.

Figure 37:
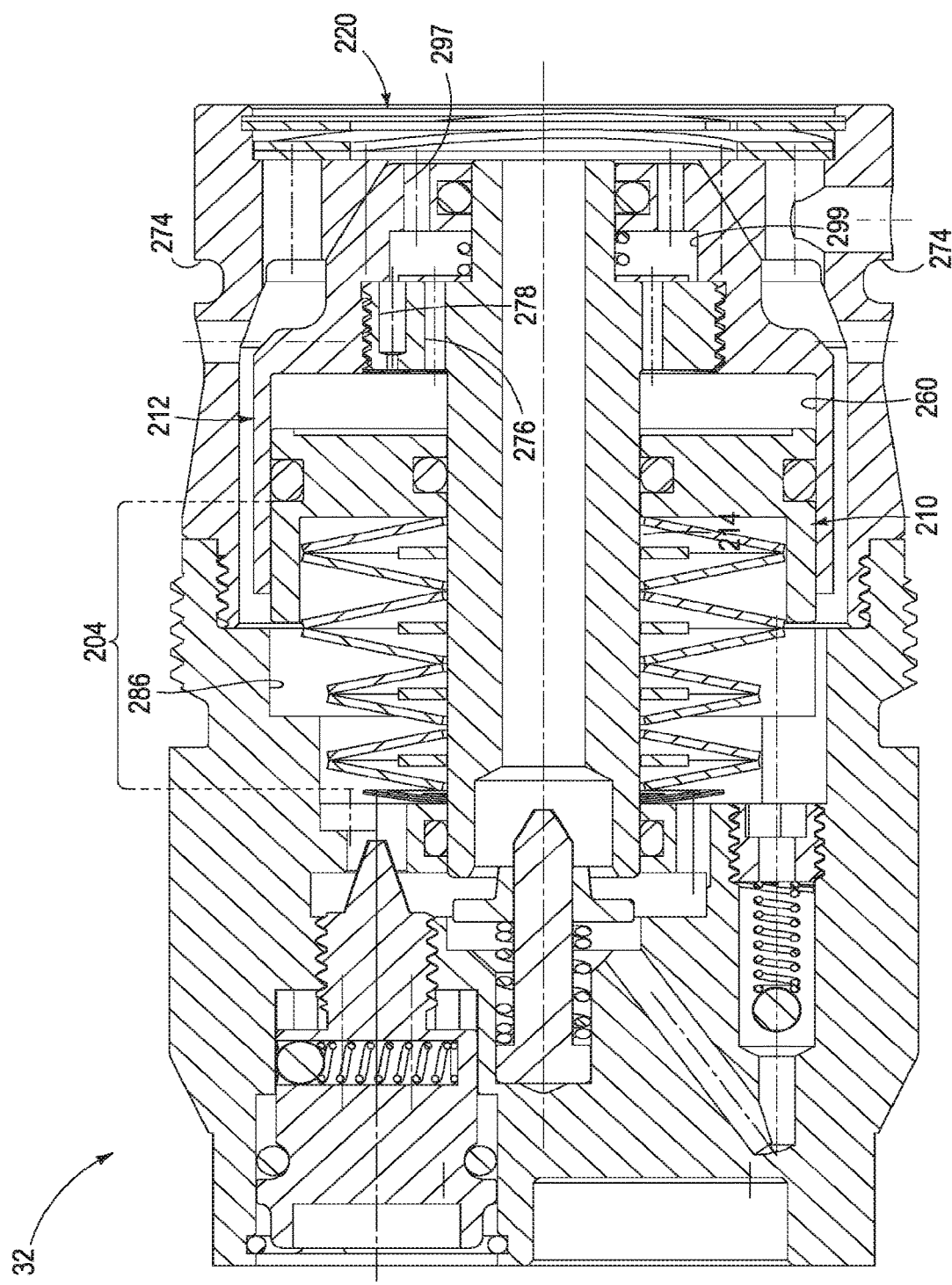
FIG. 37 is a centerline sectional view of the primary auxiliary hydraulic fluid valve as shown in section in FIGS. 1-3 depicting the valve at a shock loaded state further receiving auxiliary fluid from the shock than that depicted in FIG. 36 with the pump piston moving to the left against the stacked springs as the pumping chamber expands and the cone body moved right to close the frustoconical flow path.

FIG. 37 is a centerline sectional view of the primary auxiliary hydraulic fluid valve 32 as shown in section in FIGS. 1-3 depicting valve 32 at a shock loaded state further receiving auxiliary fluid from the shock compression chamber 76 (see FIG. 1A) via stroke of shaft 20 directing fluid through port 62 (see FIG. 1A) than that depicted in FIG. 36 with the pump piston 210 receiving fluid pressure via fluid step port 278 moving to the left against the stacked springs 204 as the pumping chamber 260 expands and the conical piston body 212 moves right to close the frustoconical flow path through seats 300 and 302 (see FIG. 36). An alignment shaft tube body internal port 246 (see FIG. 35) receives hydraulic fluid pressure via opening of check washer 253 (see FIG. 35) in response to fluid pressure, directing fluid to chamber 292 (see FIG. 35). pring stack 204 is shown in compression towards shim stack 291 (see FIG. 5) via step port 278 and chamber 260 expanding against pump piston 210, and shim stack 291 is flexing open and allowing fluid to pass through fluid port 298 (see FIG. 35) and past shim stack 291 (see FIG. 35) in response to spring assembly 204 end compressing shims progressively according to cup washer flex compression becoming more flat limiting fluid flow (see FIG. 38) through port 298 and changing from a more check valve opening to a more flex type opening. Alternatively, a cup washer spring in spring assembly 204 can be faced in an opposite direct in order to create a greater resistance of hydraulic fluid pressure through ports 298 (see FIG. 35). The check ball 252 and fluid port 251 and 250 (see FIG. 35) receive hydraulic fluid pressure that causes ball 252 to open towards spring 254 sending bypass fluid through spring 254 and out threaded set screw 294 until spring 254 exceeds a threshold of hydraulic volume and compresses to a coil bond state limiting flow through its coils. In this manner, an initial fluid flow through spring 254 is greater and a later fluid flow through spring 254 is more restrictive, causing a small but responsive damping curve pressure resistance increase. Fluid ports 276, 278, 297 and 299 are also show relative to check valve 220. Bore 286 and groove 274 are also shown.

FIG. 38 is a centerline sectional view of the primary auxiliary hydraulic fluid valve 32 as shown in section in FIGS. 1-3 depicting the conical piston body 212 closed, sealing together frustoconical valve piston surface 300 and frustoconical seat 302. Furthermore, the pump piston 210 is urged further leftward against the stacked springs 204 than is depicted in FIG. 37, causing pump piston 210 to become more sealed in the inner bore of the cap body and limiting the flow path. The check ball 252 (see FIG. 35) opens towards spring 254 and check plate 253, thereby mitigating a closing position after the shock absorber mid-valve piston 22 (see FIG. 1A) has started to return to a rebound state and shims 291 (see FIG. 35) have released the last fluid amount of hydraulic fluid pressure and the check ball 252 (see FIG. 35) has released its last amount of hydraulic fluid pressure. Pump piston 210 is ready to be received via the fast response cone piston valve inner wall 260 and is ready to spring (through spring stack 204) as spring stack 204 becomes expanded again with force towards the flange of alignment shaft tube body 214 (see FIG. 35) and fluid moves and an array of circumferential ports 298 (see FIG. 35) will release pressure to make a fast and speedy return of pump piston 210 to its far right position (see FIG. 39). Check shim 216 (see FIG. 35) has not started to open in FIG. 38.

FIG. 38A shows an expanded encircled sectional view from FIG. 38 having a displaced return flow shim stack 291 in an open position in a maximum open position resting/pressing/flexing against spring stack 204 end tapered cup washer wherein fluid arrayed ports 298 are dispatching hydraulic fluid.

FIG. 38B shows an expanded encircled sectional view from FIG. 38 where the return check valve washer 216 shown in its sealed closed state against port 276 adjacent bore 299 and spring 218.

FIG. 39 is a centerline sectional view of the primary auxiliary hydraulic fluid valve 32 as shown in section in FIGS. 1-3 depicting the conical piston body 212 closed and the pump piston 210 urged further leftward away from the compression state stacked springs 204 (see FIG. 38) as they expand further right than that depicted in FIG. 37. Concurrently, primary auxiliary valve 32 enters into a full rebound stroke, further receiving hydraulic fluid pressure from interacting reservoir 34 and fluid chamber 82 (see FIG. 1A) resulting from air pressure tank chamber 84 pressing air piston 48. Excess fluid transfers from shaft 20 (see FIG. 1A) and there is a volumetric exchange which occurs through bi-directional fluid port 86 and around the outer base body 202 (see FIG. 35), through the array of fluid ports 277 (see FIG. 35), and out fluid arrayed ports 279 (see FIG. 35). This opens check stack springs and washers 268, being retained and secured by C-shaped shim 270 in groove 271 (see FIG. 42), allowing hydraulic fluid pressure from reservoir 34 (see FIG. 1A) to be received back to compression chamber 76 through port 62. Hydraulic fluid pressure from cone valve piston chamber 260 is quickly returned or exited via larger multiple ports 276 diameters of than that of fluid step port 278 and around check shim 216 compressing check spring 218 within chamber bore 299 (see FIG. 35) and out fluid ports 297 wherein the fluid path leads to port 62 (see FIG. 1A) and then compression chamber 76. Check ball 252 (see FIG. 35) is shown sprung against port 250 (see FIG. 35) making a seal, and shim flapper stack 291 (see FIG. 35) again is at a closed sealed state.

FIG. 39A shows a return flow shim stack 291 closed against a fluid flow port 298 and adjacent a spring stack 204 from encircled region 39A of FIG. 39.

FIG. 39B shows respectively an open return check valve washer 216 and compressed check spring 218 from encircled region 39B of FIG. 39 opening up port 276 for fluid flow.

FIG. 40 is a centerline sectional view of the primary auxiliary hydraulic fluid valve 32 as shown in section in FIGS. 1-3 depicting all hydraulic fluid flow valves in closed positions as pump piston 210 is rested more towards the right and cone piston 212 valve is seated against a frustoconical seat adjacent check valve 220.

FIGS. 40A through 40D show respectively, a closed ball 252 of a check valve mating with a port 250 via a coil spring 254, a closed tapered metering pin 236 on a screw clicker mating to create a seal in bore 234 and axial positioned with co-acting threaded portions 230 and 232, a closed return flow shim stack 291 sealed against ports 298 adjacent spring stack 204, and a closed return check valve washer 216 relative to coil sprig 218 and fluid flow port 276, as shown in encircled regions 40A through 40D of FIG. 40.

FIG. 41 is a centerline sectional view of the primary auxiliary hydraulic fluid valve 32 as shown in section in FIGS. 1-3 depicting all hydraulic fluid flow valves in open positions except check washer 253 (see FIG. 35) which axially slides with an inward through hole bore over a pin shaft sliding on a pin guide shaft and compresses the spring when in an open state. Adjuster 32 shows cone body 212 open and pump piston 210 closed in relation to check valve 220 from which fluid is exchanged.

FIGS. 41A through 41D show respectively, an open ball check valve 252 with a port 250 and spring 254, an open tapered metering pin 236 (and bore 236) set axially with threads 230 and 232, an open return flow shim stack 291 with port 298 and spring stack 204, and an open return check valve washer 216 relative to port 276 and coil spring 218 shown in encircled regions 41A through 41D.

Figure 42:
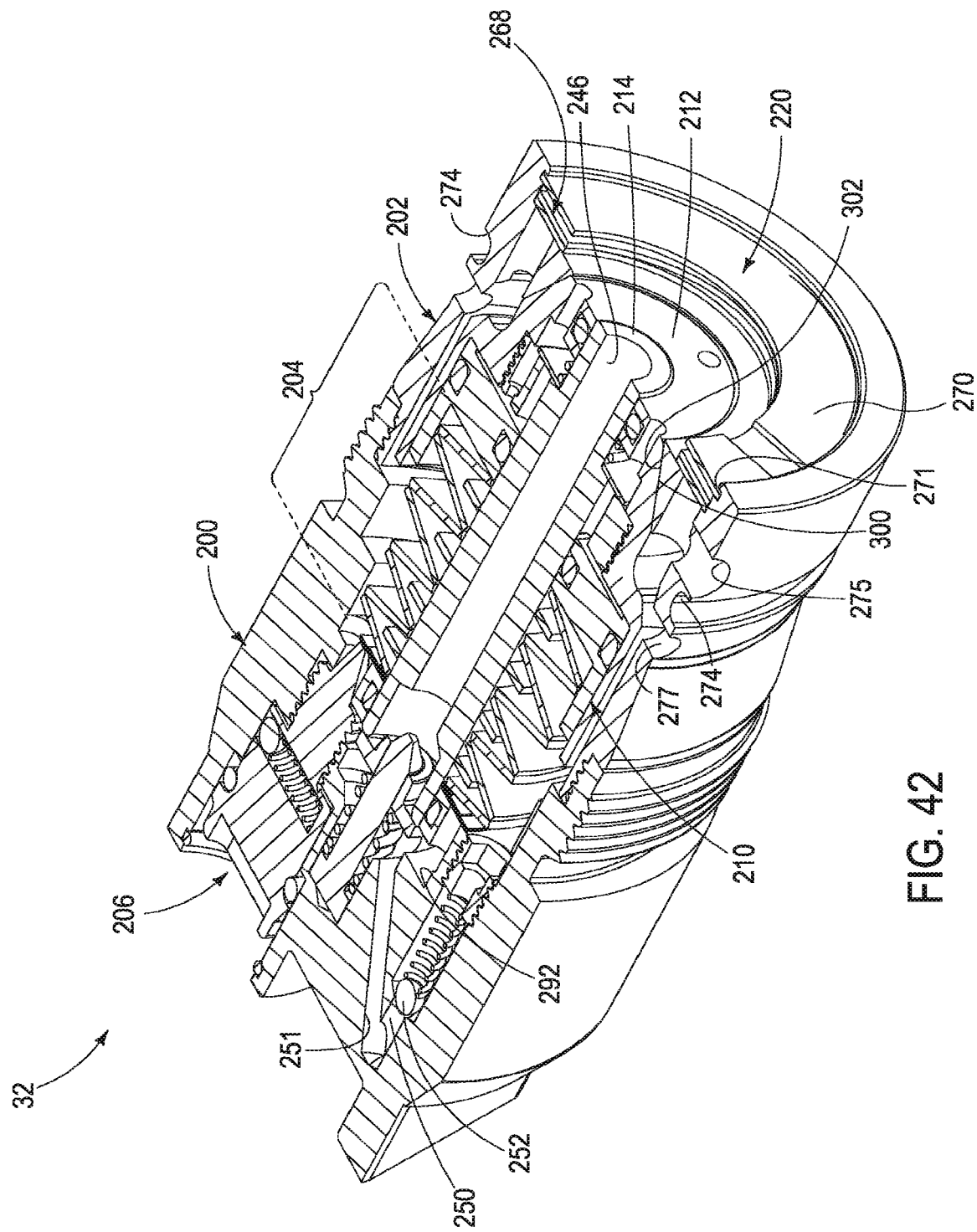
FIG. 42 is a perspective view from above of the primary auxiliary hydraulic fluid valve hydraulic fluid valve of FIGS. 35-41 in a static state and taken in horizontal section from the flow inlet end.

FIG. 42 is a perspective centerline sectional view from above of the primary auxiliary hydraulic fluid valve hydraulic fluid valve 32 of FIGS. 35-41 taken in horizontal section from the flow inlet end showing a static valve state and showing clearly the C-shaped end that retains ring shim 270 and check shim stack 220. Adjuster 206 is shown in cap 200. Ports 250, 251, ball 252, and spring 292 are shown. Also shown, the tip end of the cone piston valve 212 and center port 246 in the inlet view perspective on alignment shaft tube body 214 and outer periphery perspective of the primary auxiliary valve 32 and o-ring groove 274 separating the flow ports 277 and port 275. Flow port 275 can be drilled or placed in the end of outer base in any location to provide a non-sealed pressure regulating seat as it is necessary to connect to fluid return ports 279 (see FIG. 35) or at least one port of ports 279 and bypass an inner edge of the check shim stack 220. This means that the fluid bleed port 275 may be at an angle when drilled. In this manner, fluid bleed port 275 retains at a specific frontal position connection proximation to fluid ports 279 (see FIG. 35) and drilled to a specific desired bleed orifice to arrange the desire resistance to a pre-pressured valving resistance. Optionally, hydraulic fluid towards bleed port 275 and outer groove can be made in the outer periphery of the outer base 202 and can wrap around the front edge of outer base 202 around the check shim stack 220 and groove 271. A more precise bleed port 275 is made using a drilled or machined hole. Frustoconical piston surface 300 and seat 302 are also shown in a closed position.

FIG. 43 is an angled side view from above of the sectioned primary auxiliary hydraulic fluid valve hydraulic fluid valve 32 of FIG. 42 showing the tapered outer periphery of outer base 202 which creates a surface gap between the inner bore of body 16 (see FIG. 1A). Primary auxiliary valve 32 is placed in the body and allows fluid bypass in a volumetric balance with that of fluid ports 277 and port 86 (see FIG. 1A). In this manner, fluid can achieve a reasonable fluid volume bypass around the outer periphery of outer base 202 and within the bore in body 16, not exceeding a pressure threshold in that of the shock body 16 component and that of the outer base 202 wall thickness. Pump piston 210 is shown closed and cone body 212 is shown closed. Port 275 and groove 274 are also shown adjacent check valve 220.

FIG. 43A is an enlarged view of the check valve 32 with the shim assembly 220 and discharge port 277 showing in part the circumferential array of ports 275 and 277 from encircled region 43A of FIG. 43.

FIG. 44 is a centerline sectional side view of the primary auxiliary hydraulic fluid valve 32 and its outer assembly perspective view of FIG. 42 in centerline section showing cap 200 joined to base 202 and illustrating position of ports 275 and 277 and groove 274.

FIG. 44A is an enlarged view of a centerline sectional view of a discharge port 277, an assembly bleed port 275, and groove 274 from encircled region 44A of FIG. 44.

Figure 45:
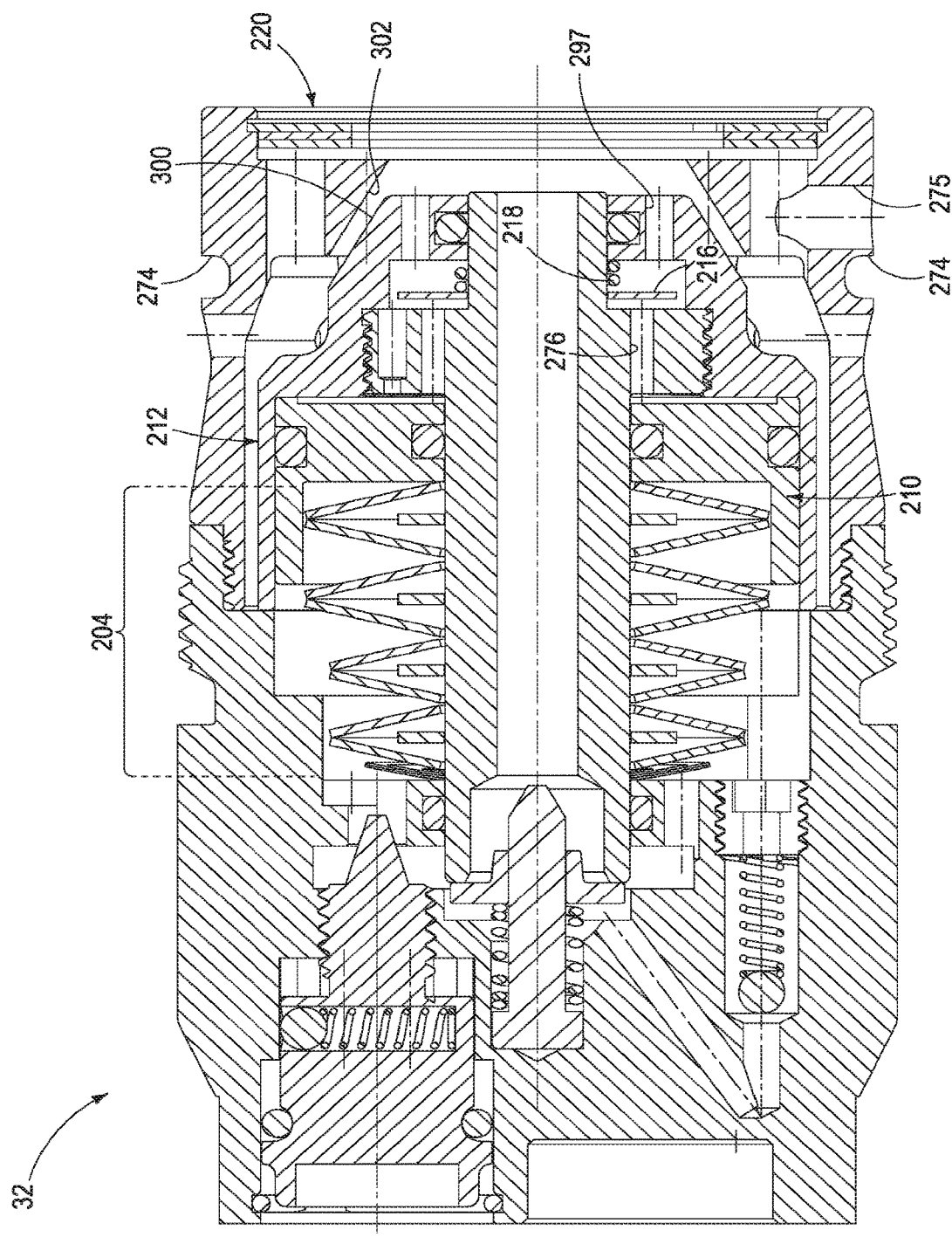
FIG. 45 is a centerline sectional view of the primary auxiliary hydraulic fluid valve as shown in section in FIG. 41 depicting all hydraulic fluid flow valves in open positions.

FIG. 45 is a centerline sectional view of the primary auxiliary hydraulic fluid valve 32 as shown in section in FIG. 41 depicting all hydraulic fluid flow valves in open positions except spring 257 preloaded into check valve 253 (see FIG. 35). More particularly, spring stack 204 is not compressed as pump piston 210 is not displaced and cone body 212 is open, providing a frustoconical gap between surfaces 300 and 302. Spring 218 is compressed by check shim 216 as fluid flows through port 276 and out port 297. Groove 274 and port 275 are shown proximate check valve 220.

Figure 46:
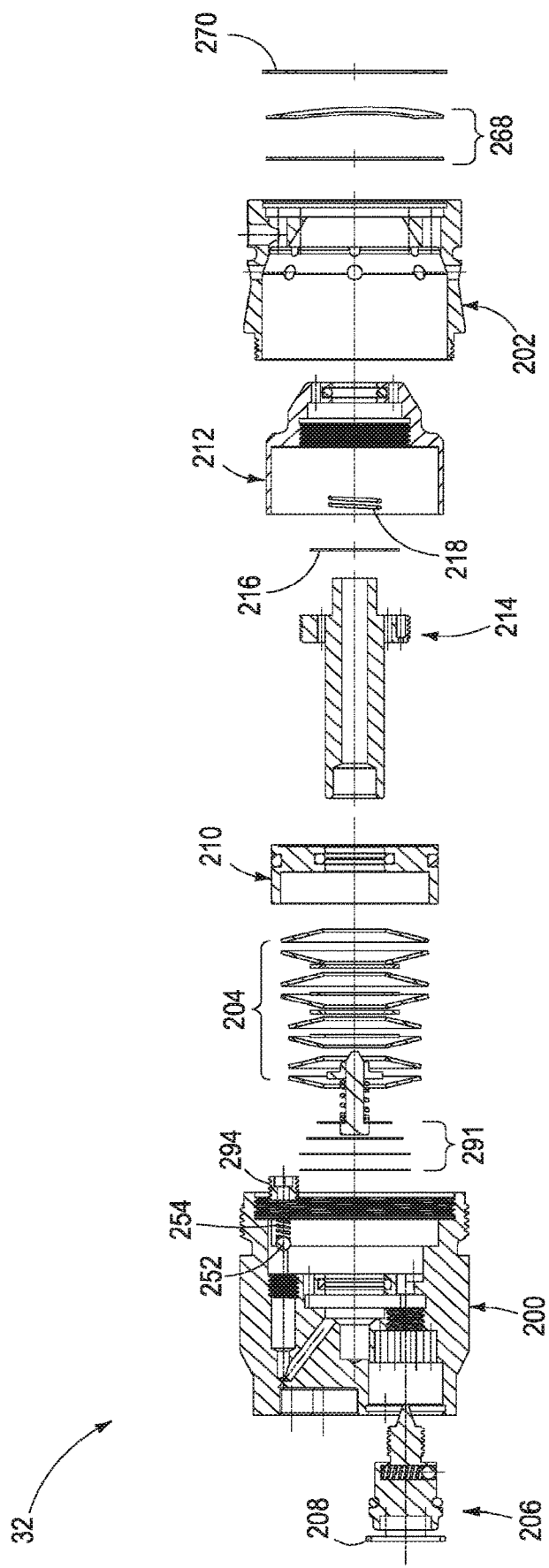
FIG. 46 is an exploded vertical centerline sectional view of the primary auxiliary fluid valve of FIGS. 35-45.

FIG. 46 is an exploded vertical centerline sectional view of the primary auxiliary fluid valve 32 of FIGS. 35-45 showing adjuster 206, C-ring 208, cap 200 (having ball 252, spring 254, and plug 294), shim stack 291, spring stack 204, pump piston 210, body 214, check shim 216, spring 218, cone body 212, base 202, spring 268, and lock ring 270.

Figure 47:
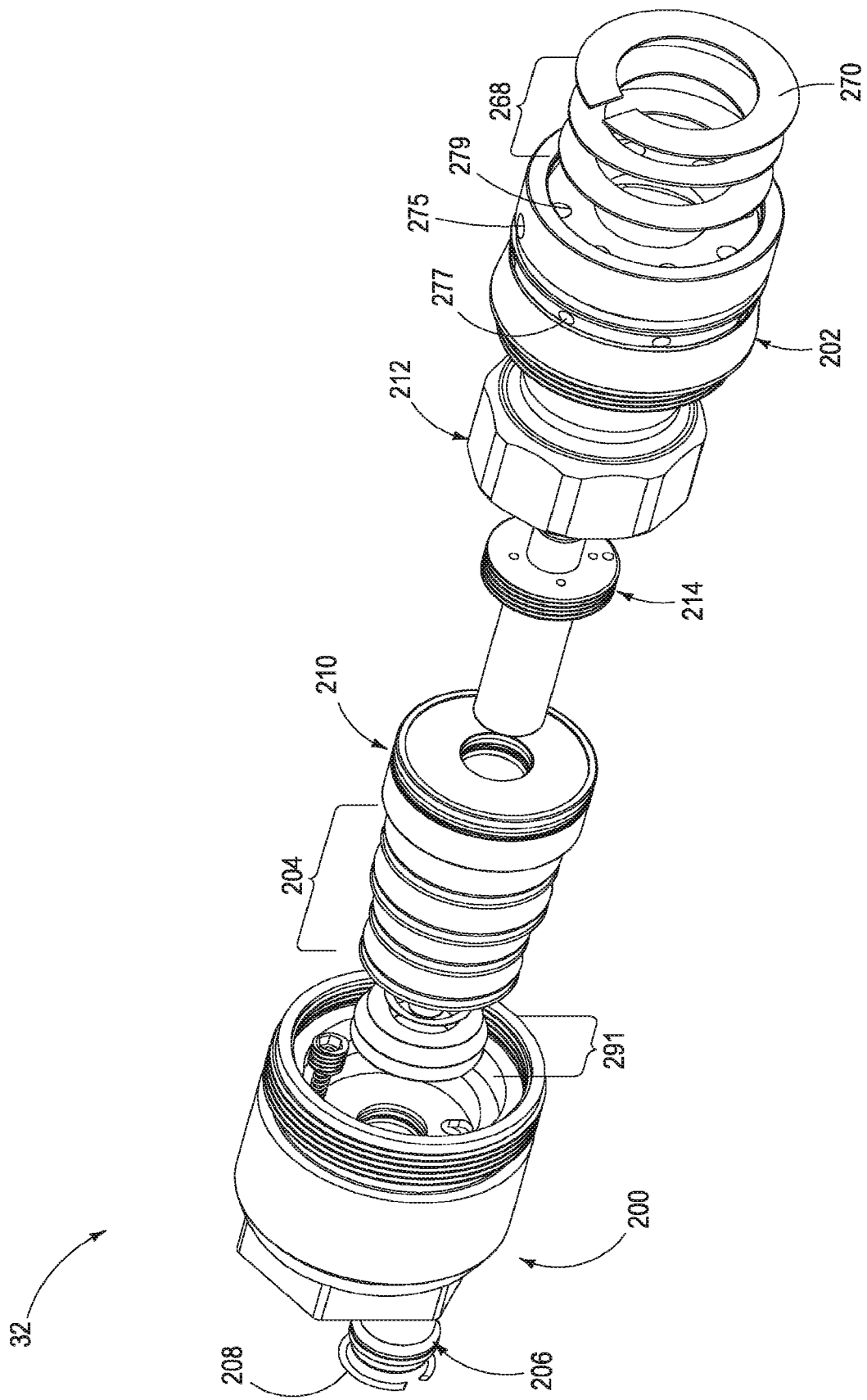
FIG. 47 is an exploded perspective view from above of the inlet end of the primary fluid valve of FIGS. 35-46.

FIG. 47 is an exploded perspective view from above of the inlet end of the primary fluid valve 32 of FIGS. 35-46 showing adjuster 206, C-ring 208, cap 200, shim stack 291, spring stack 204, pump piston 210, body 214, cone body 212, base 202 (with ports 275, 277, and 279), spring 268, and lock ring 270.

Figure 48:
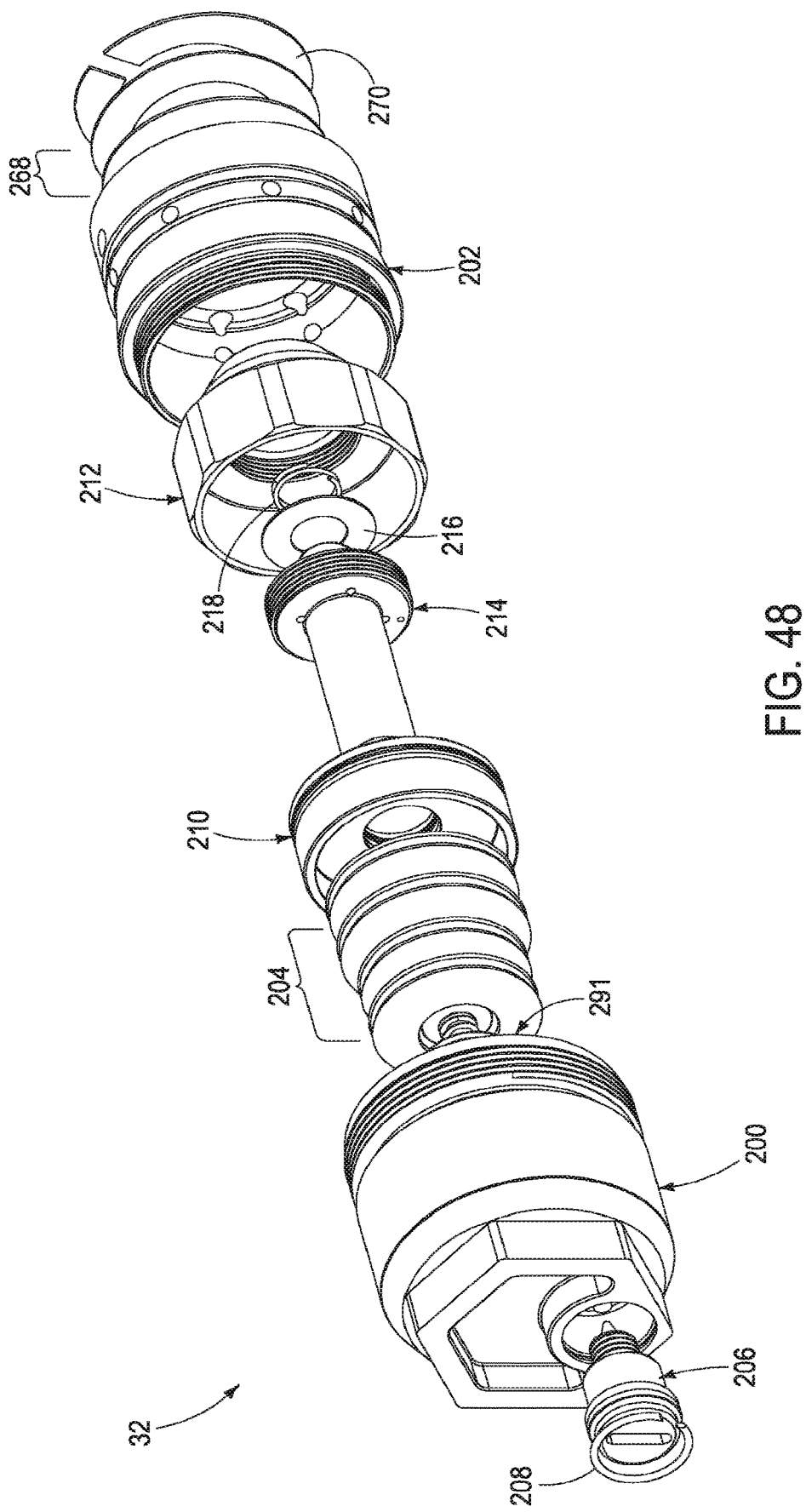
FIG. 48 is an exploded perspective view from above of the adjuster end of the primary fluid valve of FIGS. 35-47.

FIG. 48 is an exploded perspective view from above of the adjuster end of the primary fluid valve 32 of FIGS. 35-47 showing adjuster 206, C-ring 208, cap 200, shim stack 291, spring stack 204, pump piston 210, body 214, check shim 216, spring 218, cone body 212, base 202, spring 268, and lock ring 270.

Figure 49:
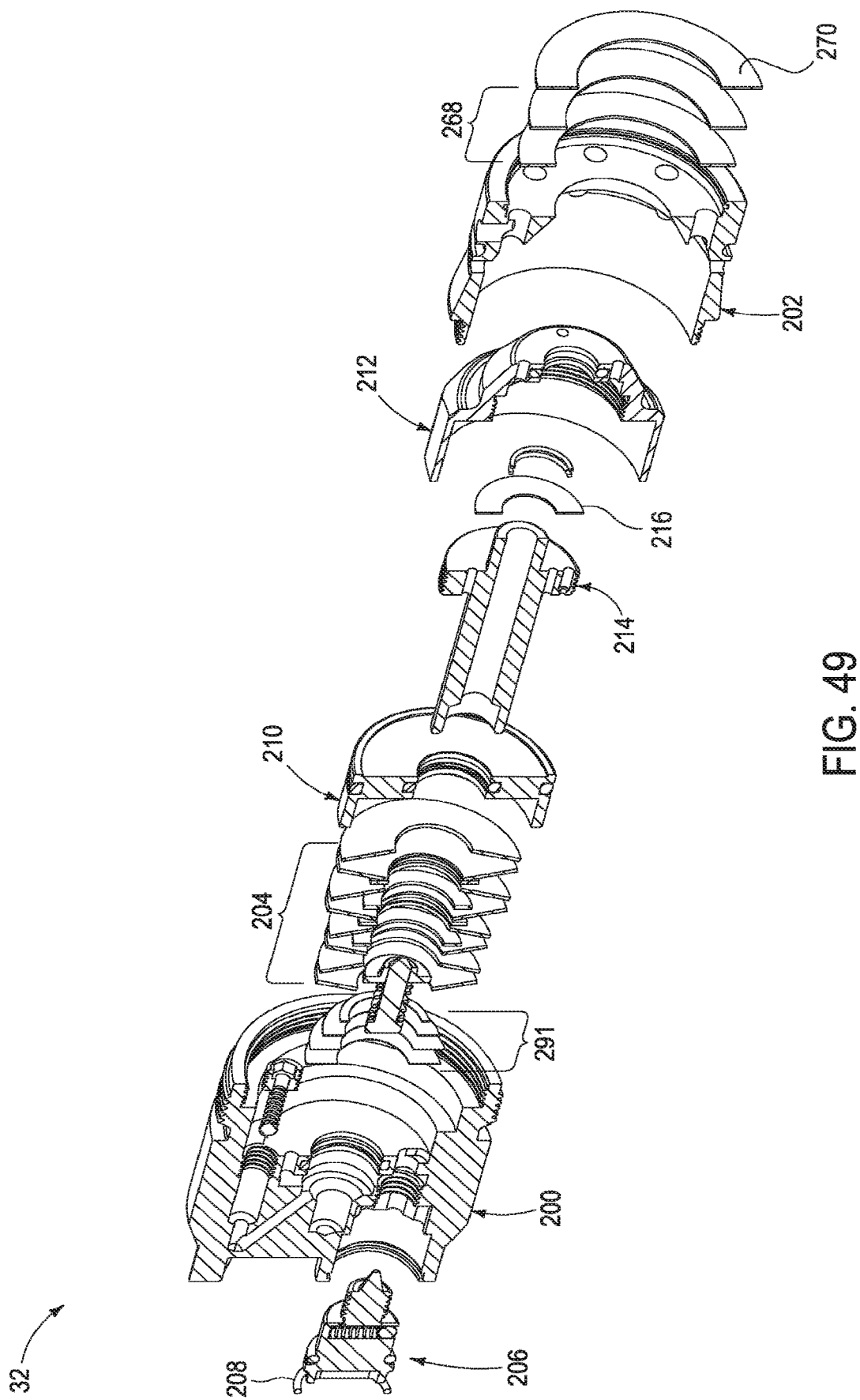
FIG. 49 is a vertical centerline sectional view of the exploded perspective view from above of the inlet end of the primary fluid valve of FIGS. 35-48.

FIG. 49 is a vertical centerline sectional view of the exploded perspective view from above of the inlet end of the primary fluid valve 32 of FIG. 35-48 showing adjuster 206, C-ring 208, cap 200, shim stack 291, spring stack 204, pump piston 210, body 214, cone body 212, base 202, spring 268, and lock ring 270.

Figure 50:
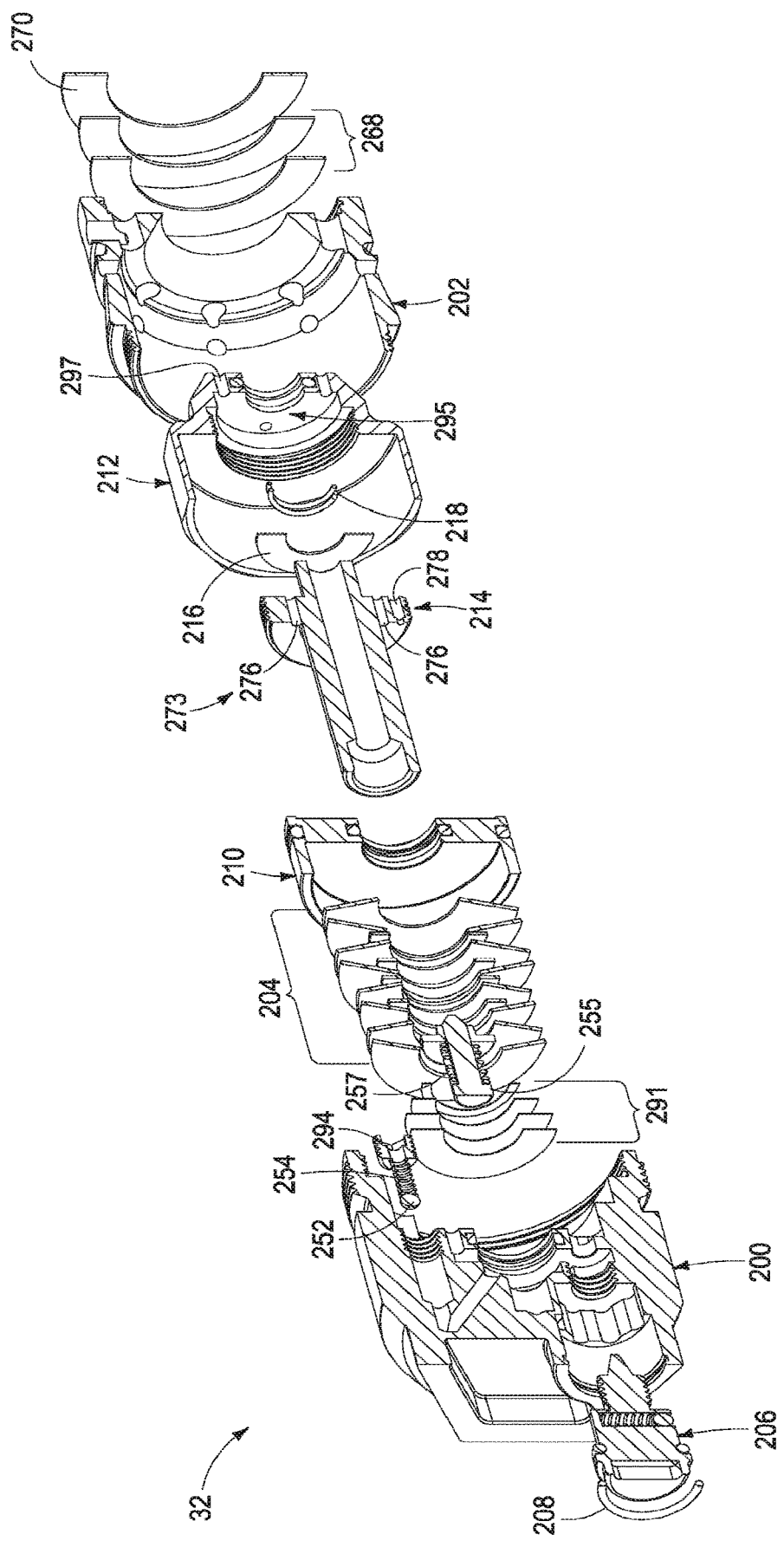
FIG. 50 is a vertical centerline sectional perspective view of the exploded perspective view above of the adjuster end of the primary fluid valve of FIGS. 35-49.

FIG. 50 is a vertical centerline sectional perspective view of the exploded perspective view above of the adjuster end of the primary fluid valve 32 of FIG. 35-49 showing adjuster 206, C-ring 208, cap 200 (with ball 252, spring 254, and plug 294), shim stack 291, pin 255 and spring 257, spring stack 204, pump piston 210, body 214, check shim 216, spring 218, cone body 212, base 202, spring 268, and lock ring 270. An array 273 of ports 276 provide a first array and an array 295 of ports 297 provide a second array.

Figure 51:
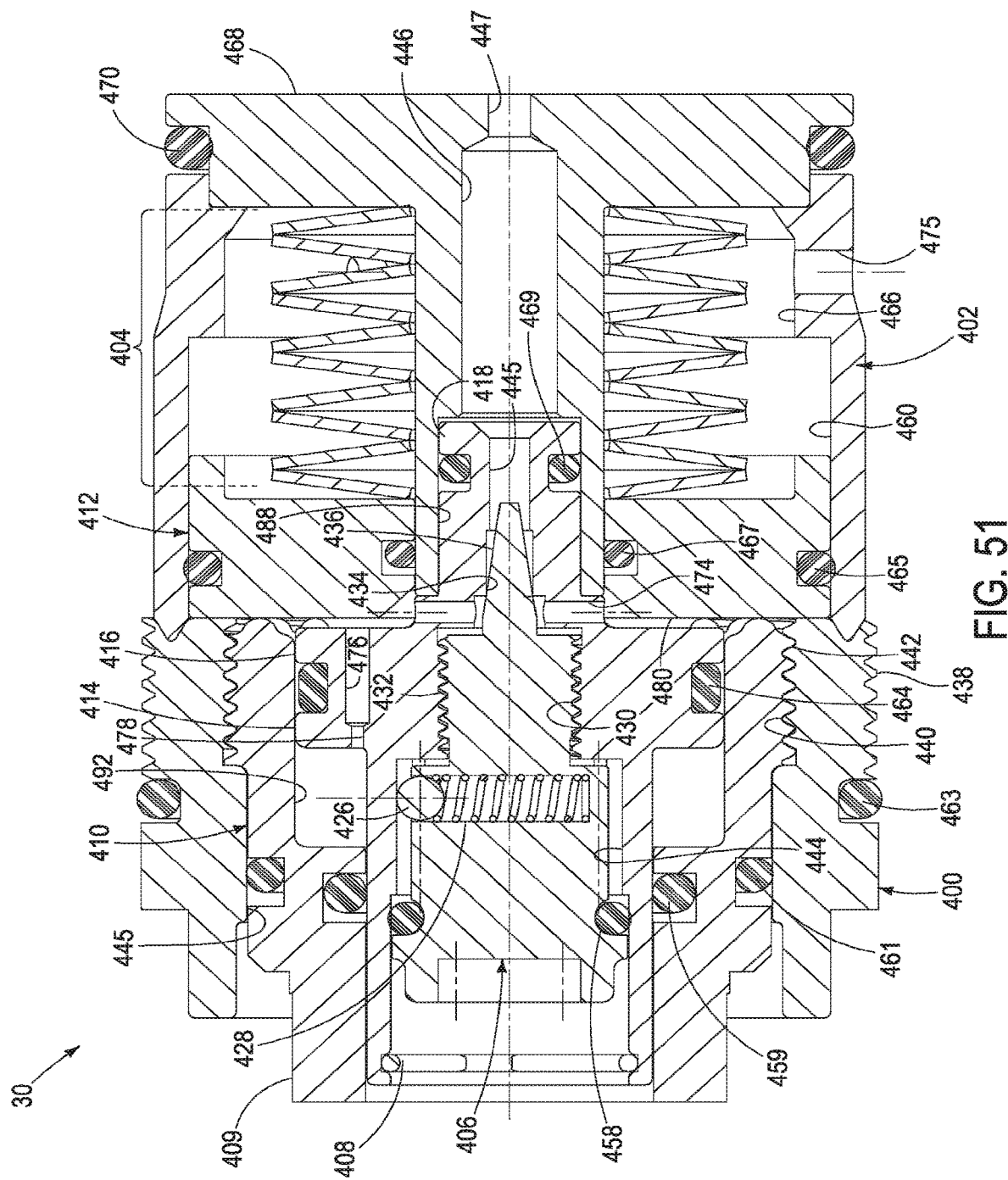
FIG. 51 is a centerline sectional view of the secondary auxiliary hydraulic fluid valve as shown in section in FIGS. 1-3 depicting the valve at a shock unloaded state before receiving any auxiliary fluid from the shock with the pump piston sprung to the left.

FIG. 51 is a centerline sectional view of the secondary auxiliary hydraulic fluid valve 30 as shown in section in FIGS. 1-4 depicting the valve 30 at a shock unloaded, or resting state before receiving any auxiliary fluid from the shock absorber 10 (see FIG. 1A) with the pump piston sprung to the left. More particularly, a housing for valve 30 is provided by cap 400 and outer base 402 which are secured together when they are inserted into end cap assembly 16 (see FIG. 1A) and male threads 438 are secured into complementary female threads in the end cap assembly, trapping the assembly of cap 400 and base 402 within such assembly housing. A base plate tubular member 468 is secured in press-fit relation to outer base 402. An o-ring seal 470 seal the leading end of valve 30 when inserted and assembled within a complementary bore within end cap assembly 16 (see FIG. 1A). Another o-ring seal 463 is carried by cap 400 adjacent threaded male portion 438 configured to further seal valve 300 within a receiving bore in end cap assembly 16 (see FIG. 1A). A flow restricting port 447 is provided through member 468 in fluid communication with bore 446. A preload tension adjuster seat collar 410 is secured inside of cap 400 with a threaded male segment, or threads 442 that are mating with a complementary threaded female segment, or threads 440. Another o-ring seal 461 seals seat collar 410 inside of bore 445 within cap 400.

As shown in FIG. 51, slider valve 414 is carried is slidable sealed relation within seat collar 410 and tube member 468 via o-ring seals 459, 464, and 469. Slider valve 414 includes a radial outwardly extending and integrally formed outer slider seal piston 416 having a radial outer edge groove sized to receive o-ring seal 464. Piston 416 reciprocates in sliding and sealed relation within a cylindrical bore 492 internally of collar 410. A circumferential array of lugs 409 on collar 410 enable a gripping tool to mate and rotate collar 410 within cap 400 to a desired axial position.

Fluid flow volume adjuster 406 of FIG. 51 is carried in a proximal end of seat collar 410 via mating complementary male threaded portion 432 and female threaded portion 430 within a bore of collar 410. A ball 426 and cylindrical coil spring 426 are provided in a bore (not numbered) within adjuster 406 such that a circumferential array of elongate grooves 444 in a bore of collar 410 provide a "clicker" discrete for setting a threaded position of adjuster 406 at any one of a plurality of discrete axial locations relative to collar 410. In this manner, a distal metering pin 436 of adjuster 406 can be repeatable set to one a plurality of axial locations relative to a fluid flow bore 434 in order adjust the annular orifice size provided by axial positioning of adjuster 406. Metering pin 436 and bore 434 are provided coaxially within a cylindrical inner slide seal piston 418 of adjuster 406 that reciprocates in sealed relation within a cylindrical bore 488. Bore 434 is ensmalled towards a distal end to provide greater material in piston 418 for mounting o-ring seal 469.

A pump piston 412 is carried for sealed reciprocation with a cylindrical bore 460 within outer base 402 in order to provide a fluid cushion as well as a stored fluid capacitor when spring stack 204 has been compressed via movement of piston 412 into spring stack 204 and later released. Piston 412 includes a circumferential outer periphery groove sized to contain an o-ring seal 465. Piston 412 also contains an inner periphery groove sized to contain another o-ring seal 467. A radially outwardly extending a circumferentially equally spaced apart array of bores 474 provide fluid flow from about metering pin 436 into a circumferential chamber 480 to drive pump piston 412 into compression with spring stack 204 during certain shock loading conditions. Another bore 476 is provided through slider piston 416 to prevent hydraulic lock-up of slider piston 416. Bore 476 has a reduced diameter portion 478 sized to realize a desired fluid flow rate. Finally, base 402 includes a circumferential array of equally spaced apart ports 475 in thickened wall portion 466 into chamber 88 and cross port 92 (of FIG. 4A).

Figure 52:
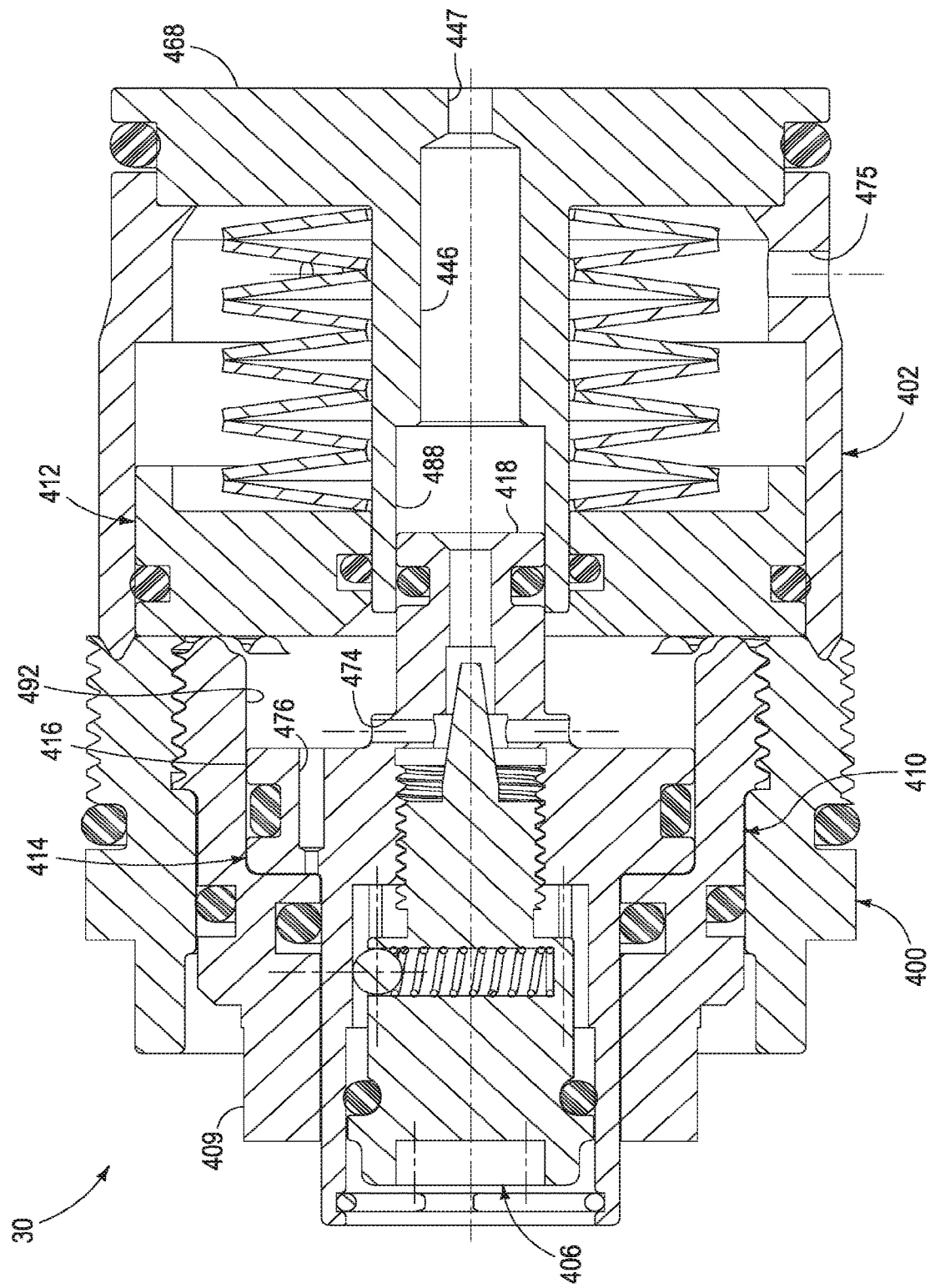
FIG. 52 is a centerline sectional view of the secondary auxiliary hydraulic fluid valve as shown in section in FIGS. 1-3 depicting the valve at a shock loaded state beginning to receive auxiliary fluid from the shock with the pump piston sprung to the left and the slider valve moving to the left and opening a frustoconical flow path.

FIG. 52 is a centerline sectional view of the secondary auxiliary hydraulic fluid valve 30 as shown in section in FIGS. 1-3 depicting the valve at a shock loaded state beginning to receive auxiliary fluid from the shock with the pump piston 412 positioned all the way left and the slider valve, or inner slider seal piston 418 moving to the left and opening a frustoconical flow path. Preload tension adjuster seat collar 410 is shown extended outwardly to the left.

Figure 53:
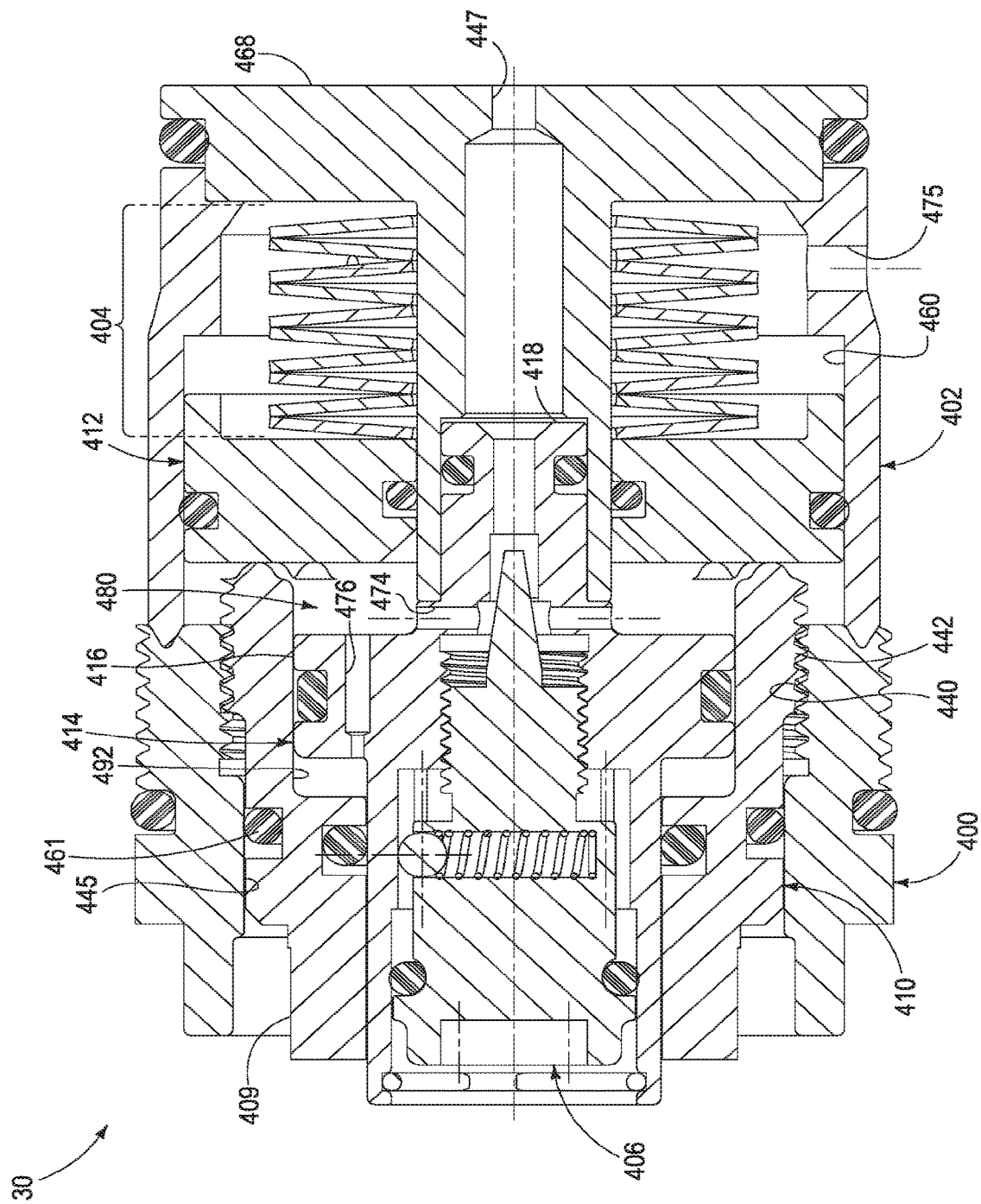
FIG. 53 is a centerline sectional view of the secondary auxiliary hydraulic fluid valve as shown in section in FIGS. 1-3 depicting the valve at a shock loaded state further receiving auxiliary fluid from the shock than that depicted in FIG. 53 with the threaded adjuster compressing the cup washers creating a firmer starting point for the cup washers and further limiting travel of the pump piston.

FIG. 53 is a centerline sectional view of the secondary auxiliary hydraulic fluid valve 30 as shown in section in FIGS. 1-3 depicting the valve at a shock loaded state further receiving auxiliary fluid from the shock than that depicted in FIG. 53 with the threaded preload tension adjuster seat collar 410 compressing the cup washers creating a firmer starting point for the cup washers 204 by displacing pump piston 412 to the right and further limiting travel of the pump piston 412. Inner slider seal piston 418 is shown displace fully to the right.

Figure 54:
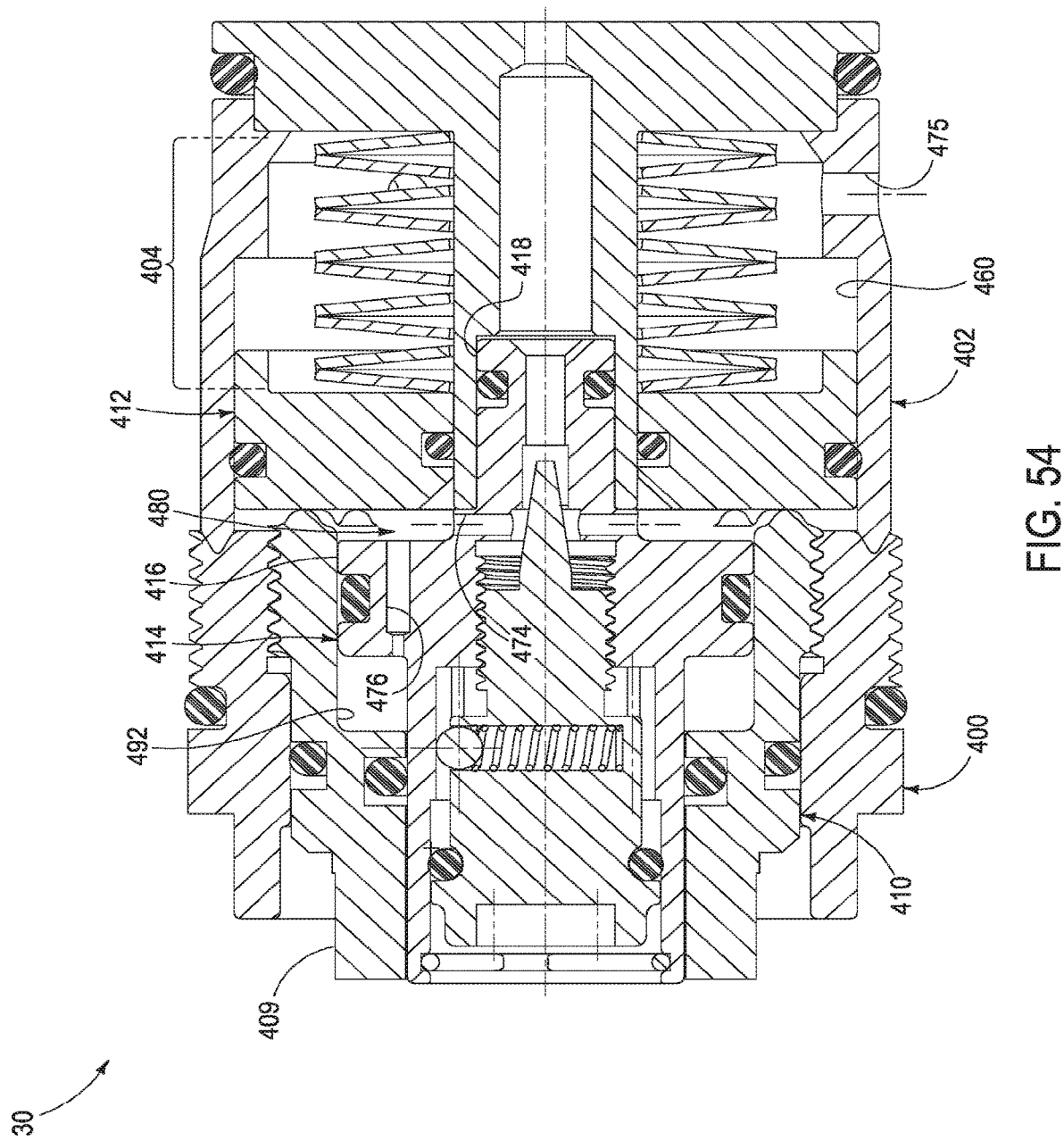
FIG. 54 is a a centerline sectional view of the secondary auxiliary hydraulic fluid valve as shown in section in FIGS. 1-3 depicting the initial state but having more preload on the cup washer (spring) set by the threaded cap than that depicted in FIG. 51.

FIG. 54 is a centerline sectional view of the secondary auxiliary hydraulic fluid valve 30 as shown in section in FIGS. 1-3 depicting the initial state but having more preload on the cup washers 404 (spring) set by the preload tension adjuster seat collar 410 than that depicted in FIG. 51. Pump piston 412 is only slightly displaced to the right, slightly compressing spring stack 404. Piston 418 is also move fully to the right.

Figure 55:
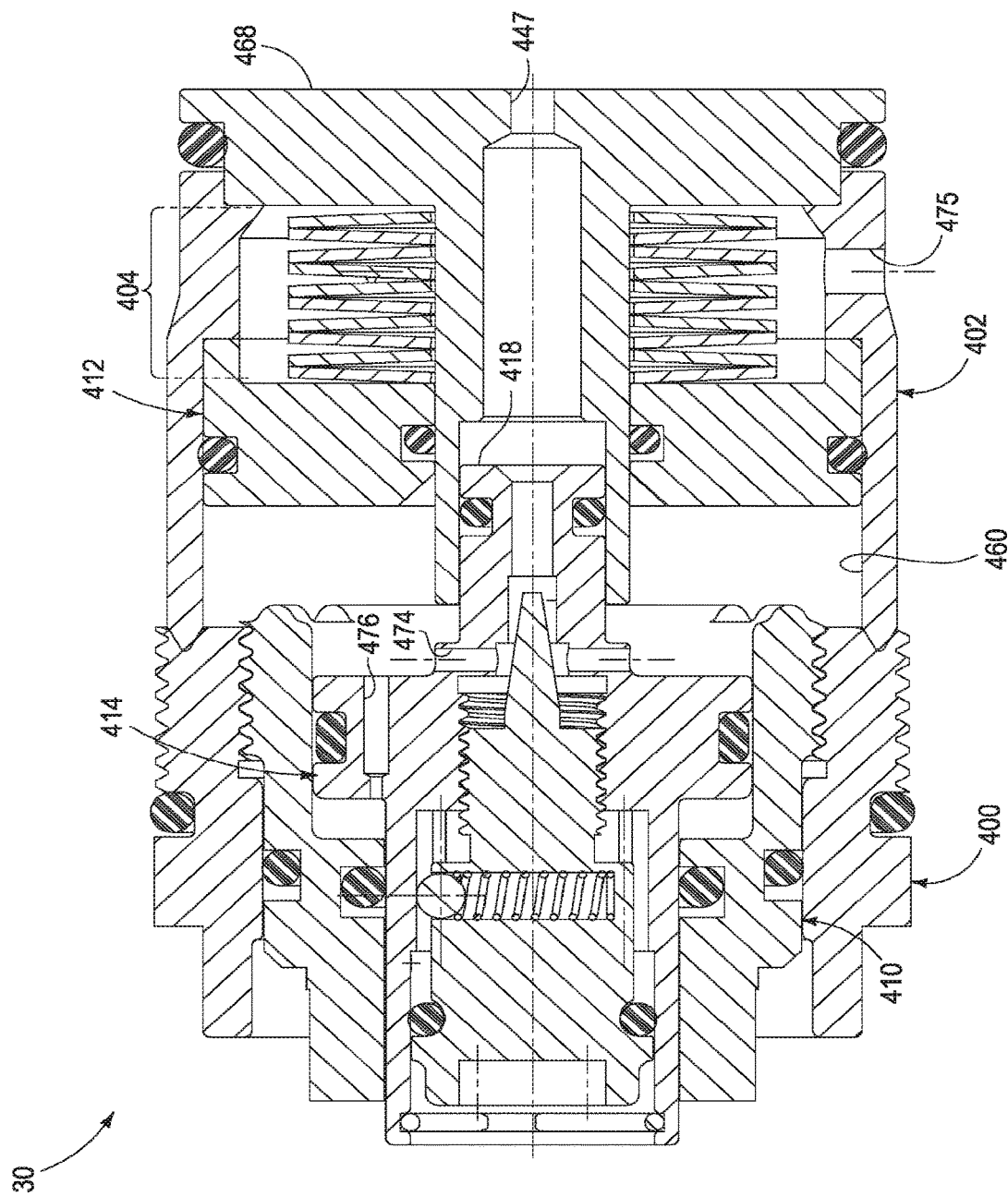
FIG. 55 is a vertical centerline sectional view through the secondary fluid valve of FIG. 54 but later in time and showing the fluid fully compressing the cup washers and not completely compressing the slider valve.

FIG. 55 is a vertical centerline sectional view through the secondary fluid valve 30 of FIG. 54 but later in time and showing the fluid fully compressing the cup washers 404 and not completely compressing the slider valve 414.

Figure 56:
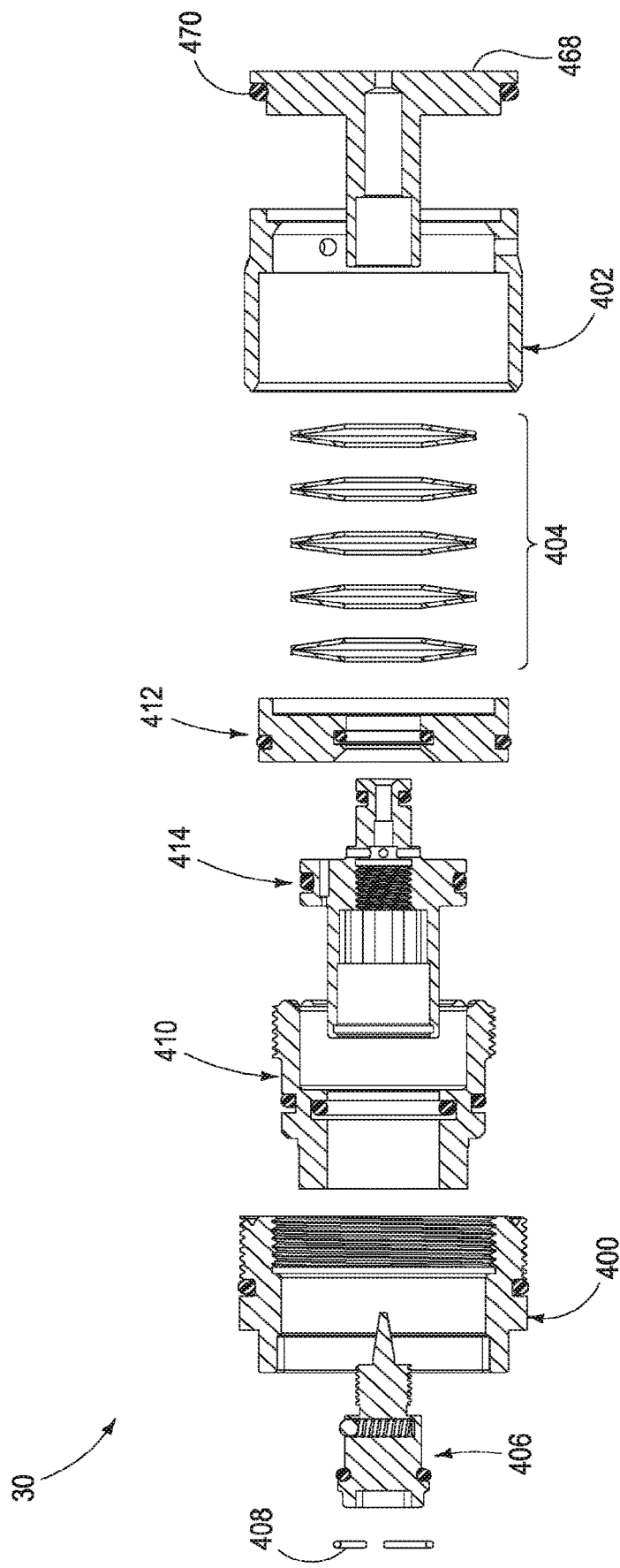
FIG. 56 is an exploded vertical centerline sectional view of the secondary auxiliary fluid valve of FIGS. 51-55.

FIG. 56 is an exploded vertical centerline sectional view of the secondary auxiliary fluid valve 30 of FIGS. 51-55 showing adjuster 406, C-clip 408, cap 400, collar 410, slider valve 414, pump piston 412, spring stack (of cup washers) 404, outer base 402, and base plate 468 (with o-ring seal 470).

Figure 57:
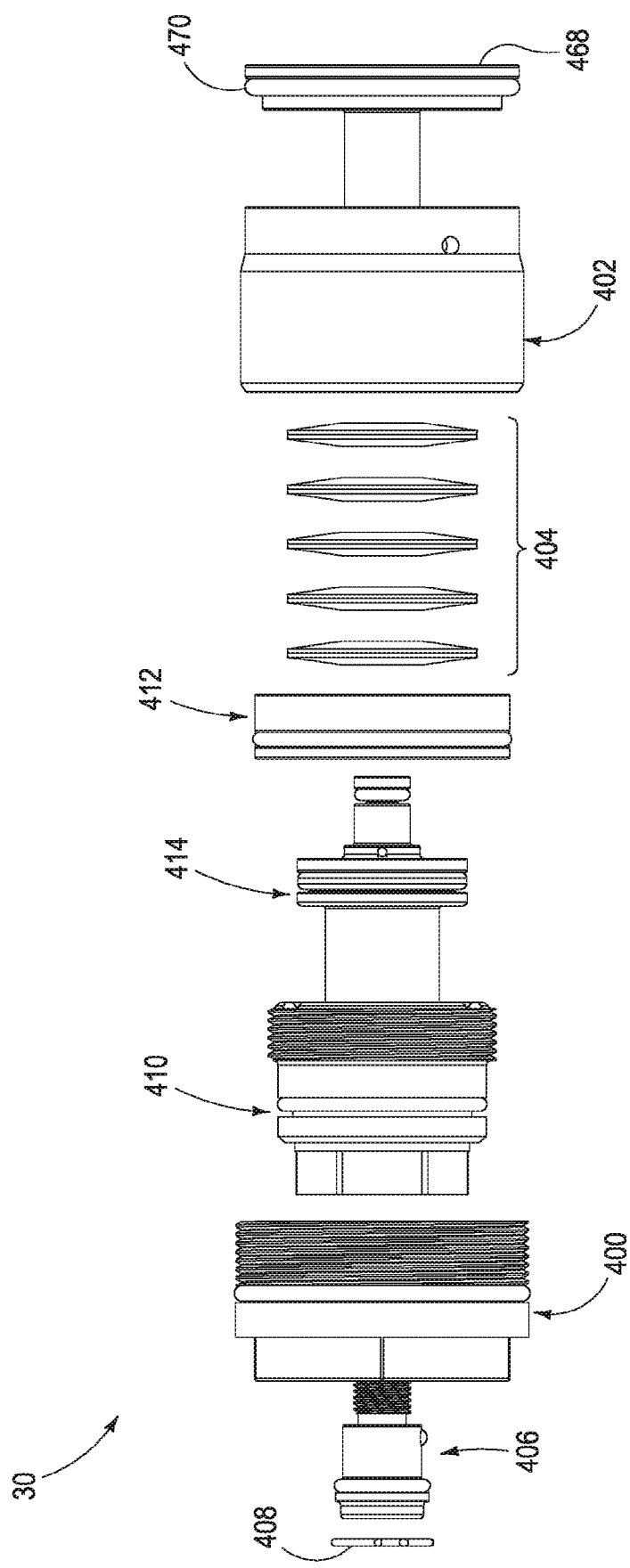
FIG. 57 is an exploded vertical side view of the secondary auxiliary fluid valve of FIGS. 51-56.

FIG. 57 is an exploded side view of the secondary auxiliary fluid valve 30 of FIGS. 51-56 showing adjuster 406, C-clip 408, cap 400, collar 410, slider valve 414, pump piston 412, spring stack (of cup washers) 404, outer base 402, and base plate 468 (with o-ring seal 470).

Figure 58:
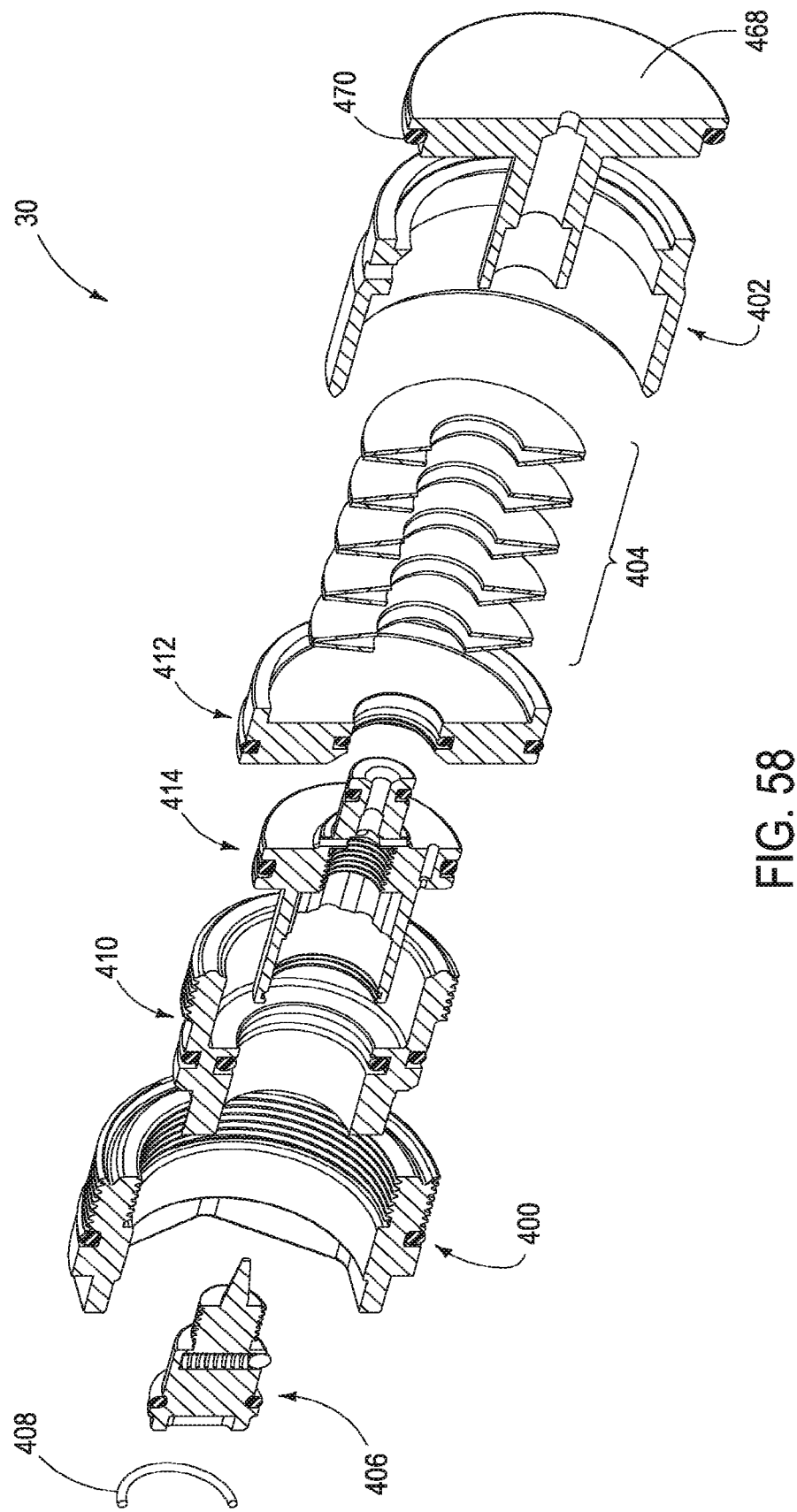
FIG. 58 is an exploded and perspective vertical centerline sectional view of the secondary fluid valve from the inlet end of FIGS. 51-57.

FIG. 58 is an exploded and perspective vertical centerline sectional view of the secondary fluid valve 30 from the inlet end of FIGS. 51-57 showing adjuster 406, C-clip 408, cap 400, collar 410, slider valve 414, pump piston 412, spring stack (of cup washers) 404, outer base 402, and base plate 468 (with o-ring seal 470).

Figure 59:
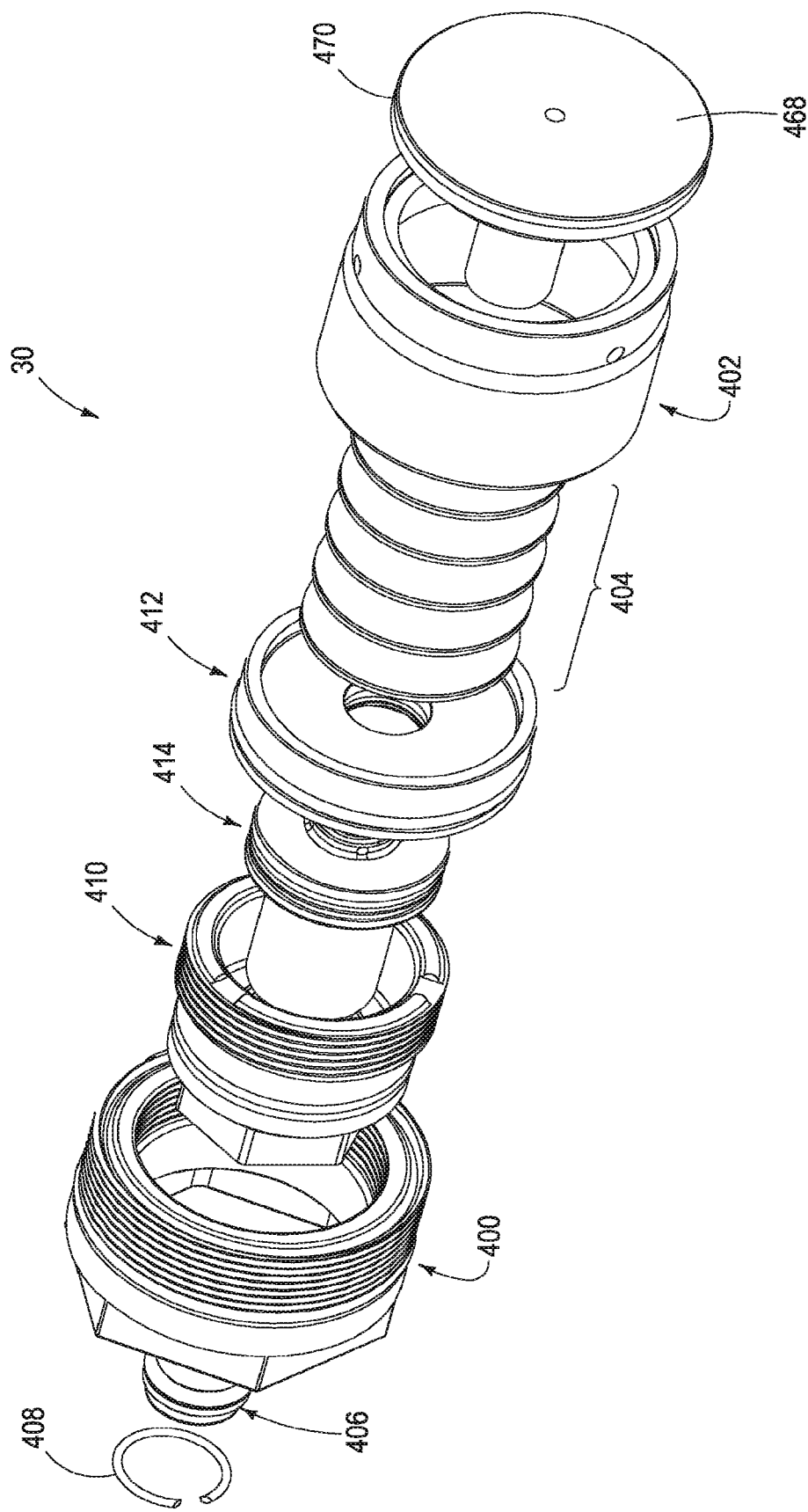
FIG. 59 is an exploded and perspective view of the secondary fluid valve from the inlet end of FIGS. 51-58.

FIG. 59 is an exploded and perspective view of the secondary fluid valve 30 from the inlet end of FIGS. 51-58 showing adjuster 406, C-clip 408, cap 400, collar 410, slider valve 414, pump piston 412, spring stack (of cup washers) 404, outer base 402, and base plate 468 (with o-ring seal 470).

Figure 60:
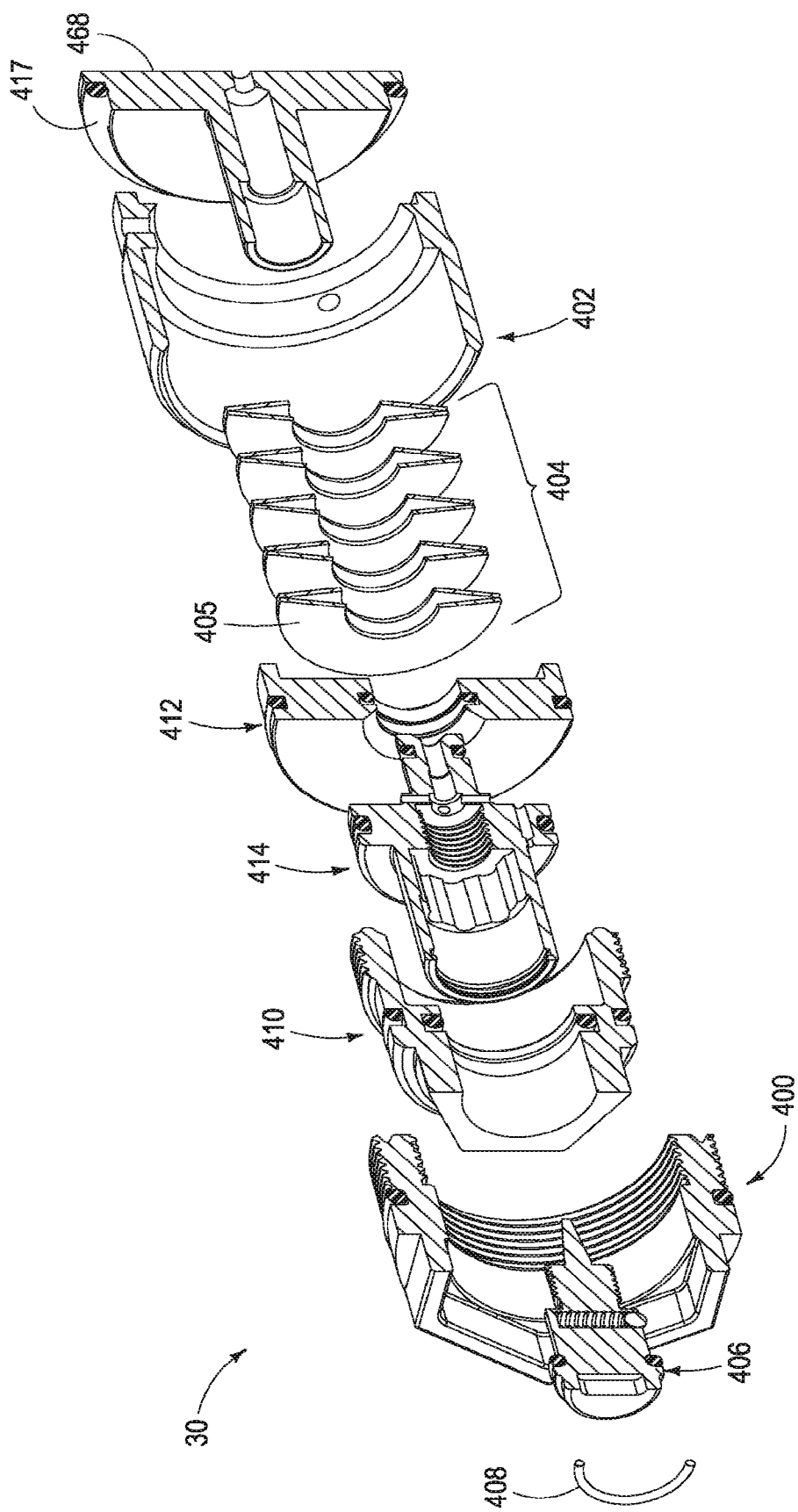
FIG. 60 is an exploded and perspective centerline sectional view of the secondary fluid valve from the adjuster end of FIGS. 51-59.

FIG. 60 is an exploded and perspective centerline sectional view of the secondary fluid valve 30 from the adjuster end of FIGS. 51-59 showing adjuster 406, C-clip 408, cap 400, collar 410, slider valve 414, pump piston 412, spring stack (of cup washers) 404, outer base 402, and base plate 468 (with o-ring seal 470).

FIG. 61 is an exploded and perspective view of the secondary fluid valve 30 from the adjuster end of FIGS. 51-60 showing adjuster 406, C-clip 408, cap 400, collar 410, slider valve 414, pump piston 412, spring stack (of cup washers) 404, outer base 402, and base plate 468 (with o-ring seal 470).

Figures 62, 63:
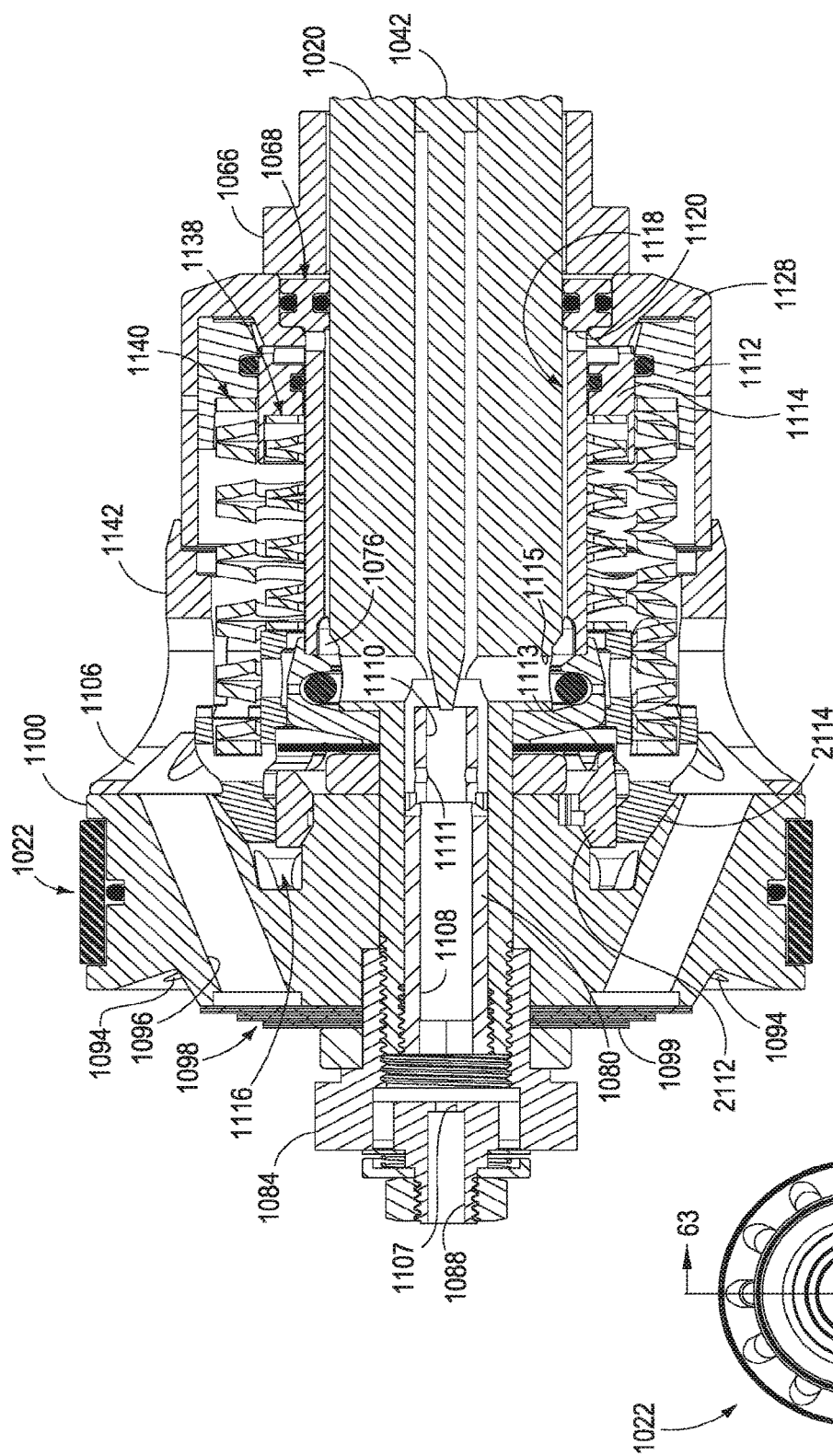
FIG. 62 is an end view of yet another alternative mid-valve piston assembly for a shock absorber according to another construction.
FIG. 63 is a vertical centerline sectional view of the mid-valve piston taken along line 63-63 of FIG. 62 showing one a pair of rebound ports.

FIG. 62 is an end view of yet another alternative mid-valve piston assembly 1022 for a shock absorber according to another construction, such as for a front fork mid-valve shock on a motorcycle.

FIG. 63 is a vertical sectional view of the mid-valve piston 1022 taken along line 63-63 of FIG. 62 showing in vertical cross section one pair of rebound ports 1096 which are formed in a circumferential equally spaced apart array extending through piston body 1100. A piston body 100 along with a ducted support housing 1142 (including flow ports 1106) and a cylindrical housing 1128 are trapped in stacked relation onto piston rod, or shaft 1020 between a rebound nut 1084 and fluid directing collar 1068. Collar 1068 has a cylindrical array of radially inwardly extending discrete locking fingers 1076 (also see FIG. 80) on a proximate end of shaft 1020 adjacent to piston 1100 that engage shaft 1020 where shaft 1020 increases in diameter, preventing movement of collar 1068 away from piston 1100. A shim stack 1098 seals ports 1096 until rebound motion of piston 1022 in a shock absorber tube urges and flexes individual springs 1099 of stack 1098 to flex and open ports 1096 for fluid flow.

In a compression mode, fluid enters a bi-directional metering hole 1088 and goes through a metering orifice 1107. Fluid communicates with bore 1108 of female rebound tube 1080 and reduced bore 1110 where is passes out of ports 111 or exits between a cylindrical end of bore 1110 and a metering pin end of rebound needle 1042. Fluid also enters compression ports 1096 into an annular volumetric expansion chamber 1116 where the compression fluid reacts with an inner frustoconical piston 1112 and an outer frustoconical piston 1114, similar to the manner in which pistons 112 and 114 behave in the mid-valve piston of shock absorber 10 depicted variously in FIGS. 1-61. Pistons 1112 and 1114 are spring into engagement with seats on piston body 1100 via compression of springs 1138 and 1140. As springs are compressed from compression fluid flow, springs 1138 and 1140 are compressed and annular flow paths open between springs 1112 and 1114 (as previously discussed with reference to pistons 112 and 114 in FIGS. 1-61). However, fluid passes down radial ports 1115 pass into a circumferential channel 1118 where it passes out ports 1120 behind pistons 1138 and 1140, causing such pistons 1138 and 1140 to be urged into springs 1138 and 1140, compressing such springs as pistons translate toward piston body 1100 and causing pistons 1112 and 1114 to close against piston body 1100 and close related fluid flow paths. A rubber or plastic spring stop bushing 1066 is carried on shaft 1020 and receives a coil spring (not shown) in assembly to prove shock absorption in the event that piston assembly reached a maximum stroke position. Finally, a shim stack 1113 resists and regulate fluid flow from between inner piston 1112 and piston body 1100.

FIG. 64 is an end view from the rebound end showing the support housing and housing flow ports and compound sectional view taken along compound line 65-65 of mid-valve piston assembly 1022 for a shock absorber.

FIG. 65 is a compound sectional view of the mid-valve piston 1022 of FIGS. 62-63 showing both a compression port 1094 and a rebound port 1096.

FIG. 66 is an end view from the rebound end showing the support housing and housing flow ports and compound sectional view taken along compound line 67-67 of mid-valve piston assembly 1022 for a shock absorber.

FIG. 67 is a compound sectional view of the mid-valve piston 1022 of FIGS. 62-63 showing both a compression port 1094 and a rebound port 1096 at a beginning state with no fluid flow.

FIG. 67C is an enlarged encircled region view showing the rebound flapper shims in a closed position.

FIG. 67D is an enlarged encircled region view showing the check valve in a closed position.

FIG. 67E is an enlarged encircled region view showing the outer conical piston body closed against the outer piston frustoconical seat.

FIG. 67F is an enlarged encircled region view showing the outer cone closed against the outer piston frustoconical seat.

FIG. 67G is an enlarged encircled region view showing a motion limiting gap between a back surface of the outer piston body and the outer sleeve travelling limiting radially inwardly extending shoulder.

FIG. 67H is an enlarged encircled region view showing the inner cone flapper shim stack closed (and preloaded) against the rear surface of the inner cone.

FIG. 67M is an enlarged encircled region view showing the rebound metering fluid needle and tube seat adjusted to one of a plurality of potential open positions.

FIG. 68 is an end view from the rebound end showing the support housing and housing flow ports and compound sectional view taken along compound line 69-69 of mid-valve piston assembly 1022 for a shock absorber.

FIG. 69 is a compound sectional view of the mid-valve piston 1022 of FIGS. 62-67 showing both a compression port 1094 and a rebound port 1096 at a later state than shown in FIG. 67 with more fluid flow at a later point in time.

FIG. 69C is an enlarged encircled region view showing the flapper shims in a closed position.

FIG. 69D is an enlarged encircled region view showing the check valve in a closed position.

FIG. 69E is an enlarged encircled region view showing the outer cone partially open relative to the outer piston frustoconical seat.

FIG. 69F is an enlarged encircled region view showing the outer cone closed against the outer piston frustoconical seat.

FIG. 69G is an enlarged encircled region view showing a motion limiting gap decreasing in size over that shown in FIG. 67G between a back surface of the outer piston body and the outer sleeve travelling limiting radially inwardly extending shoulder.

FIG. 69H is an enlarged encircled region view showing the inner cone flapper shim stack closed (and preloaded) against the rear surface of the inner cone.

FIG. 69M is an enlarged encircled region view showing the rebound metering fluid needle and tube seat adjusted to one of a plurality of potential open positions.

FIG. 70 is an end view from the rebound end showing the support housing and housing flow ports and compound sectional view taken along compound line 71-71 of mid-valve piston assembly 1022 for a shock absorber.

FIG. 71 is a compound sectional view of the mid-valve piston 1022 of FIGS. 62-69 showing both a compression port 1094 and a rebound port 1096 at a later state than shown in FIG. 69 with yet even more fluid flow and the initiation of pump piston movement to initiate shutting of the outer conical piston.

FIG. 71C is an enlarged view from the encircled region and showing the flapper shims in a closed position.

FIG. 71D is an enlarged view from the encircled region and showing the check valve in a closed position.

FIG. 71E is an enlarged encircled region view showing the outer cone partially open relative to the outer piston frustoconical seat.

FIG. 71F is an enlarged encircled region view showing the outer cone partially open relative to the outer piston frustoconical seat.

FIG. 71G is an enlarged encircled region view showing a motion limiting gap same in size over that shown in FIG. 69G between a back surface of the outer piston body and the outer sleeve travelling limiting radially inwardly extending shoulder.

FIG. 71H is an enlarged encircled region view showing the inner cone flapper shim stack being urge and flexed by rearward movement of the rear surface of the inner cone.

FIG. 71M is an enlarged encircled region view showing the rebound metering fluid needle and tube seat adjusted to one of a plurality of potential open positions.

FIG. 72 is an end view from the rebound end showing the support housing and housing flow ports and compound sectional view taken along compound line 73-73 of mid-valve piston assembly 1022 for a shock absorber.

FIG. 73 is a compound sectional view of the mid-valve piston of FIGS. 62-71 showing both a compression port and a rebound port at a later state than shown in FIG. 71 with fluid flow restriction where the outer conical piston is closed.

FIG. 73C is an enlarged view from the encircled region and showing the flapper shims in a closed position.

FIG. 73D is an enlarged view from the encircled region and showing the check valve in a closed position.

FIG. 73E is an enlarged encircled region view showing the outer cone closed against the outer piston frustoconical seat to form gap 1182.

FIG. 73F is an enlarged encircled region view showing the outer cone partially open relative to the outer piston frustoconical seat to from gap 1186.

FIG. 73G is an enlarged encircled region view showing a motion limiting gap increasing in size over that shown in FIG. 71G between a back surface of the outer piston body and the outer sleeve travelling limiting radially inwardly extending shoulder.

FIG. 73H is an enlarged encircled region view showing the inner cone flapper shim stack being urge and flexed by rearward movement of the rear surface of the inner cone.

FIG. 73M is an enlarged encircled region view showing the rebound metering fluid needle and tube seat adjusted to one of a plurality of potential open positions.

FIG. 74 is an end view from the rebound end showing the support housing and housing flow ports and compound sectional view taken along compound line 75-75 of mid-valve piston assembly 1022 for a shock absorber.

FIG. 75 is a compound sectional view of the mid-valve piston 1022 of FIGS. 62-73 showing both a compression port 1094 and a rebound port 1096 at a later state than shown in FIG. 73 with fluid flow restriction allowing bypass where the outer conical piston is opening again in response to a threshold excessive force.

FIG. 75C is an enlarged view from the encircled region and showing the flapper shims in a closed position.

FIG. 75D is an enlarged view of the encircled region and showing the check valve in a closed position.

FIG. 75E is an enlarged encircled region view showing the outer cone fully open relative to the outer piston frustoconical seat.

FIG. 75F is an enlarged encircled region view showing the outer cone partially open relative to the outer piston frustoconical seat.

FIG. 75G is an enlarged encircled region view showing a motion limiting gap completely closed over that shown in FIG. 73G between a back surface of the outer piston body and the outer sleeve travelling limiting radially inwardly extending shoulder.

FIG. 75H is an enlarged encircled region view showing the inner cone flapper shim stack being urge and flexed by rearward movement of the rear surface of the inner cone.

FIG. 75M is an enlarged encircled region view showing the rebound metering fluid needle and tube seat adjusted to one of a plurality of potential open positions.

FIG. 76 is an end view from the rebound end showing the support housing and housing flow ports and compound sectional view taken along compound line 77-77 of mid-valve piston assembly 1022 for a shock absorber.

FIG. 77 is a compound sectional view of the mid-valve piston 1022 of FIGS. 62-75 showing both a compression port 1094 and a rebound port 1096 at a later state than shown in FIG. 75 with fluid flow restriction allowing bypass where the outer conical piston is opening again in response to a threshold excessive force.

FIG. 77C is an enlarged view of the encircled region and showing the flapper shims in an open position.

FIG. 77D is an enlarged view of the encircled region and showing the check valve in an open position.

FIG. 77E is an enlarged encircled region view showing the outer cone closed against the outer piston frustoconical seat.

FIG. 77F is an enlarged encircled region view showing the outer cone closed against the outer piston frustoconical seat.

FIG. 77G is an enlarged encircled region view showing a motion limiting gap same as that shown in FIG. 67G between a back surface of the outer piston body and the outer sleeve travelling limiting radially inwardly extending shoulder.

FIG. 77H is an enlarged encircled region view showing the inner cone flapper shim stack closed (and preloaded) against the rear surface of the inner cone.

FIG. 77M is an enlarged encircled region view showing the rebound metering fluid needle and tube seat adjusted to one of a plurality of potential open positions.

FIG. 78 is an end view from the rebound end showing the support housing and housing flow ports and compound sectional view taken along compound line 79-79 of mid-valve piston assembly 1022 for a shock absorber.

FIG. 79 is a compound sectional view of the mid-valve piston of FIGS. 62-77 showing both a compression port and a rebound port at a later state than shown in FIG. 77 with fluid flow restriction allowing bypass where the outer conical piston is opening again in response to a threshold excessive force.

FIG. 79C is an enlarged view of the encircled region and showing the flapper shims in a closed position.

FIG. 79D is an enlarged view of the encircled region and showing the check valve in a closed position.

FIG. 79E is an enlarged encircled region view showing the outer cone closed against the outer piston frustoconical seat.

FIG. 79F is an enlarged encircled region view showing the outer cone closed against the outer piston frustoconical seat.

FIG. 79G is an enlarged encircled region view showing a motion limiting gap same as that shown in FIG. 79G between a back surface of the outer piston body and the outer sleeve travelling limiting radially inwardly extending shoulder.

FIG. 79H is an enlarged encircled region view showing the inner cone flapper shim stack closed (and preloaded) against the rear surface of the inner cone.

FIG. 79M is an enlarged encircled region view showing the rebound metering fluid needle and tube seat adjusted to a completely closed position.

FIG. 80 is an exploded and perspective vertical centerline sectional view of the secondary fluid valve 1022 from the inlet end of FIGS. 63-79 showing nut 1066 with threads 1150 assembled together onto female rebound tube 1080 with stop plate 1067, spring 1092, and check valve washer 1090 entrapped there between. A rebound nut assembly 1084 includes a bi-directional fluid metering hole, or bore 1088, a circumferential array of rebound circuit fluid ports 1086, and female threads 1144. A spacer ring 1078 stacks up against a rebound shim stack assembly 1098 that is seated against a piston body 1100, selectively blocking ports 1096 unless the cylindrical springs, or flex washers (or shim flappers) 1099 of shim stack assembly 1098 are flexed and urged away form an adjacent surface of piston body 1100 from fluid pressure exerted via ports 1096. Piston body 1100 also carries a piston band 1102 and a compression o-ring seal 1104. An opposed rear face of piston body 1100 provides an inner frustoconical seat 1192 and an outer frustoconical seat 1194 spaced across a circumferential an annular volumetric expansion chamber 1116. Compression ports 1094 are also provide through piston body 1100. A proximal end of a female rebound tube 1080 threads within female threads 1146 within shaft 1020. An inner cone piston 2112 carries an inner frustoconical seal, or seat 1188 that mates and demates in sealing relation with seat 1192 in operation. Male threads 1144 mate with female threads 1144 in assembly. An inner cone compression shim stack 1113 is stacked between a round spacer and a front end of a base plate cover 1101. Outer cone piston 2114 has a frustoconical piston surface 1190 configured to mate and demate in sealing relation with complementary seat 1194. Piston rod end, or shaft 1082 extends coaxially through a ducted support housing 1142 having a circumferential array of through flow ports 1106. An outer spring stack (of wave springs) 1140 and an inner stack (of wave springs) 1138. An axially adjustable (via co-acting threaded portions) metering pin 1042 with a tapering conical tip extends within piston rod, or shaft 1020. An outer pump piston 1112 and an inner piston pump 1114 reciprocate coaxially within cylindrical housing 1128. A radially inwardly turned discrete array of fingers 1076 on a fluid directing collar 1068 facilitate entrapped assembly of adjacent parts. A circumferential array of ports 1074 and 1139 in collar 1068 facilitate fluid flow and o-ring seals 1070 and 1072 provide sealed assembly between adjacent parts. A rubber or plastic cylindrical bump stop 1056 is provide on shaft 1020 to mitigate any over-stroke shock transmission.

FIG. 81 is a perspective view from above of yet another alternative primary compression adjuster for a shock absorber according to another construction.

FIG. 81A is an enlarged perspective view of the end portion for the primary compression adjuster taken from encircled region 81A from FIG. 81.

FIG. 81B is a plan view of the end portion for the primary compression adjuster.

Figure 8:
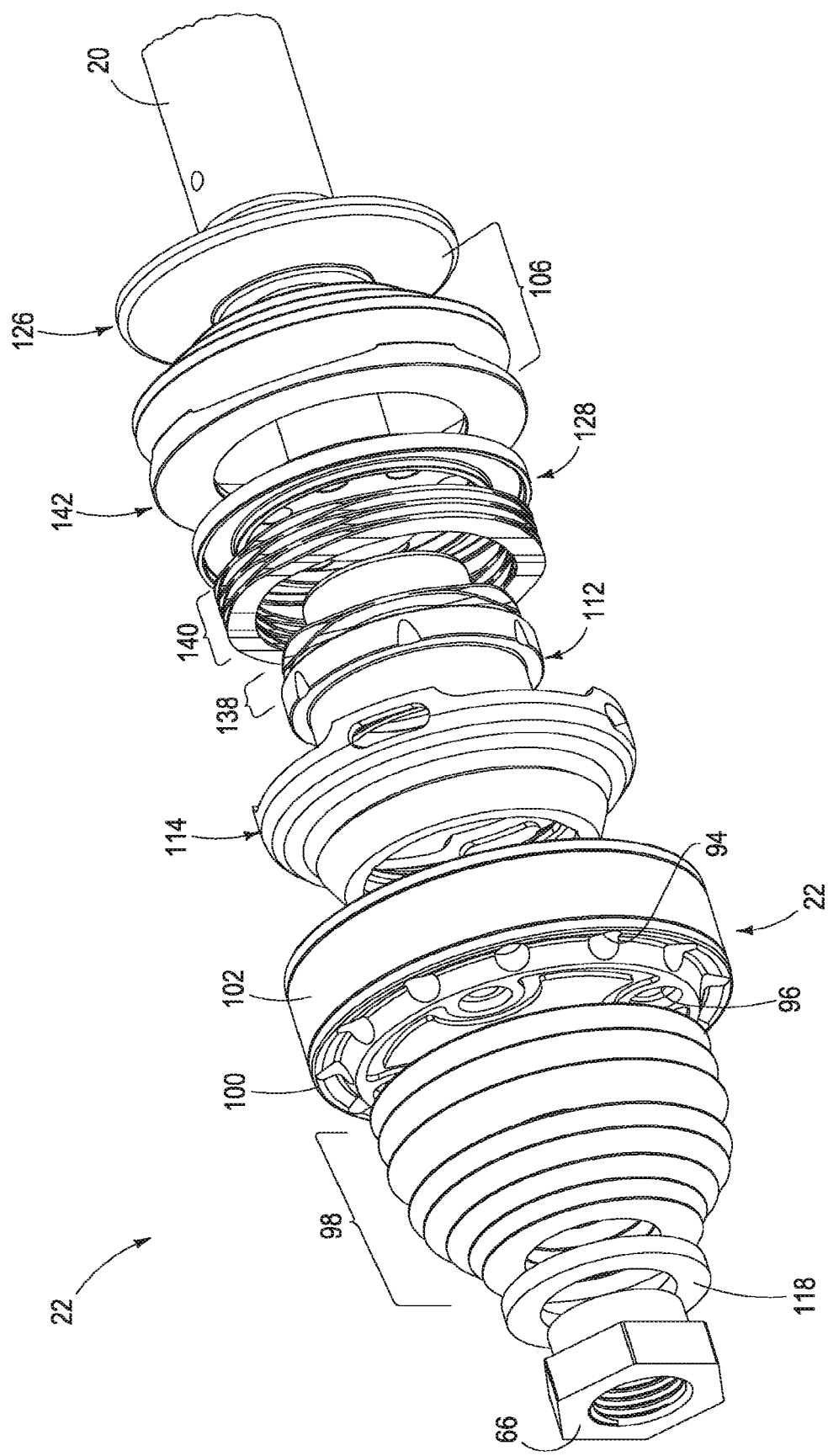
FIG. 8 is an exploded perspective view from the compression end of the mid-valve piston assembly of FIG. 6.
Figure 9:
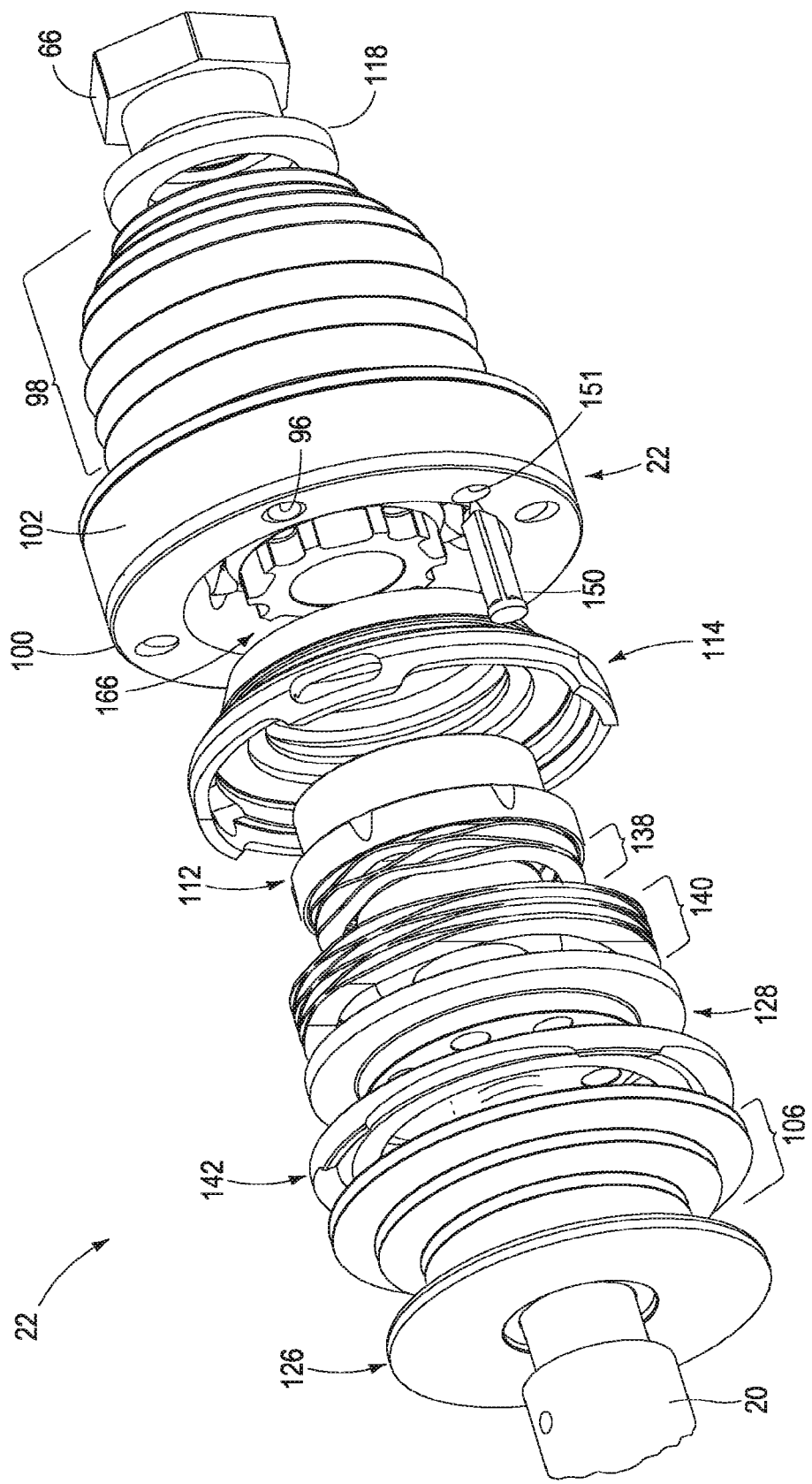
FIG. 9 is an exploded perspective view taken from the rebound end of the mid-valve piston assembly of FIG. 6 showing an opposed side depicted in FIG. 7.

FIG. 82 is a centerline sectional view of the primary compression adjuster taken along line 82-82 of FIG. 8-1-8-81B. Adjuster 1232 includes a shafter 1255 with an adjuster head 1260 affixed using a hex head set scres 1262. A cap body 1200 is threaded onto an outer base 1202. A pump piston 1210 is urged by a spring stack 1204 forward in bore 1260 to close a first valve, or frustoconical valve 1201 by urging closed plug, or cone 1205. A second valve 1203 is provided in parallel flow with first valve 1201. Ports 1276, 1278 and 1297 provide a counteracting fluid flow path acting against spring stack 1204 on piston 1210. An adjustable flow volume clicker screw 1206 enables adjustment, or tuning of fluid flow. Cylindrical bore 1260 provides an outlet flow and slit lock ring 1270 retains internal parts in base 1202.

FIG. 82A is an enlarged encircled portion center-line sectional view of the primary compression adjuster 1232 of FIG. 82. More particularly, head 1260, shaft 1255 and screw 1262 are shown in greater detail. Second valve 1203 includes bore 1290 and plate, or frustoconical plug 1253. Alignment shaft tube body 1214 includes a central bore 1246 provided coaxially within spring stack 1204. Adjustable flow volume clicker screw 1206 is retained in cap body 1200 with a c-shaped snap ring 1208 and includes a coil spring 1228 and a ball 1226 to impart discrete rotational setting positions. Metering pin 1236 is axially positioned as a result of such rotation along metering pin hole 1234. A circumferential downstream collection cavity, or chamber 1295 is fluid coupled with ports 1251 and 1250 via a one way flow ball 1252 and biasing spring 1254. Coil spring 1257 urges plug 1253 against bore 1290. Ball 1276 and coil spring 1278 provide for discrete rotation position stops (with recesses in the bore) for shaft 1255 to ensure repeatable settings for urging plug 1253 against orifice 1290.

FIG. 83 is an end view of yet even another alternative mid-valve 1322 for a shock absorber 10 mid-valve piston assembly 22 (see FIG. 1A-FIG. 34) and respectively (see FIG. 63-FIG. 80) according to another construction FIG. 84 is a vertical centerline sectional view of FIG. 83 alternative mid-valve 1322 according to another construction for a bicycle fork or motorcycle fork mid-valve piston assembly respectively semi mimicking many operations with some minor function differences of FIGS. 63-80 (see FIG. 63-FIG. 80) taken along line 84-84 of FIG. 83 showing in vertical cross section a rebound port 1396 which is formed in a circumferential equally spaced apart array extending through a piston body 1400 of piston assembly 1322. Piston body 1400 includes a circumferential array of compression ports 1394 and rebound ports 1396. A piston band 1302 is provided circumferentially about piston body 1400. Compression ports 1394 communicate with a common circumferential chamber 1383. The piston body 1400 along with a threaded shaft 1320 on each end, having a stepped longitudinal shaft 1320 stepping down in dimension to the left, starting from the large periphery diameter on the right a left facing flange and looking to the left, having a circumferential connecting groove to the rebound vertical bores interconnecting with shaft inner bore 1308 and a larger o-ring outer periphery holding groove that is a dual sided groove having a channel for the o-ring to bound and fitting in to the outer periphery groove diameter and looking further to the left to a smaller shaft diameter with a circumferential array of ports leading from inner shaft through bore 1308, to exterior of the shaft 1320 and having another smaller diameter to the left for holding a cylindrical washer spacer and making a first stop face lip on the shaft 1320 and yet a next smaller shaft diameter making a second step stop face to hold against the piston valve 1400 inner bore face and where the small end shaft rod extends through the piston valve and rebound shim assembly that is not threaded and ending with a threaded outer dimension and end of piston rod shaft stem 1320, having a rebound nut 1366 with female mating thread connecting via mating shaft stem 1320 end the small end thread on smallest shaft diameter trapping the mid-valve assembly 1322 to the shaft stem 1320 in the area between the left facing flange to the nut.

Mid-valve assembly 1322 traps within the shaft stem 1320 starting at the right and moving towards the left from the left facing flange to the left end threads and end rebound nut 1366 an inner pump piston 1314 and sealing o-ring groove towards the inner dimension of the inner pump piston 1314 bore and having an inner bore step self-facing the right towards the pump fluid ports and having an equally spaced circumferential array of notches to the more right making the inner pump piston sealed and cylindrically slidable to the shaft stem 1320 via an o-ring cylindrically fitting in the groove of inner pump piston, an outer pump piston 1312 with inner and outer cylindrical sliding capability fitting over the inner pump piston 1314 to make a tight tolerance inner seal slide fit to mate with inner pump piston 1314 and an outer periphery diameter slidably fit to mate with an outer housing 1302 having inner bore with a seal slide fit to the outer periphery of the outer pump piston 1312 mating to the outer housing 1302 cylinder forming a high tolerance slide fit, the outer housing 1302 has an inner bore that cylindrically reciprocates over the o-ring dual sided periphery and seals via the captured o-ring allowing an ability to slide to the left and to the right concerning a compression stroke or a rebound stroke, during a rebound stroke outer housing 1302 slides to the left allowing fluid to pass via the rebound groove at that of the rebound vertical port location and enter shaft stem 1320 the vertical rebound ports and bypass a rebound needle metering pin assembly 1342 and an inner end bore seat in the shaft stem 1320 inner bore 1308 and through bore 1308 as one pathway.

During a compression stroke, outer housing 1302 slides to the right making a seal against the left facing flange of the shaft stem 1320 and the right end of the pump housing 1302 sealing about the rebound end on the shaft stems 1320 left facing flange and having an outer periphery right end bleed port located in the outer housing 1302 about the rebound groove of the pump housing 1302, allowing a metered flow of compression stroke bleed to exit as it goes through port 1308 and towards the rebound metering pin assembly 1342 from the compression end of the mid-valve piston assembly 1322 and also causing hydraulic fluid pressure to enter the circumferential array of pump fill ports in the shaft stem 1320 into the sealed housing chamber causing a hydraulic fluid pressure to build and expand with acting force, causing the outer pump piston 1312 which is a larger diameter and having a larger surface area volumetric rate of expansion and a larger diameter spring which uses a lesser angle of coil and typically the coil wire is longer because of the larger diameter making a softer spring than that of an inner spring, urges the outer pump piston 1312 to the left compressing the outer spring 1340 against a spacer washer 1380 seated against a larger internal bore of the piston valve 1400 and seating against a ledge portion of the cone piston tube which are set to equal a same flat having that of a similar inner tolerance to that of the outer surface of the cone piston tube 1368 extends the tube body further out of the cone piston making a second partial seal when pressing towards a right facing ledge a of the cone piston tube equally leveled with a larger depth bore of the piston valve 1400, creating a mating surface more secure seal to slow hydraulic fluid bypass through outer portion of the cone piston tube 1368 external circumferential flats about the most outer periphery making a check valve opening of the spacer washer during a first compression stroke volume bypass of fluid from compression side (see FIG. 1A) of the piston valve, when outer spring 1340 is in a free floating non compressed state and a second firming in fluid flow resistance as outer pump piston urges the outer spring toward the spacer washer 1380. Once the outer spring 1340 has started to move relative to the pump hydraulic fluid pressure, the inner pump piston 1314 acts to compress the step washer and urge the small spring 1331 until shim spacer seats against the more right end of the cone piston tube 1368, and to hold middle spring 1330 at a loaded state but not excessively urging an inner pump spring 1330 to slowly build hydraulic fluid pressure towards the left, as the outer pump travels to the left a circumferential array of side bleed ports the outer periphery wall of the pump housing 1302 set to distribute hydraulic fluid pressure by allowing fluid to exit as the outer pump piston 1312 moves towards the left, outer periphery holes take hydraulic fluid pressure to a lesser pressure slowing the action of the outer pump piston, causing a balance of hydraulic fluid pressure of the inner pump piston until the outer pump piston has traveled to the furthest left position and pump housing side periphery bleed ports allow the escape of more hydraulic fluid volumetric pressure that than which enters the hydraulic fluid pump via the circumferential array of the fill ports extending to the into the pump housing chamber. 1314 wherein the end allows hydraulic fluid pressure to travel from inner pump shaft bore 1308 and to the right most end of the inner pump piston 1314 expanding outward to an outer pump piston 1312 with inner and outer cylindrical sliding capability fitting over the inner pump piston 1314 to make a tight tolerance inner seal slide fit to mate with inner pump piston 1314 and an outer periphery diameter slidable fit to mate with the outer housing 1302 inner bore with a seal slide fit on the outer periphery of the outer pump piston 1312 mating to the outer housing cylinder forming a high tolerance slide fit, an inner pump piston 1314 bore and having an inner bore step self-facing the right towards the pump fluid ports and having an equally spaced circumferential array of ports.

Also trapped in the mid-valve assembly 1322, an inner spring 1330 is cylindrically fit over the shaft wherein right end connects/mates to the inner pump piston 1314 and the left end faces and mates to a shim spacer, the shim spacer mates to the step washer and step washer mates to the spring 1331 fitting and cylindrically slidable over shaft stem 1320 and is preloaded against a piston valve tube or piston cone tube or cone piston tube 1368 also cylindrically slidable on the shaft stem 1320, the piston valve tube is an extended tube with a cupped slidable inward facing flange end wall and inner bore to house the spring 1331 and step washer keeping the piston valve tube concentric and slidable on the shaft stem 1320 also having a circumferential array of side ports from inner cone piston tube 1368 bore to the outer wall allowing trapped hydraulic pressure to escape. A piston valve tube 1368 seats about a step washer, or ring collar 1324 to entrap a coil spring 1331.

In compliance with the statute, embodiments of the invention have been described in language more or less specific as to structural and methodical features. It is to be understood, however, that the entire invention is not limited to the specific features and/or embodiments shown and/or described, since the disclosed embodiments comprise forms of putting the invention into effect. The invention is, therefore, claimed in any of its forms or modifications within the proper scope of the appended claims appropriately interpreted in accordance with the doctrine of equivalents.

I claim:

1. A hydraulic fluid control valve for a shock absorber, comprising:
   a valve body;
   a first valve having an orifice, a plug and a spring configured to urge the plug against the orifice, the orifice provided on the valve body and the valve body interposed between a shock absorber fluid internal chamber and a differential overflow source of shock absorber fluid;
   a hydraulic pump configured to urge the plug against the orifice having a piston, a piston bore defining an expansible piston chamber, a piston biasing spring configured to urge the piston into the piston chamber, and a fluid bypass port configured to move fluid from outside the valve body into the hydraulic pump between the piston and the piston chamber to apply differential force on the plug by pumping the piston against the spring within the piston bore to urge the plug against the orifice to further seat the plug against the orifice; and
   a second valve placed parallel to the first valve and the fluid bypass port of the hydraulic pump in fluid communication with the shock absorber fluid reservoir and adjustable in flow rate to vary the differential force on the plug against the orifice.

2. The hydraulic fluid control valve of claim 1, wherein the valve body comprises an auxiliary valve body having an inlet configured to communicate with a shock absorber compression end and an outlet configured to communicate with a shock absorber fluid reservoir.

3. The hydraulic fluid control valve of claim 1, wherein the first valve is a cone valve, the plug comprises a cone, and the valve body comprises a cone valve seat configured to seat against the cone.

4. The hydraulic fluid control valve of claim 3, wherein the spring is a coaxial spring relative to a major axis of the cone body and configured to urge the cone body against the cone valve seat.

5. The hydraulic fluid control valve of claim 4, wherein the cone valve body further comprises a variable volume piston bore provided in the cone valve body, the piston engaged by the spring into the piston bore and configured to urge the piston into the piston bore and the cone into the cone valve seat.

6. The hydraulic fluid control valve of claim 5, wherein the hydraulic pump comprises a metered bypass port configured to direct fluid from outside the valve body between the piston and the piston bore to compress the spring.

7. The hydraulic fluid control valve of claim 1, wherein the hydraulic pump further comprises a one-way outlet port configured to direct fluid from between the piston bore and the piston outward and upstream of the first valve to increase force of the piston urging the plug against the orifice.

8. The hydraulic fluid control valve of claim 1, wherein the second valve is a bypass valve configured to deliver fluid that further urges to plug against the orifice.

9. The hydraulic fluid control valve of claim 8, wherein the bypass valve is a frustoconical plug, a circumferential valve seat and a spring configured to urge the plug against the valve seat to resist fluid flow.

10. A hydraulic fluid control valve for a shock absorber, comprising:
    a valve body;
    a cone valve having a cone valve seat, a cone valve body and a spring configured to urge the cone valve body against the cone valve seat, the cone valve seat provided on the valve body and the valve body interposed between a shock absorber fluid internal chamber and a differential overflow source of shock absorber fluid;
    a piston pump configured to urge the cone valve body against the cone valve seal having a piston and a piston bore defining an expansible piston chamber, the piston biased into the piston chamber, and a fluid bypass port configured to move fluid from outside the valve body into the hydraulic pump between the piston and the piston chamber to apply differential force on the plug by pumping against the biased piston within the piston bore to urge the cone valve body against the cone valve seat to further seat the cone valve body against the cone valve seat; and
    a bypass valve placed parallel to the cone valve and the fluid bypass port of the piston pump in fluid communication with the shock absorber fluid reservoir and adjustable in flow rate to vary the differential force on the cone valve body against the cone valve seat.

11. The hydraulic fluid control valve of claim 10, wherein the valve body is an auxiliary valve body of an auxiliary shock absorber adjuster having an inlet configured to communicate with a shock absorber compression end and an outlet configured to communicate with a shock absorber fluid reservoir.

12. The hydraulic fluid control valve of claim 10, wherein the cone valve body is a frustoconical plug and the cone valve seat is a complementary frustoconical seat configured to mate and de-mate in sealing relation with the frustoconical plug.

13. The hydraulic fluid control valve of claim 10, wherein the spring is a coaxial spring relative to the cone valve body and configured to urge the cone valve body against the cone valve seat.

14. The hydraulic fluid control valve of claim 13, wherein the coaxial spring is a cylindrical stack of cup washers.

15. The hydraulic fluid control valve of claim 10, wherein the coaxial spring is a cylindrical coil spring.

16. The hydraulic fluid control valve of claim 10, wherein the cone valve body further comprises a variable volume piston bore provided in the cone valve body, the piston engaged by the spring into the piston bore and configured to urge the piston into the piston bore and the cone into the cone valve seat.

17. The hydraulic fluid control valve of claim 16, wherein the piston pump comprises a metered bypass port configured to direct fluid from outside the valve body between the piston and the piston bore to compress the spring and urge the piston into the piston bore to further urge the cone into the cone valve seat.

18. The hydraulic fluid control valve of claim 10, wherein the hydraulic pump further comprises a one-way outlet port configured to direct fluid from between the piston bore and the piston outward and upstream of the first valve to increase force of the piston urging the cone valve body against the cone valve seat.

19. The hydraulic fluid control valve of claim 10, wherein the bypass valve is configured in fluid communication with a shock absorber compression end to deliver fluid that further urges to plug against the orifice.

20. The hydraulic fluid control valve of claim 19, wherein the bypass valve is a frustoconical plug, a circumferential valve seat and a spring configured to urge the plug against the valve seat to resist fluid flow.

21. The hydraulic fluid control valve of claim 19, wherein the bypass valve is a cylindrical plug, a circumferential valve seat and a spring configured to urge the cylindrical plug against the valve seat to resist fluid flow.

* * * * *